US012777385B2

(12) United States Patent
Mildh et al.

(10) Patent No.: US 12,777,385 B2

(45) Date of Patent: Oct. 27, 2026

(54) CONTROL PLANE CONNECTION MIGRATION IN AN INTEGRATED ACCESS BACKHAUL NETWORK

(71) Applicant: Telefonaktiebolaget LM Ericsson (publ), Stockholm (SE)

(72) Inventors: Gunnar Mildh, Sollentuna (SE); Oumer Teyeb, Montréal (CA); Ajmal Muhammad, Sollentuna (SE); Filip Barac, Huddinge (SE); Paul Schliwa-Bertling, Ljungsbro (SE); Per-Erik Eriksson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 832 days.

(21) Appl. No.: 18/016,514

(22) PCT Filed: Jul. 15, 2021

(86) PCT No.: PCT/SE2021/050730

§ 371 (c)(1),
(2) Date: Jan. 17, 2023

(87) PCT Pub. No.: WO2022/015231

PCT Pub. Date: Jan. 20, 2022

(65) Prior Publication Data

US 2023/0292204 A1 Sep. 14, 2023

Related U.S. Application Data

(60) Provisional application No. 63/053,522, filed on Jul. 17, 2020.

(51) Int. Cl.

*H04W 36/08* (2009.01)
*H04W 36/00* (2009.01)

(52) U.S. Cl.

CPC ...... *H04W 36/08* (2013.01); *H04W 36/00692* (2023.05)

(58) Field of Classification Search

CPC ........... H04W 36/08; H04W 36/00692; H04W 36/18; H04W 84/042

(Continued)

(56) References Cited

U.S. PATENT DOCUMENTS 11,622,300 B2 4/2023 Byun et al.
11,706,690 B2 7/2023 Akl et al.

(Continued)

FOREIGN PATENT DOCUMENTS

CN 107371208 A 11/2017
NO 2021140032 A1 7/2021

(Continued)

OTHER PUBLICATIONS

3GPP, "3rd Generation Partnership Project; Technical Specification Group Radio Access Network; NR; Radio Link Control (RLC) protocol specification (Release 16)", 3GPP TS 38.322 V16.1.0, Jul. 2020, 36 pages.

(Continued)

*Primary Examiner* — Marcos Batista

(57) ABSTRACT

An integrated access backhaul, IAB, node (12) migrates a control plane connection (22) of the IAB node (12) from first radio network equipment (14A) to second radio network equipment (14B). After migrating the control plane connection (22), the IAB node (12) at least temporarily maintains a radio network layer application protocol connection (24) between the IAB node (12) and the first radio network equipment (14A).

23 Claims, 27 Drawing Sheets

(58) Field of Classification Search
USPC .......................................... 370/331; 455/312
See application file for complete search history.

(56) References Cited

U.S. PATENT DOCUMENTS

| | | | |
|---|---|---|---|
| 2021/0044958 | A1 | 2/2021 | Abedini et al. |
| 2021/0092654 | A1* | 3/2021 | Kadiri .............. H04W 36/0061 |
| 2021/0227435 | A1 | 7/2021 | Hsieh |
| 2021/0297909 | A1* | 9/2021 | Lee .................... H04W 36/362 |
| 2021/0377980 | A1 | 12/2021 | Fujishiro et al. |
| 2022/0014976 | A1 | 1/2022 | Luo et al. |
| 2022/0201777 | A1 | 6/2022 | Teyeb et al. |
| 2022/0264383 | A1 | 8/2022 | Teyeb et al. |
| 2023/0130178 | A1 | 4/2023 | Zhuo et al. |
| 2023/0189096 | A1 | 6/2023 | Barac et al. |
| 2023/0232285 | A1 | 7/2023 | Barac et al. |
| 2023/0239755 | A1 | 7/2023 | Teyeb et al. |
| 2023/0247495 | A1 | 8/2023 | Teyeb et al. |
| 2023/0269634 | A1 | 8/2023 | Teyeb et al. |
| 2023/0284312 | A1 | 9/2023 | Parichehrehteroujeni et al. |

FOREIGN PATENT DOCUMENTS

| | | | | |
|---|---|---|---|---|
| WO | 2018211170 | A1 | 11/2018 | |
| WO | WO-2019246446 | A1 * | 12/2019 | .......... H04W 36/087 |

OTHER PUBLICATIONS

3GPP, "3GPP TS 38.300 V16.2.0", 3rd Generation Partnership Project; Technical Specification Group Radio Access Network; NR; NR and NG-RAN Overall Description; Stage 2 (Release 16), Jul. 2020, 1-148.

3GPP "3GPP TS 38.401 V15.8.0", 3rd Generation Partnership Project; Technical Specification Group Radio Access Network; NG-RAN; Architecture description (Release 15), Jul. 2020, 1-47.

Qualcomm , "CR to 38.300 on Integrated Access and Backhaul for NR", 3GPP TSG-RAN WG2 Meeting #108, R2-1916641, Reno, NV, USA, Nov. 18-22, 2019, 1-28.

3GPP, "3GPP TS 36.413 V16.1.0", 3rd Generation Partnership Project; Technical Specification Group Radio Access Network; Evolved Universal Terrestrial Radio Access Network (E-UTRAN); S1 Application Protocol (S1AP) (Release 16), Mar. 2020, 1-130.

3GPP, "3GPP TS 38.413 V16.1.0", 3rd Generation Partnership Project; Technical Specification Group Radio Access Network; NG-RAN; NG Application Protocol (NGAP) (Release 16), Mar. 2020, 1-26.

"IAB topology adaptation for architecture 1a", 3GPP TSG-RAN WG3 Meeting #101; R3-184693; Gothenburg, Sweden, Aug. 20-24, 2018, 1-13.

3GPP, "3GPP TS 38.322 V16.0.0", 3rd Generation Partnership Project; Technical Specification Group Radio Access Network; NR; Radio Link Control (RLC) protocol specification (Release 16), Mar. 2020, 1-33.

3GPP, "3rd Generation Partnership Project; Technical Specification Group Radio Access Network; Evolved Universal Terrestrial Radio Access Network (E-UTRAN); X2 application protocol (X2AP) (Release 16)", 3GPP TS 36.423 V16.1.0, Mar. 2020, 1-438.

3GPP, "3rd Generation Partnership Project; Technical Specification Group Radio Access Network; NG-RAN; Architecture description (Release 16)", 3GPP TS 38.401 V16.1.0, Mar. 2020, 1-50.

3GPP, "3rd Generation Partnership Project; Technical Specification Group Radio Access Network; NG-RAN; F1 application protocol (F1AP) (Release 16)", 3GPP TS 38.473 V16.1.0, Mar. 2020, 1-240.

3GPP, "3rd Generation Partnership Project; Technical Specification Group Radio Access Network; NG-RAN; Xn application protocol (XnAP) (Release 16)", 3GPP TS 38.423 V16.1.0, Mar. 2020, 1-334.

3GPP, "3rd Generation Partnership Project; Technical Specification Group Radio Access Network; NR; Study on Integrated Access and Backhaul; (Release 16)", 3GPP TR 38.874 V16.0.0, Dec. 2018, 1-111.

3GPP, "R2-1913254, 3GPP TS 38.340", 3rd Generation Partnership Project; Technical Specification Group Radio Access Network; NR; Backhaul Adaptation Protocol (BAP) specification (Release 16), Oct. 2019, 1-20.

Unknown, Author, "New WID: Integrated Access and Backhaul for NR", 3GPP TSG RAN Meeting #82 RP-182882, Sorrento, Italy, Dec. 10-13, 2018, 1-7.

* cited by examiner

CONTROL PLANE CONNECTION MIGRATION IN AN INTEGRATED ACCESS BACKHAUL NETWORK

TECHNICAL FIELD

The present application relates to an integrated access backhaul (IAB) network, and relates more particularly to control plane connection migration in such a network.

BACKGROUND

A split radio network architecture splits radio network equipment (e.g., a base station) into a so-called central unit (CU) and one or more so-called distributed units (DUs). The central unit terminates higher layer and/or less time-critical protocols, such as the Packet Data Convergence Protocol (PDCP) and Radio Resource Control (RRC) protocols towards a wireless device. The central unit also controls the operations of the distributed unit(s). A distributed unit by contrast terminates lower layer and/or more time-critical protocols, such as the Radio Link Control (RLC), Medium Access Control (MAC), and physical layer protocols.

The split radio network architecture may be applied to an integrated access backhaul (IAB) where some radio resources are used for the access link to wireless devices and some radio resources are also used for the backhaul link between radio network equipment. Such IAB may be used for instance to connect small cells to the network, instead of requiring fiber connections to the many small cells. With IAB, one or more so-called IAB nodes may be chained underneath an IAB donor. Each IAB node holds a DU and a mobile termination (MT). Via the MT, the IAB node connects to an upstream IAB node or the IAB donor. Via the DU, the IAB node establishes RLC channels to user equipments (UEs) and to MTs of downstream IAB nodes. The IAB donor also holds a DU to support UEs and MTs of downstream IAB nodes. The IAB donor further holds a CU for the DUs of all IAB nodes and for its own DU.

The topology of the IAB nodes may be dynamically adapted, e.g., to account for changing channel or loading conditions on the wireless backhaul, integration of a new IAB node to the topology, or the like. IAB topology adaptation requires reconfiguring the endpoints of any transport layer tunnels or other connections associated with a migrating IAB node that hands over to a new serving IAB node. However, such reconfiguration proves challenging, especially in an inter-CU migration whereby the migrating IAB node will be served by a different donor CU than before the migration. Indeed, reconfiguration in such a scenario may threaten service interruption (due to IAB-node migration) and signaling load.

SUMMARY

In some embodiments herein, an integrated access backhaul (IAB) node migrates a control plane connection (e.g., radio resource control, RRC, connection) of the IAB node from source radio network equipment to target radio network equipment, but at least temporarily maintains a radio network layer application protocol connection (e.g., an F1 connection) with the source radio network equipment. Migration may correspondingly avoid the creation of a new radio network layer application protocol connection for the IAB node. Alternatively or additionally, this may mean that the IAB node at least temporarily keeps using the same values for cell-specific parameters as it did before the migration, e.g., so as to avoid changing of parameter values. These and other embodiments may thereby advantageously help avoid service interruption and reduce signaling load.

More particularly, embodiments herein include a method performed by an integrated access backhaul, IAB, node. The method comprises migrating a control plane connection of the IAB node from first radio network equipment to second radio network equipment. The method further comprises, after migrating the control plane connection, at least temporarily maintaining a radio network layer application protocol connection between the IAB node and the first radio network equipment.

In some embodiments, the method further comprises transmitting and/or receiving one or more control plane messages over the migrated control plane connection between the IAB node and the second radio network equipment.

In some embodiments, the method further comprises before migrating the control plane connection, serving a cell using certain values for cell-specific parameters, and after migrating the control plane connection, at least temporarily serving the cell using the same certain values for the cell-specific parameters.

In some embodiments, the method further comprises starting a timer upon migrating the control plane connection, maintaining the radio network layer application protocol connection between the IAB node and the first radio network equipment while the timer is running, and responsive to expiration of the timer, migrating the radio network layer application protocol connection from the first radio network equipment to the second radio network equipment.

In some embodiments, the method further comprises deciding whether and/or when to migrate the radio network layer application protocol connection from the first radio network equipment to the second radio network equipment based on at least one of any one or more of an amount of and/or type of traffic communicated on the radio network layer application protocol connection, an amount of and/or type of wireless devices supported by the radio network layer application protocol connection, and an amount of and/or type of bearers of a certain quality of service profile supported by the radio network layer application protocol connection.

In some embodiments, the first radio network equipment comprises a first IAB donor, and the second radio network equipment comprises a second IAB donor.

In some embodiments, the first radio network equipment comprises a first distributed unit and a first central unit that controls the first distributed unit, the second radio network equipment comprises a second distributed unit and a second central unit that controls the second distributed unit, the IAB node comprises a migrating distributed unit and a migrating mobile termination. In this case, migrating the control plane connection comprises migrating a control plane connection of the migrating mobile termination from the first central unit of the first radio network equipment to the second central unit of the second radio network equipment, and maintaining the radio network layer application protocol connection comprises at least temporarily maintaining a radio network layer application protocol connection between the migrating distributed unit and the first central unit of the first radio network equipment.

In some embodiments, the control plane connection is a Radio Resource Control, RRC, connection and the radio network layer application protocol connection is an F1 connection.

In some embodiments, the method further comprises serving one or more child nodes, wherein the one or more child nodes include one or more child IAB nodes and/or one or more wireless devices. The method further comprises, after migrating, for at least one of the one or more child nodes, at least temporarily maintaining a control plane connection between the child node and the first radio network equipment.

In some embodiments, the method further comprises receiving a proxied connection migration message from the first radio network equipment or the second radio network equipment and/or transmitting a proxied connection migration complete message towards the second radio network equipment. In this case, the proxied connection migration message indicates the IAB node is to migrate the control plane connection to the second radio network equipment but at least temporarily maintain the radio network layer application protocol connection between the IAB node and the first radio network equipment. Additionally or alternatively, the proxied connection migration message includes configuration information for configuring migration of the control plane connection to the second radio network equipment but at least temporary maintenance of the radio network layer application protocol connection between the IAB node and the first radio network equipment. The proxied connection migration complete message indicates the IAB node has migrated the control plane connection to the second radio network equipment but at least temporarily maintained the radio network layer application protocol connection between the IAB node and the first radio network equipment.

In some embodiments, transmitting one or more control plane messages comprises encapsulating a radio network layer application protocol message for the radio network layer application protocol connection in a control plane message and transmitting the control plane message over the migrated control plane connection. Additionally or alternatively, receiving one or more control plane messages comprises receiving a control plane message over the migrated control plane connection and de-encapsulating a radio network layer application protocol message for the radio network layer application protocol connection from the received control plane message.

In some embodiments, the radio network layer application protocol connection supports a control plane connection between the first radio network equipment and a child node served by the IAB node.

In some embodiments, the method further comprises, after migrating the control plane connection, transmitting and/or receiving one or more control plane messages over the radio network layer application protocol connection maintained between the IAB node and the first radio network equipment. In this case, the one or more control plane messages include a control plane message for a control plane connection between the first radio network equipment and a child node served by the IAB node.

Other embodiments herein include a method performed by first radio network equipment. The method comprises migrating a control plane connection of an IAB node from the first radio network equipment to second radio network equipment, and after migrating the control plane connection, at least temporarily maintaining a radio network layer application protocol connection between the IAB node and the first radio network equipment.

In some embodiments, the method further comprises deciding whether and/or when to migrate the radio network layer application protocol connection from the first radio network equipment to the second radio network equipment based on at least one of any one or more of an amount of and/or type of traffic communicated on the radio network layer application protocol connection, an amount of and/or type of wireless devices supported by the radio network layer application protocol connection, and an amount of and/or type of bearers of a certain quality of service profile supported by the radio network layer application protocol connection.

In some embodiments, the first radio network equipment comprises a first IAB donor, and the second radio network equipment comprises a second IAB donor.

In some embodiments, the first radio network equipment comprises a first distributed unit and a first central unit that controls the first distributed unit. the second radio network equipment comprises a second distributed unit and a second central unit that controls the second distributed unit, the IAB node comprises a migrating distributed unit and a migrating mobile termination. In this case migrating comprises migrating a control plane connection of the migrating mobile termination from the first central unit of the first radio network equipment to the second central unit of the second radio network equipment, and maintaining comprises at least temporarily maintaining a radio network layer application protocol connection between the migrating distributed unit and the first central unit of the first radio network equipment.

In some embodiments, the control plane connection is a Radio Resource Control, RRC, connection and the radio network layer application protocol connection is an F1 connection.

In some embodiments, the method further comprises after migrating, for at least one of one or more child nodes of the IAB node, at least temporarily maintaining a control plane connection between the child node and the first radio network equipment.

In some embodiments, the method further comprises transmitting and/or receiving a proxied connection migration message. In this case, the proxied connection migration message indicates the IAB node is to migrate the control plane connection to the second radio network equipment but at least temporarily maintain the radio network layer application protocol connection between the IAB node and the first radio network equipment. Additionally or alternatively, the proxied connection migration message includes configuration information for configuring migration of the control plane connection to the second radio network equipment but at least temporary maintenance of the radio network layer application protocol connection between the IAB node and the first radio network equipment.

In some embodiments, the method further comprises relaying a radio network layer application protocol message, for the radio network layer application protocol connection, between the IAB node and the second radio network equipment, via an interface between the first radio network node and the second radio network node.

Other embodiments herein include a method performed by second radio network equipment. The method comprises migrating a control plane connection of an IAB node from first radio network equipment to the second radio network equipment, without migrating a radio network layer application protocol connection between the IAB node and the first radio network equipment.

In some embodiments, the first radio network equipment comprises a first IAB donor, and the second radio network equipment comprises a second IAB donor.

In some embodiments, the control plane connection is a Radio Resource Control, RRC, connection, and the radio network layer application protocol connection is an F1 connection.

In some embodiments, the method further comprises transmitting and/or receiving a proxied connection migration message that indicates the IAB node is to migrate the control plane connection to the second radio network equipment but at least temporarily maintain the radio network layer application protocol connection between the IAB node and the first radio network equipment. Additionally or alternatively, the method further comprises transmitting and/or receiving a proxied connection migration message that includes configuration information for configuring migration of the control plane connection to the second radio network equipment but at least temporary maintenance of the radio network layer application protocol connection between the IAB node and the first radio network equipment.

In some embodiments, the method further comprises receiving, from the IAB node, a proxied connection migration complete message that indicates the IAB node has migrated the control plane connection to the second radio network equipment but at least temporarily maintained the radio network layer application protocol connection between the IAB node and the first radio network equipment.

Other embodiments herein include an integrated access backhaul, IAB, node configured to migrate a control plane connection of the IAB node from first radio network equipment to second radio network equipment, and at least temporarily maintain a radio network layer application protocol connection between the IAB node and the first radio network equipment.

In some embodiments, the IAB node is configured to perform the steps described above for an IAB node.

Other embodiments herein include first radio network equipment configured to migrate a control plane connection of an IAB node from the first radio network equipment to second radio network equipment, and at least temporarily maintain a radio network layer application protocol connection between the IAB node and the first radio network equipment.

In some embodiments, the first radio network equipment is configured to perform the steps described above for first radio network equipment.

Other embodiments herein include second radio network equipment configured to migrate a control plane connection of an IAB node from first radio network equipment to the second radio network equipment, without migrating a radio network layer application protocol connection between the IAB node and the first radio network equipment.

In some embodiments, the second radio network equipment is configured to perform the steps described above for second radio network equipment.

Other embodiments herein include a computer program comprising instructions which, when executed by at least one processor of an IAB node, causes the IAB node to perform the steps described above for an IAB node. Other embodiments herein include a computer program comprising instructions which, when executed by at least one processor of radio network equipment, causes the radio network equipment to perform the steps described above for radio network equipment. In one or more of these embodiments, a carrier containing the computer program is one of an electronic signal, optical signal, radio signal, or computer readable storage medium.

Other embodiments herein include an integrated access backhaul, IAB, node comprising communication circuitry and processing circuitry. The processing circuitry is configured to migrate a control plane connection of the IAB node from first radio network equipment to second radio network equipment, and at least temporarily maintain a radio network layer application protocol connection between the IAB node and the first radio network equipment.

In some embodiments, the processing circuitry is configured to perform the steps described above for an IAB node.

Other embodiments herein include first radio network equipment comprising communication circuitry and processing circuitry. The processing circuitry is configured to migrate a control plane connection of an IAB node from the first radio network equipment to second radio network equipment, and at least temporarily maintain a radio network layer application protocol connection between the IAB node and the first radio network equipment.

In some embodiments, the processing circuitry is configured to perform the steps described above for first radio network equipment.

Other embodiments herein include second radio network equipment comprising communication circuitry and processing circuitry. The processing circuitry is configured to migrate a control plane connection of an IAB node from first radio network equipment to the second radio network equipment, without migrating a radio network layer application protocol connection between the IAB node and the first radio network equipment.

In some embodiments, the processing circuitry is configured to perform the steps described above for second radio network equipment.

According to some embodiments, for example, an IAB node performs inter-CU migration, where this IAB node is directly or indirectly serving one or more UEs and IAB nodes. Some embodiments perform the inter-CU migration without handing over the UEs or IAB nodes directly or indirectly being served by the migrating IAB node, thereby making the handover of the directly and indirectly served UEs transparent to the target CU. Some embodiments realize this by handing over the MT of the migrating IAB node to the target CU, but for one or more of the IAB nodes that are directly/indirectly being served by the migrating IAB node, including the migrating IAB node, keeping the associated F1 connection with the source CU. And, for one or more of the UEs and IAB-MTs that are directly/indirectly being served by the migrating IAB node, keeping both the RRC and user plane (UP) context with the source CU.

Some embodiments may thereby avoid a new F1 connection being set up from the migrating IAB-node to the new CU and avoid releasing the old F1 connection to the old CU, at least temporarily. Indeed, releasing and relocating the F1 connection would impact all UEs and any descendant IAB nodes (and their served UEs) by causing service interruption for the UEs and IAB nodes served by the migrating IAB node, since these UEs would need to re-establish their connection or to perform handover operation. This would be the case even if they remain under the same IAB node, e.g., since 3$^{rd}$ Generation Partnership Project (3GPP) security principles mandate key refresh whenever the serving CU/gNB is changed, such as at handover or reestablishment, i.e. an RRC reconfiguration with reconfigurationWithSync has to be sent to each UE. Alternatively or additionally, some embodiments advantageously avoid a signaling storm, since a large number of UEs, IAB-MTs and IAB-DUs would have to perform re-establishment or handover at the same time.

Certain embodiments may accordingly provide one or more of the following technical advantage(s). Some embodiments advantageously avoid a service interruption, as well as signaling storm, that would otherwise be caused by handing over a large number of UE contexts and associations during a migration of an IAB node and its descendent nodes and connected UEs, between two donor-CUs. Since the number of UEs that are directly/indirectly connected to an IAB node can be significant, especially in multi-hop scenarios, avoiding service interruptions ensures good quality of experience for all the concerned UEs. In fact, according to some embodiments, only the migrating IAB-MT is handed over, while the rest of the UEs/IAB nodes served by this IAB node do not even have to become aware that an inter-CU migration has been performed by an IAB node that is directly/indirectly serving them.

According to some embodiments, keeping the F1 connections with the source CU also ensures that the cell parameters served by the migrating IAB-DU and the other concerned DUs do not have to be changed (e.g. cell identities), which could have impacted the operation of the UEs and IAB-MTs connected to the cells of the migrating IAB node and the other concerned IAB nodes, possibly unintentionally triggering re-establishments or cell re-selections (for IDLE/INACTIVE UEs/MTs).

DETAILED DESCRIPTION

Figure 1A:
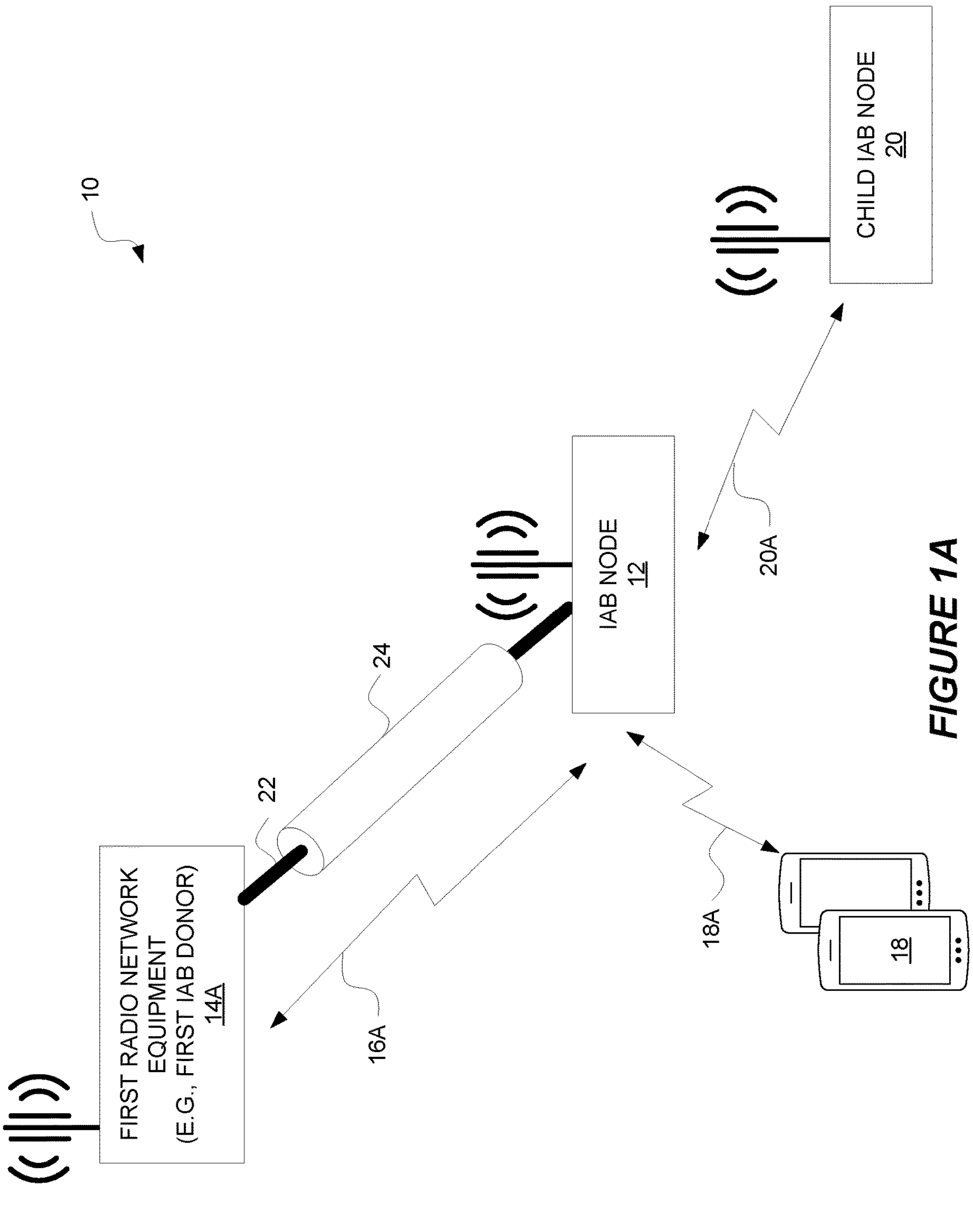
FIG. 1A is a block diagram of a wireless communication network before control plane connection migration according to some embodiments.

FIG. 1A shows a wireless communication network 10 according to some embodiments. The network 10 includes an integrated access backhaul (IAB) node 12 that is served by first radio network equipment 14A over a wireless backhaul 16A. The first radio network node 14A may for example be a first IAB donor. The IAB node 12 may in turn serve one or more wireless devices 18 over a radio interface 18A and/or one or more child IAB nodes 20 over a further wireless backhaul 20A. These wireless device(s) 18 and/or child IAB node(s) 20 are referred to as child node(s) of the IAB node 12.

As shown, the IAB node 12 has a control plane connection 22 (e.g., a radio resource control, RRC, connection) with the first radio network equipment 14A. A radio network layer application protocol connection 24 also exists between the IAB node 12 and the first radio network equipment 14A. The radio network layer application protocol connection 24 may for instance support a control plane connection (e.g., an RRC connection) between the first radio network equipment 14A and a child node served by the IAB node 12. In some embodiments, the radio network layer application protocol connection 24 may support this control plane connection for a child node in the sense that the radio network layer application protocol connection 24 provides a lower layer or underlying connection over which control plane messages for the control plane connection may be delivered, e.g., via tunneling or layer 2 forwarding. In these and other embodiments, for example, the radio network layer application protocol connection 24 may be a logical connection and/or an F1 connection as described herein.

Figure 1B:
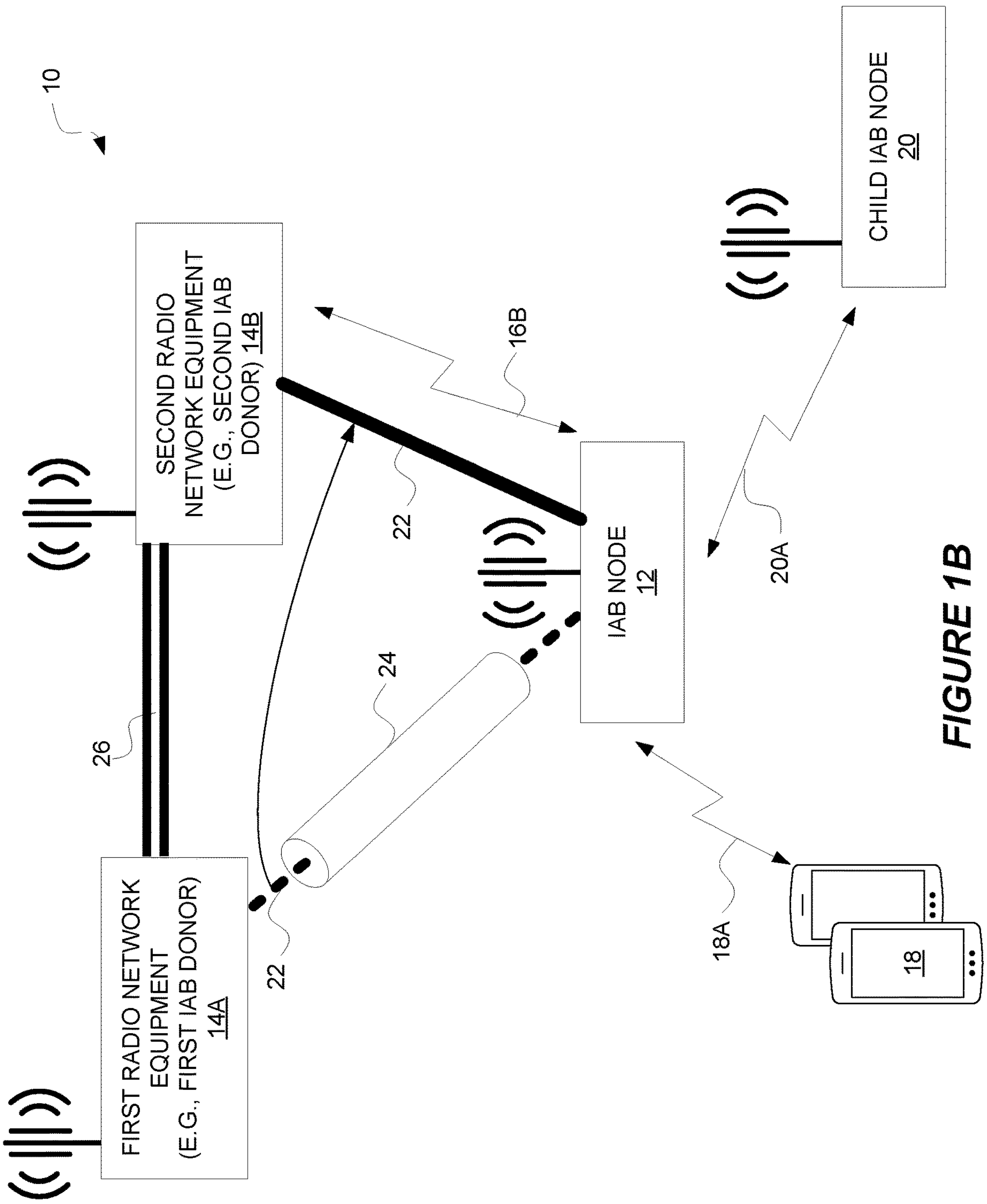
FIG. 1B is a block diagram of a wireless communication network after control plane connection migration according to some embodiments.

According to some embodiments, the IAB node 12 is configured to perform a migration (e.g., handover) to be served by different radio network equipment. FIG. 1B in this regard shows that the IAB node 12 migrates from the first radio network equipment 14A to the second radio network equipment 14B, e.g., in the sense that the equipment serving the IAB node 12 changes from being the first radio network equipment 14A to being the second radio network equipment 14B. According to embodiments herein, such migration involves the migration of the IAB node's control plane connection 22 from the first radio network equipment 14A to the second radio network equipment 14B, as shown. Notably, though, despite the migration of the control plane connection 22, embodiments herein nonetheless maintain (i.e., keep) the radio network layer application protocol connection 24 between the IAB node 12 and the first radio network equipment 14A, at least temporarily. That is, the control plane connection 22 is migrated to the second radio network equipment 14B, but the radio network layer application protocol connection 24 is not migrated, at least temporarily for some time after migration of the control plane connection 22. FIG. 1B in this regard shows that the radio network layer application protocol connection 24 is maintained as the same connection, at least in a logical sense. This may be the case even if the actual traffic path of the connection 24 now traverses the second radio network equipment 14B post-migration. Regardless, the migration of the control plane connection 22 without the accompanying migration of the radio network layer application protocol connection 24 means that the radio network layer application protocol connection 24 between the IAB node 12 and the first radio network equipment 14A continues to support the control plane connection(s) for the IAB node's child node(s) even after migration of the IAB node's own control plane connection 22 to the second radio network equipment 14B.

In this regard, one or more control plane messages may be transmitted over the migrated control plane connection 22 between the IAB node 12 and the second radio network equipment 14B. Notably, post migration, such control plane message(s) are transmitted over the control plane connection 22 and an interface 26 between the first and second radio network equipments 14A, 14B, in order to support the radio network layer application protocol connection 24 maintained between the IAB node 12 and the first radio network equipment 14A. The second radio network equipment 14B in this regard effectively relays the control plane message(s) between the IAB node 12 and the first radio network equipment 14A as endpoints.

For example, in some embodiments, radio network layer application protocol messages for the radio network layer application protocol connection 24 are tunneled over the migrated control plane connection 22 and the interface 26. In such embodiments, the IAB node 12 may transmit a radio network layer application protocol message for the radio network layer application protocol connection 24 by encapsulating the radio network layer application protocol message in a control plane message and transmitting that control plane message over the migrated control plane connection 22. The second radio network equipment 14B may correspondingly receive the control plane message, de-encapsulate the radio network layer application protocol message, and transmit the de-encapsulated radio network layer application protocol message over the interface 26 to the first radio network equipment 14A.

Conversely, the first radio network equipment 14A may transmit a radio network layer application protocol message for the radio network layer application protocol connection 24 by transmitting the radio network layer application protocol message over the interface 26. The second radio network equipment 14B may then encapsulate the radio network layer application protocol message in a control plane message and transmit that control plane message over the migrated control plane connection 22. The IAB node 12 may correspondingly receive the control plane message, and de-encapsulate the radio network layer application protocol message.

In any event, migration may correspondingly avoid the creation of a new radio network layer application protocol connection 24 for the IAB node 12. Alternatively or additionally, this may mean that the IAB node 12 at least temporarily keeps using the same values for cell-specific parameters as it did before the migration, e.g., so as to avoid changing of parameter values. These and other embodiments may thereby advantageously help avoid service interruption and reduce signaling load.

In fact, in some embodiments, proxied migration extends to not only the IAB node's radio network layer application protocol connection but also any child node served by the IAB node 12. For example, in some embodiments pre-migration the IAB node 12 serves one or more child nodes, e.g., wireless device(s) 18 and/or child IAB node 10. After or upon migration of the IAB node 12 as described above, for at least one of the child nodes, a control plane connection between the child node and the first radio network equipment 14A is maintained at least temporarily. And, where the child node is a child IAB node, a radio network layer application protocol connection between the child node and the first radio network equipment 14A is also maintained at least temporarily. In this regard, then, the migration may be transparent to the child node and/or to the first radio network equipment 14A. These and other embodiments may thereby advantageously help avoid service interruption and reduce signaling load for the child node as well.

Note that FIGS. 1A-1B generally show the first radio network equipment 14A and the second radio network equipment 14B irrespective of whether or not a split architecture is employed. In some embodiments where a split architecture is employed, the connections 22, 24 may be terminated at certain units of the nodes shown.

Figure 2:
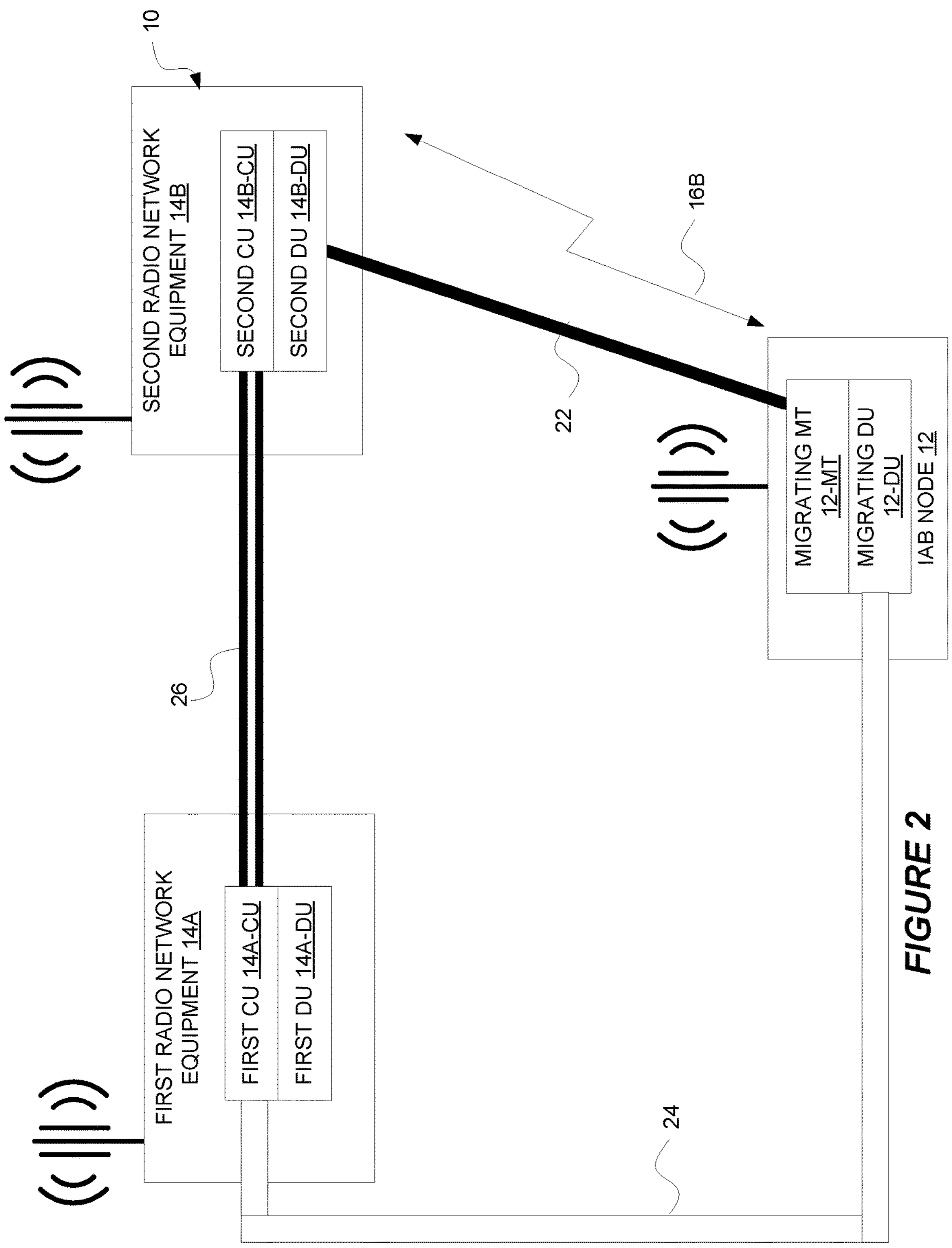
FIG. 2 is a block diagram of a wireless communication network after control plane connection migration according to some embodiments for a split architecture.

FIG. 2 for example shows the connections 22, 24 post migration in a split architecture. In such an architecture, the first radio network equipment 14A comprises a first distributed unit (DU) 14A-DU and a first central unit (CU) 14A-CU that controls the first DU 14A-DU. Similarly, the second radio network equipment 14B comprises a second DU 14B-DU and a second CU 14B-CU that controls the second DU 14B-DU. In some embodiments, the IAB node 12 itself comprises a migrating DU 12-DU and a migrating mobile termination (MT) 12-MT. In these and other embodiments, then, proxied migration comprises migrating a control plane connection 22 of the migrating MT 12-MT from the first CU 14A-CU of the first radio network equipment 14A to the second CU 14B-CU of the second radio network equipment 14B. And maintaining the radio network layer application protocol connection 24 comprises at least temporarily maintaining a radio network layer application protocol connection 24 between the migrating DU 12-DU and the first CU 14A-CU of the first radio network equipment 14A.

Regardless of the split or non-split nature of the architecture, though, in some embodiments the maintenance of the radio network layer application protocol connection 24 is temporary in duration, e.g., in the sense that the connection 24 is intentionally migrated at some point in time after the migration of the control plane connection 22. In one or more embodiments, for example, a timer at the IAB node 12 and/or the first radio network equipment 14A is started upon migrating the control plane connection 22. While the timer is running, the radio network layer application protocol connection 24 is maintained. But, responsive to expiration of the timer, the radio network layer application protocol connection 24 is migrated to the second radio network equipment 14B.

Alternatively, in other embodiments, the IAB node 12 or the first radio network equipment 14A may decide whether and/or when to migrate the radio network layer application protocol connection 24 to the second radio network equipment 14A. Such decision may for instance be based on an amount of and/or type of traffic communicated on the radio network layer application protocol connection 24, an amount of and/or type of wireless devices supported by the radio network layer application protocol connection 24, and/or an amount of and/or type of bearers of a certain quality of service profile supported by the radio network layer application protocol connection 24.

Figure 3:
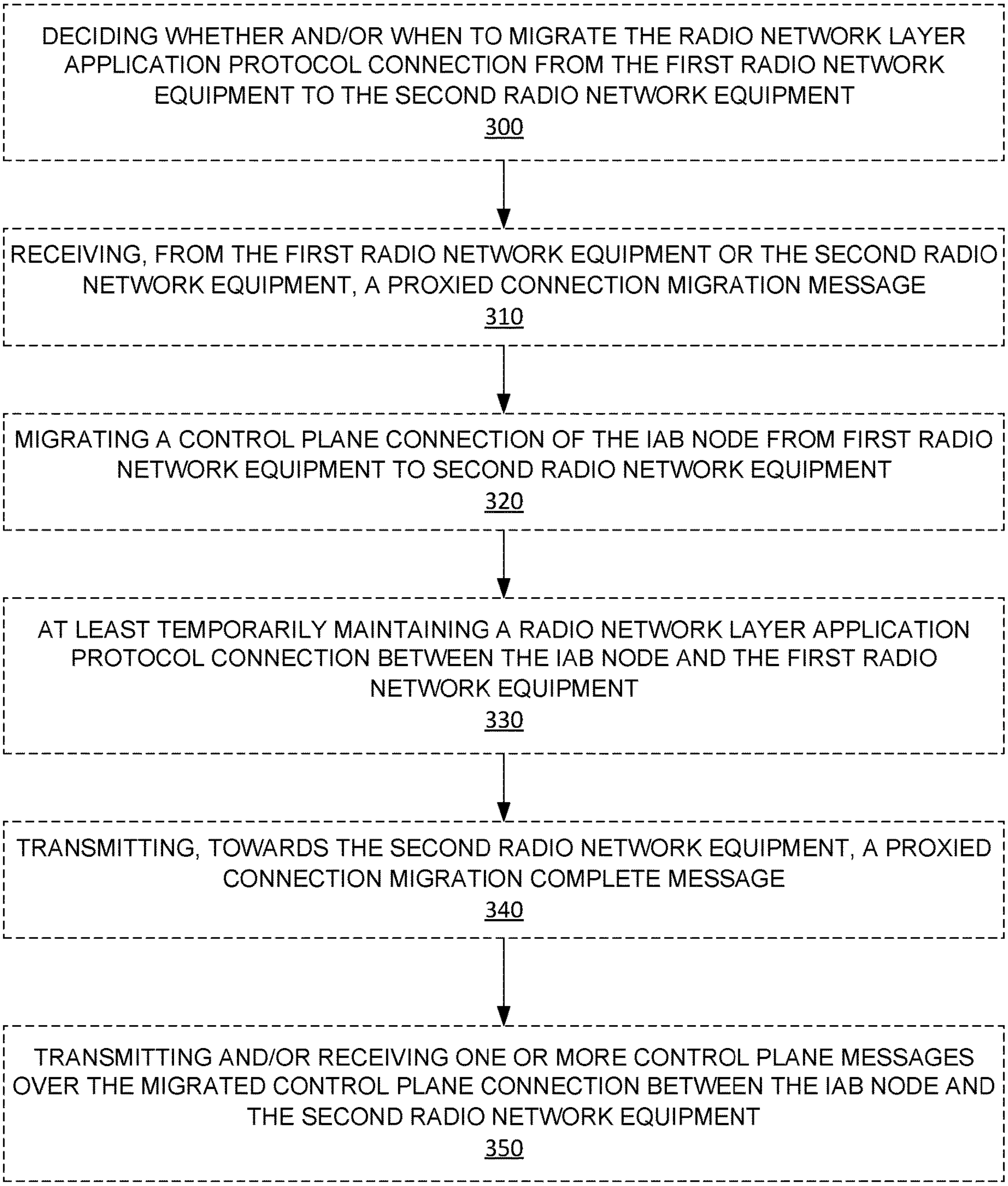
FIG. 3 is a logic flow diagram of a method performed by an IAB node according to some embodiments.

In view of the modifications and variations herein, FIG. 3 depicts a method performed by an integrated access backhaul, IAB, node 12 in accordance with particular embodiments. The method comprises migrating a control plane connection 22 of the IAB node from first radio network equipment 14A to second radio network equipment 14B (320). The method further comprises, after migrating the control plane connection 22, at least temporarily maintaining a radio network layer application protocol connection 24 between the IAB node 12 and the first radio network equipment 14A (Block 330).

In some embodiments, the method further comprises transmitting and/or receiving one or more control plane messages over the migrated control plane connection 22 between the IAB node 12 and the second radio network equipment 14B (Block 350).

In some embodiments, the method further comprises, before migrating the control plane connection 22, serving a cell using certain values for cell-specific parameters, and after migrating the control plane connection 22, at least temporarily serving the cell using the same certain values for the cell-specific parameters.

In some embodiments, the method further comprises starting a timer upon migrating the control plane connection 22, maintaining the radio network layer application protocol connection 24 between the IAB node 12 and the first radio network equipment 14A while the timer is running, and responsive to expiration of the timer, migrating the radio network layer application protocol connection 24 from the first radio network equipment 14A to the second radio network equipment 14B.

In some embodiments, the method further comprises deciding whether and/or when to migrate the radio network layer application protocol connection 24 from the first radio network equipment 14A to the second radio network equipment 14B based on at least one of any one or more of an amount of and/or type of traffic communicated on the radio network layer application protocol connection 24, an amount of and/or type of wireless devices supported by the radio network layer application protocol connection 24, and an amount of and/or type of bearers of a certain quality of service profile supported by the radio network layer application protocol connection 24.

In some embodiments, the first radio network equipment 14A comprises a first IAB donor, and the second radio network equipment 14B comprises a second IAB donor.

In some embodiments, the first radio network equipment 14A comprises a first distributed unit 14A-DU and a first central unit 14A-CU that controls the first distributed unit 14A-DU, the second radio network equipment 14B comprises a second distributed unit 14B-DU and a second central unit 14B-CU that controls the second distributed unit 14B-DU, the IAB node 12 comprises a migrating distributed unit 12-DU and a migrating mobile termination 12-MT. In this case, migrating the control plane connection 22 comprises migrating a control plane connection 22 of the migrating mobile termination 12-MT from the first central unit 14A-CU of the first radio network equipment 14A to the second central unit 14B-CU of the second radio network equipment 14B, and maintaining the radio network layer application protocol connection 24 comprises at least temporarily maintaining a radio network layer application protocol connection 24 between the migrating distributed unit 12-DU and the first central unit 14A-CU of the first radio network equipment 14A.

In some embodiments, the control plane connection 22 is a Radio Resource Control, RRC, connection and the radio network layer application protocol connection 24 is an F1 connection.

In some embodiments, the method further comprises serving one or more child nodes, wherein the one or more child nodes include one or more child IAB nodes and/or one or more wireless devices. The method further comprises, after migrating, for at least one of the one or more child nodes, at least temporarily maintaining a control plane connection between the child node and the first radio network equipment 14A.

In some embodiments, the method further comprises receiving a proxied connection migration message from the first radio network equipment 14A or the second radio network equipment 14B (Block 310) and/or transmitting a proxied connection migration complete message towards the second radio network equipment 14B (Block 340). In this case, the proxied connection migration message indicates the IAB node 12 is to migrate the control plane connection 22 to the second radio network equipment 14B but at least temporarily maintain the radio network layer application protocol connection 24 between the IAB node 12 and the first radio network equipment 14A. Additionally or alternatively, the proxied connection migration message includes configuration information for configuring migration of the control plane connection 22 to the second radio network equipment 14B but at least temporary maintenance of the radio network layer application protocol connection 24 between the IAB node 12 and the first radio network equipment 14A. The proxied connection migration complete message indicates the IAB node 12 has migrated the control plane connection 22 to the second radio network equipment 14B but at least temporarily maintained the radio network layer application protocol connection 24 between the IAB node 12 and the first radio network equipment 14A.

In some embodiments, transmitting one or more control plane messages comprises encapsulating a radio network layer application protocol message for the radio network layer application protocol connection 24 in a control plane message and transmitting the control plane message over the migrated control plane connection 22. Additionally or alternatively, receiving one or more control plane messages comprises receiving a control plane message over the migrated control plane connection 22 and de-encapsulating a radio network layer application protocol message for the radio network layer application protocol connection 24 from the received control plane message.

In some embodiments, the radio network layer application protocol connection 24 supports a control plane connection between the first radio network equipment 14A and a child node served by the IAB node 12.

In some embodiments, the method further comprises, after migrating the control plane connection 22, transmitting and/or receiving one or more control plane messages over the radio network layer application protocol connection 24 maintained between the IAB node 12 and the first radio network equipment 14A. In this case, the one or more control plane messages may include a control plane message for a control plane connection between the first radio network equipment 14A and a child node served by the IAB node 12.

Figure 4:
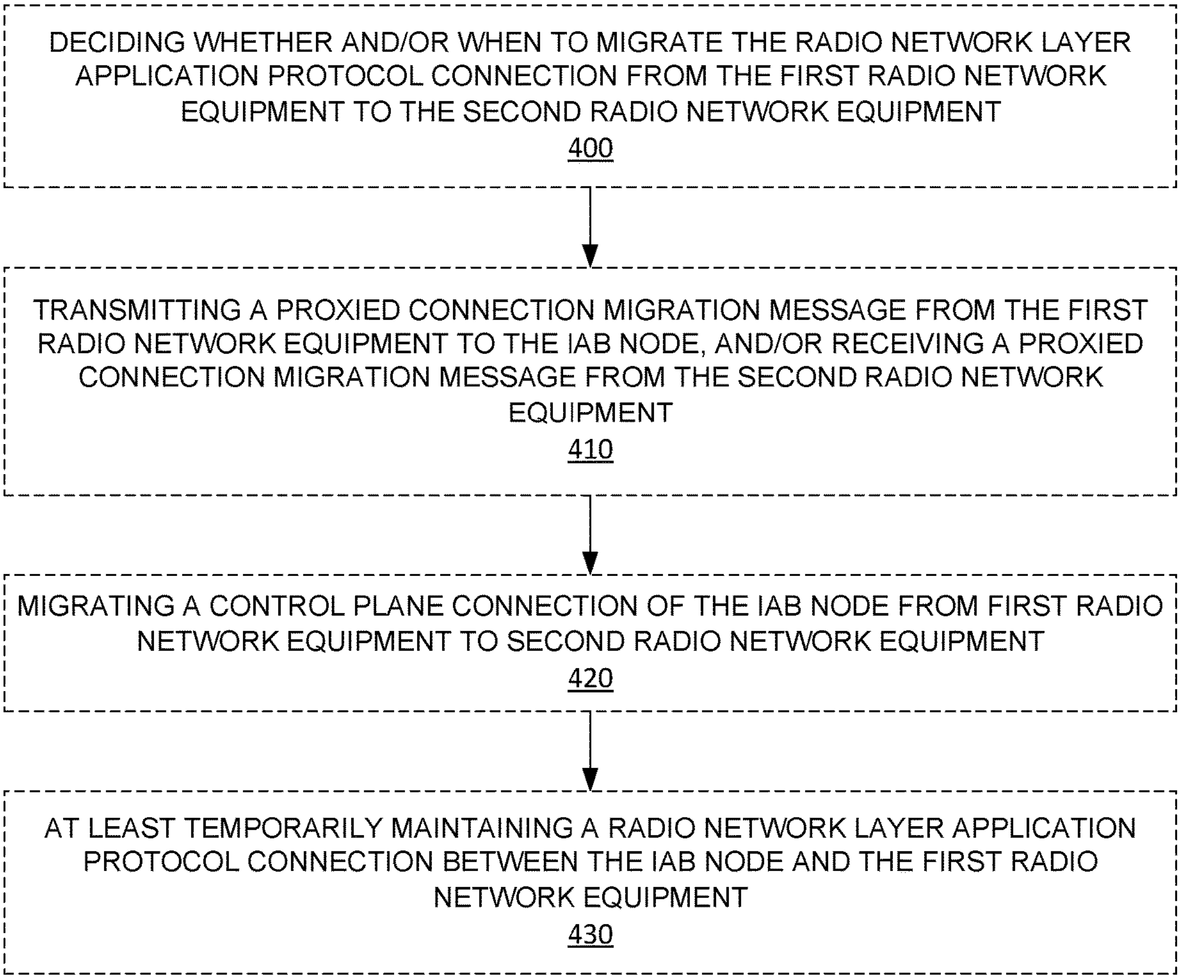
FIG. 4 is a logic flow diagram of a method performed by first radio network equipment according to some embodiments.

FIG. 4 depicts a method performed by first radio network equipment 14A in accordance with other particular embodiments. The method comprises migrating a control plane connection 22 of an IAB node 12 from the first radio network equipment 14A to second radio network equipment 14B (Block 420). The method further comprises, after migrating the control plane connection 22, at least temporarily maintaining a radio network layer application protocol connection 24 between the IAB node 12 and the first radio network equipment 14A (Block 430).

In some embodiments, the method further comprises deciding whether and/or when to migrate the radio network layer application protocol connection 24 from the first radio network equipment 14A to the second radio network equipment 14B (Block 400). The decision may be made for instance based on at least one of any one or more of: an amount of and/or type of traffic communicated on the radio network layer application protocol connection 24, an amount of and/or type of wireless devices supported by the radio network layer application protocol connection 24, and an amount of and/or type of bearers of a certain quality of service profile supported by the radio network layer application protocol connection 24.

In some embodiments, the first radio network equipment 14A comprises a first IAB donor, and the second radio network equipment 14B comprises a second IAB donor.

In some embodiments, the first radio network equipment 14A comprises a first distributed unit 14A-DU and a first central unit 14A-CU that controls the first distributed unit 14A-DU, the second radio network equipment 14B comprises a second distributed unit 14B-DU and a second central unit 14B-CU that controls the second distributed unit 14B-DU, and the IAB node 12 comprises a migrating distributed unit 12-DU and a migrating mobile termination 12-MT. In this case, migrating comprises migrating a control plane connection of the migrating mobile termination 12-MT from the first central unit 14A-CU of the first radio network equipment 14A to the second central unit 14B-CU of the second radio network equipment 14B, and maintaining comprises at least temporarily maintaining a radio network layer application protocol connection 24 between the migrating distributed unit 12-DU and the first central unit 14A-DU of the first radio network equipment 14A.

In some embodiments, the control plane connection 22 is a Radio Resource Control, RRC, connection and the radio network layer application protocol connection 24 is an F1 connection.

In some embodiments, the method further comprises, after migrating, for at least one of one or more child nodes of the IAB node 12, at least temporarily maintaining a control plane connection between the child node and the first radio network equipment 14A.

In some embodiments, the method further comprises transmitting and/or receiving a proxied connection migration message (Block 410). In this case, the proxied connection migration message indicates the IAB node 12 is to migrate the control plane connection 22 to the second radio network equipment 14B but at least temporarily maintain the radio network layer application protocol connection 24 between the IAB node 12 and the first radio network equipment 14A. Additionally or alternatively, the proxied connection migration message includes configuration information for configuring migration of the control plane connection 22 to the second radio network equipment 14B but at least temporary maintenance of the radio network layer application protocol connection 24 between the IAB node 12 and the first radio network equipment 14A.

In some embodiments, the method further comprises relaying a radio network layer application protocol message, for the radio network layer application protocol connection 24, between the IAB node 12 and the second radio network equipment 14B, via an interface 26 between the first radio network node 14A and the second radio network node 14B.

Figure 5:
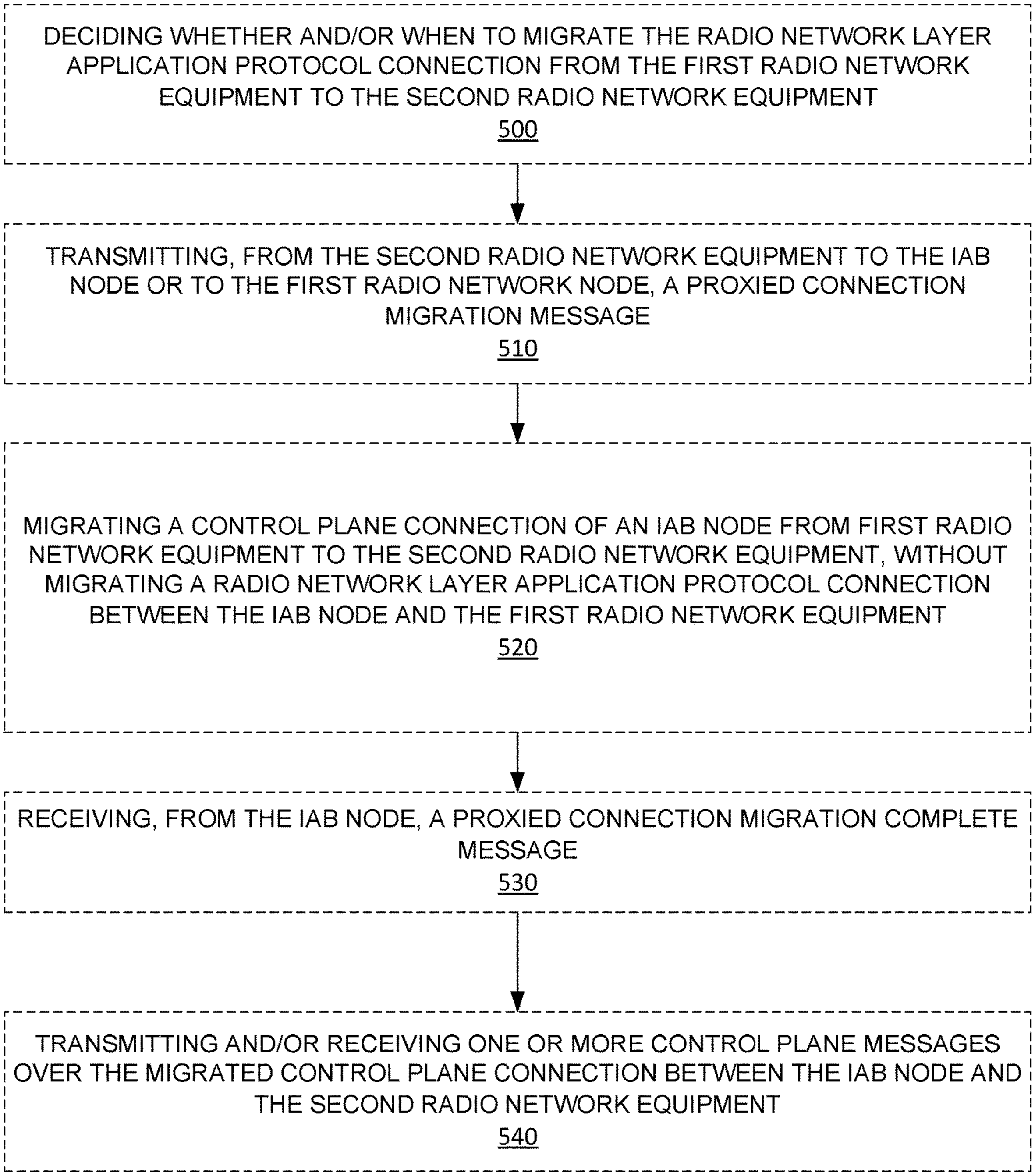
FIG. 5 is a logic flow diagram of a method performed by second radio network equipment according to some embodiments.

FIG. 5 depicts a method performed by second radio network equipment 14B in accordance with other particular embodiments. The method comprises migrating a control plane connection 22 of an IAB node 12 from first radio network equipment 14A to the second radio network equipment 14B, without migrating a radio network layer application protocol connection 24 between the IAB node 12 and the first radio network equipment 14A (Block 520).

In some embodiments, the first radio network equipment 14A comprises a first IAB donor, and the second radio network equipment 14B comprises a second IAB donor.

In some embodiments, the control plane connection 22 is a Radio Resource Control, RRC, connection, and the radio network layer application protocol connection 24 is an F1 connection.

In some embodiments, the method further comprises transmitting and/or receiving a proxied connection migration message (Block 510). The proxied connection migration message may indicate the IAB node 12 is to migrate the control plane connection 22 to the second radio network equipment 14B but at least temporarily maintain the radio network layer application protocol connection 24 between the IAB node 12 and the first radio network equipment 14A. Additionally or alternatively, the proxied connection migration message may include configuration information for configuring migration of the control plane connection 22 to the second radio network equipment 14B but at least temporary maintenance of the radio network layer application protocol connection 24 between the IAB node 12 and the first radio network equipment 14A.

In some embodiments, the method further comprises receiving, from the IAB node 12, a proxied connection migration complete message (Block 530). The proxied connection migration complete message may indicate the IAB node 12 has migrated the control plane connection 22 to the second radio network equipment 14B but at least temporarily maintained the radio network layer application protocol connection 24 between the IAB node 12 and the first radio network equipment 14A.

In some embodiments, the method further comprises deciding whether and/or when to migrate the radio network layer application protocol connection 24 from the first radio network equipment 14A to the second radio network equipment 14B (Block 500). The decision may be made for instance based on at least one of any one or more of: an amount of and/or type of traffic communicated on the radio network layer application protocol connection 24, an amount of and/or type of wireless devices supported by the radio network layer application protocol connection 24, and an amount of and/or type of bearers of a certain quality of service profile supported by the radio network layer application protocol connection 24.

Embodiments herein also include corresponding apparatuses. Embodiments herein for instance include an IAB node configured to perform any of the steps of any of the embodiments described above for the IAB node.

Embodiments also include an IAB node 12 comprising processing circuitry and power supply circuitry. The processing circuitry is configured to perform any of the steps of any of the embodiments described above for the IAB node 12. The power supply circuitry is configured to supply power to the IAB node 12.

Embodiments further include an IAB node 12 comprising processing circuitry. The processing circuitry is configured to perform any of the steps of any of the embodiments described above for the IAB node 12. In some embodiments, the IAB node 12 further comprises communication circuitry.

Embodiments further include an IAB node 12 comprising processing circuitry and memory. The memory contains instructions executable by the processing circuitry whereby the IAB node 12 is configured to perform any of the steps of any of the embodiments described above for the IAB node 12.

Embodiments herein also include radio network equipment configured to perform any of the steps of any of the embodiments described above for the first radio network equipment 14A or the second radio network equipment 14B.

Embodiments also include radio network equipment comprising processing circuitry and power supply circuitry. The processing circuitry is configured to perform any of the steps of any of the embodiments described above for the first radio network equipment 14A or the second radio network equipment 14B. The power supply circuitry is configured to supply power to the radio network equipment.

Embodiments further include radio network equipment comprising processing circuitry. The processing circuitry is configured to perform any of the steps of any of the embodiments described above for the first radio network equipment 14A or the second radio network equipment 14B. In some embodiments, the radio network equipment further comprises communication circuitry.

Embodiments further include radio network equipment comprising processing circuitry and memory. The memory contains instructions executable by the processing circuitry whereby the radio network equipment is configured to perform any of the steps of any of the embodiments described above for the first radio network equipment 14A or the second radio network equipment 14B.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 6:
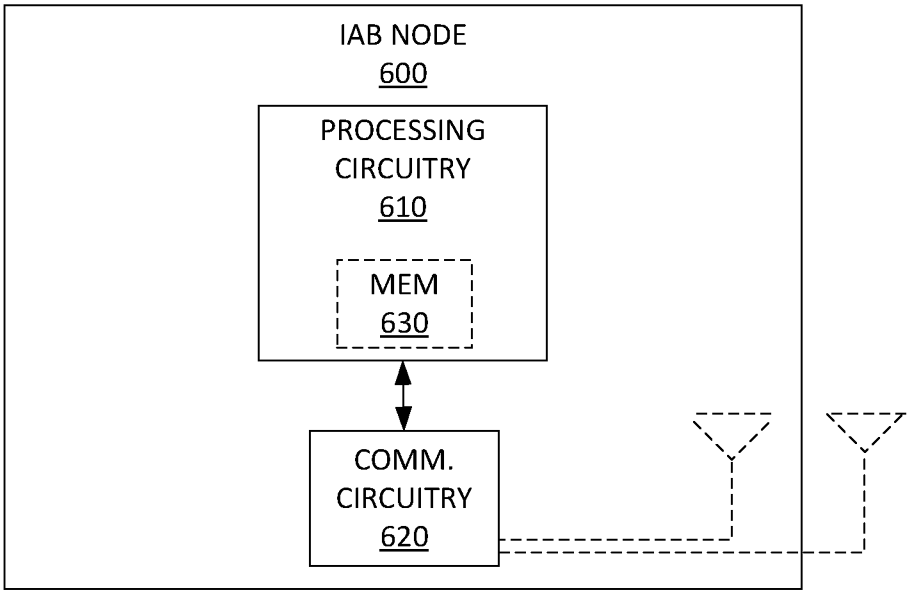
FIG. 6 is a block diagram of an IAB node according to some embodiments.

FIG. 6 for example illustrates an IAB node 12 as implemented in accordance with one or more embodiments. As shown, the IAB node 12 includes processing circuitry 610 and communication circuitry 620. The communication circuitry 620 (e.g., radio circuitry) is configured to transmit and/or receive information to and/or from one or more other nodes, e.g., via any communication technology. Such communication may occur via one or more antennas that are either internal or external to the IAB node 12. The processing circuitry 610 is configured to perform processing described above, e.g., in FIG. 3, such as by executing instructions stored in memory 630. The processing circuitry 610 in this regard may implement certain functional means, units, or modules. Note though that the IAB node 600 may be distributed in some embodiments between a central unit (CU) and one or more distributed units (DUs), such that the processing circuitry 610, the memory 630, and/or the communication circuitry 620 shown may be implemented at both the CU and DU(s) or otherwise distributed therebetween.

Figure 7:
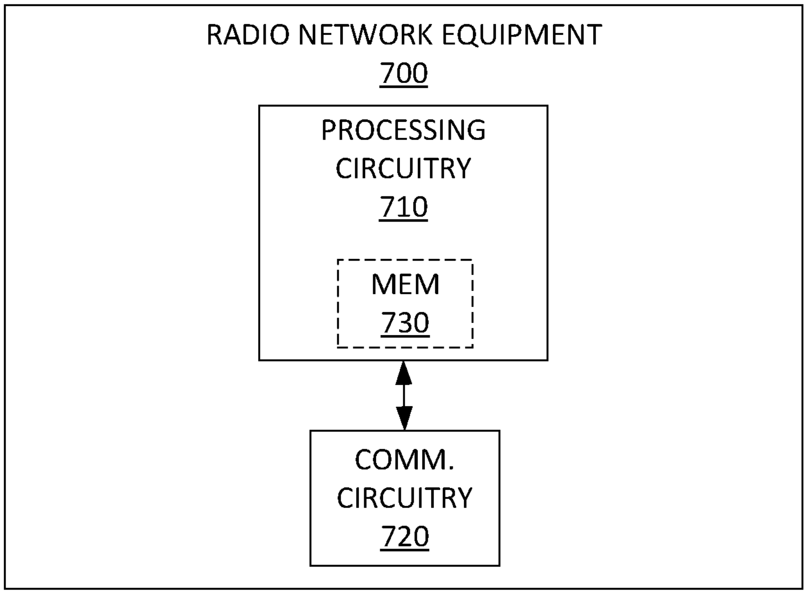
FIG. 7 is a block diagram of radio network equipment according to some embodiments.

FIG. 7 illustrates radio network equipment 700 as implemented in accordance with one or more embodiments. The radio network equipment 700 may for instance be or correspond to the first radio network equipment 14A or the second radio network equipment 14B. As shown, the radio network equipment 700 includes processing circuitry 710 and communication circuitry 720. The communication circuitry 720 is configured to transmit and/or receive information to and/or from one or more other nodes, e.g., via any communication technology. The processing circuitry 710 is configured to perform processing described above, e.g., in FIG. 4 or FIG. 5, such as by executing instructions stored in memory 730. The processing circuitry 710 in this regard may implement certain functional means, units, or modules. Note though that the radio network equipment 700 may be distributed in some embodiments between a central unit (CU) and one or more distributed units (DUs), such that the processing circuitry 710, the memory 730, and/or the communication circuitry 720 shown may be implemented at both the CU and DU(s) or otherwise distributed therebetween.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Some embodiments herein are applicable in the context of integrated access and wireless access backhaul, e.g., in New Radio (NR) (IAB) in Rel-16 (See 3GPP RP-182882). One or more such embodiments will now be exemplified in a context of an IAB network with a split architecture (CU and DU split), where the migrated control plane connection 22 is an RRC connection, and the radio network layer application protocol connection 24 is an F1 connection.

In this regard, the usage of short range mmWave spectrum in NR creates a need for densified deployment with multi-hop backhauling. However, optical fiber to every base station will be too costly and sometimes not even possible (e.g. historical sites). The main IAB principle is the use of wireless links for the backhaul (instead of fiber) to enable flexible and very dense deployment of cells without the need for densifying the transport network. Use case scenarios for IAB can include coverage extension, deployment of massive number of small cells and fixed wireless access (FWA) (e.g. to residential/office buildings). The larger bandwidth available for NR in mmWave spectrum provides opportunity for self-backhauling, without limiting the spectrum to be used for the access links. On top of that, the inherent multi-beam and multiple-input multiple-output (MIMO) support in NR reduces cross-link interference between backhaul and access links allowing higher densification.

An IAB network may leverage the Central Unit (CU)/Distributed Unit (DU) split architecture of NR, where the IAB node will be hosting a DU part that is controlled by a central unit. The IAB nodes also have a Mobile Termination (MT) part that they use to communicate with their parent nodes.

IAB may reuse existing functions and interfaces defined in NR. In particular, MT, gNB-DU, gNB-CU, User Plane Function (UPF), Access and Mobility Function (AMF) and Session Management Function (SMF) as well as the corresponding interfaces NR Uu (between MT and gNB), F1, NG, X2 and N4 are used as baseline for the IAB architectures. Additionally, functionality such as multi-hop forwarding is included in the architecture.

The Mobile-Termination (MT) function is a component of the IAB node. MT is referred to as a function residing on an IAB-node that terminates the radio interface layers of the backhaul Uu interface toward the IAB-donor or other IAB-nodes.

Figure 8:
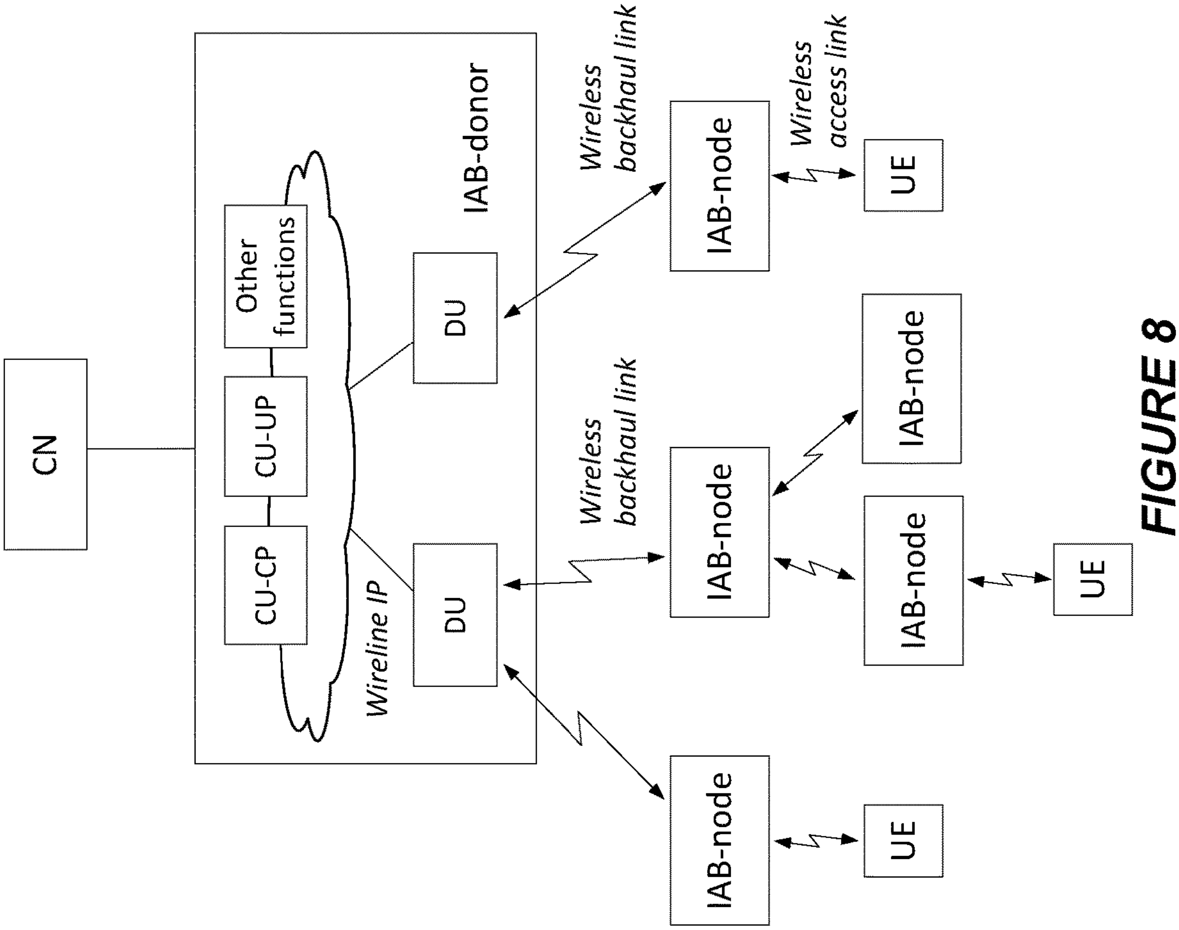
FIG. 8 is a block diagram of IAB in standalone mode according to some embodiments.

FIG. 8 shows a reference diagram for IAB in standalone mode, which contains one IAB-donor and multiple IAB-nodes. The IAB-donor is treated as a single logical node that comprises a set of functions such as gNB-DU, gNB-CU-CP, gNB-CU-UP and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

FIG. 8 shows a high-level architectural view of an IAB network according to some embodiments.

Figure 9:
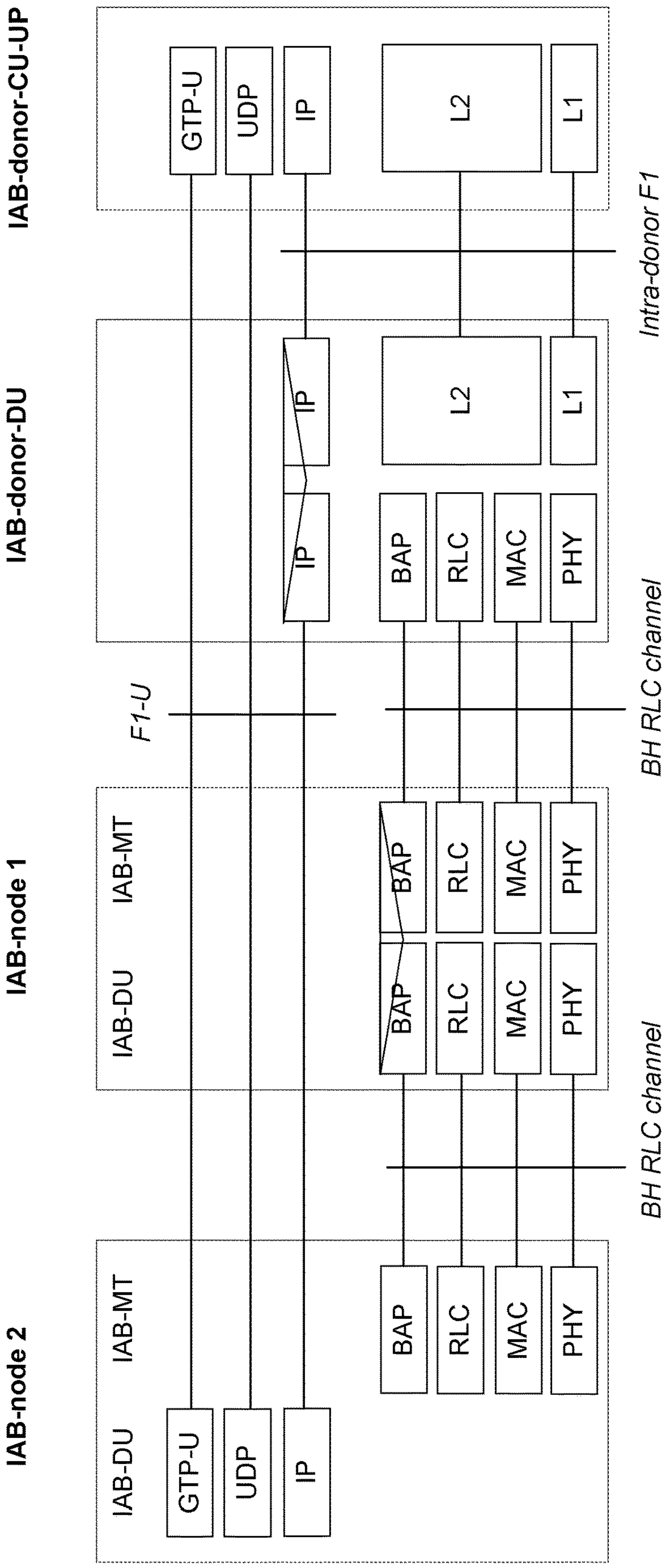
FIG. 9 is a block diagram of a baseline user plane protocol stack for IAB according to some embodiments.
Figure 10:
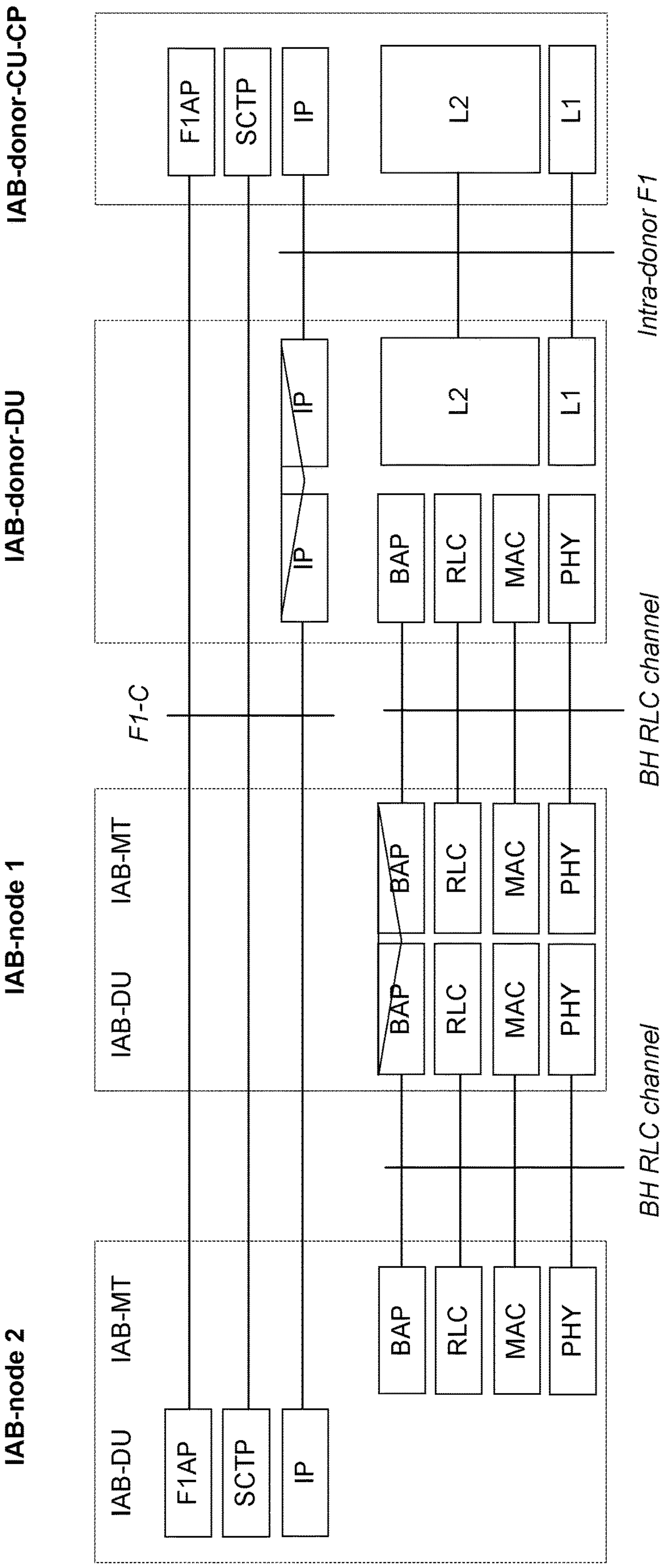
FIG. 10 is a block diagram of a baseline control plane protocol stack for IAB according to some embodiments.

The baseline user plane and control plane protocol stacks for IAB according to some embodiments are shown in FIGS. 9 and 10. FIG. 9 in particular shows the baseline user plane (UP) protocol stack for IAB in 3GPP rel-16. Here, GTP-U stands for the General Packet Radio System (GPRS) Tunneling Protocol (GTP) User Plane (GTP-U), UDP stands for the User Datagram Protocol, IP stands for the Internet Protocol (IP), BAP stands for the Backhaul Adaptation Protocol, RLC stands for the Radio Link Control protocol, MAC stands for the Medium Access Control protocol, PHY stands for the Physical layer, L1 stands for Layer 1, and L2 stands for Layer 2. FIG. 10 shows the baseline control plane (CP) protocol stack for IAB in 3GPP rel-16. Here, F1AP stands for the F1 Application Protocol, and SCTP stands for the Stream Control Transmission Protocol.

As shown, the chosen protocol stacks reuse the CU-DU split specification in rel-15, where the full user plane F1-U (GTP-U/UDP/IP) is terminated at the IAB node (like a normal DU) and the full control plane F1-C (F1-AP/SCTP/IP) is also terminated at the IAB node (like a normal DU). In the above cases, Network Domain Security (NDS) has been employed to protect both user plane (UP) and control plane (CP) traffic (IPsec in the case of UP, and Datagram Transport Layer Security, DTLS, in the case of CP). IPsec could also be used for the CP protection instead of DTLS (in this case no DTLS layer would be used).

A protocol layer called Backhaul Adaptation Protocol (BAP) in the IAB nodes and the IAB donor is used for routing of packets to the appropriate downstream/upstream node and also mapping the UE bearer data to the proper backhaul radio link control (RLC) channel (and also between ingress and egress backhaul RLC channels in intermediate IAB nodes) to satisfy the end to end quality of service (QoS) requirements of bearers.

On the IAB-node, the BAP sublayer according to some embodiments contains one BAP entity at the MT function and a separate collocated BAP entity at the DU function. On the IAB-donor-DU, the BAP sublayer contains only one BAP entity. Each BAP entity has a transmitting part and a receiving part. The transmitting part of the BAP entity has a corresponding receiving part of a BAP entity at the IAB-node or IAB-donor-DU across the backhaul link.

Figure 11:
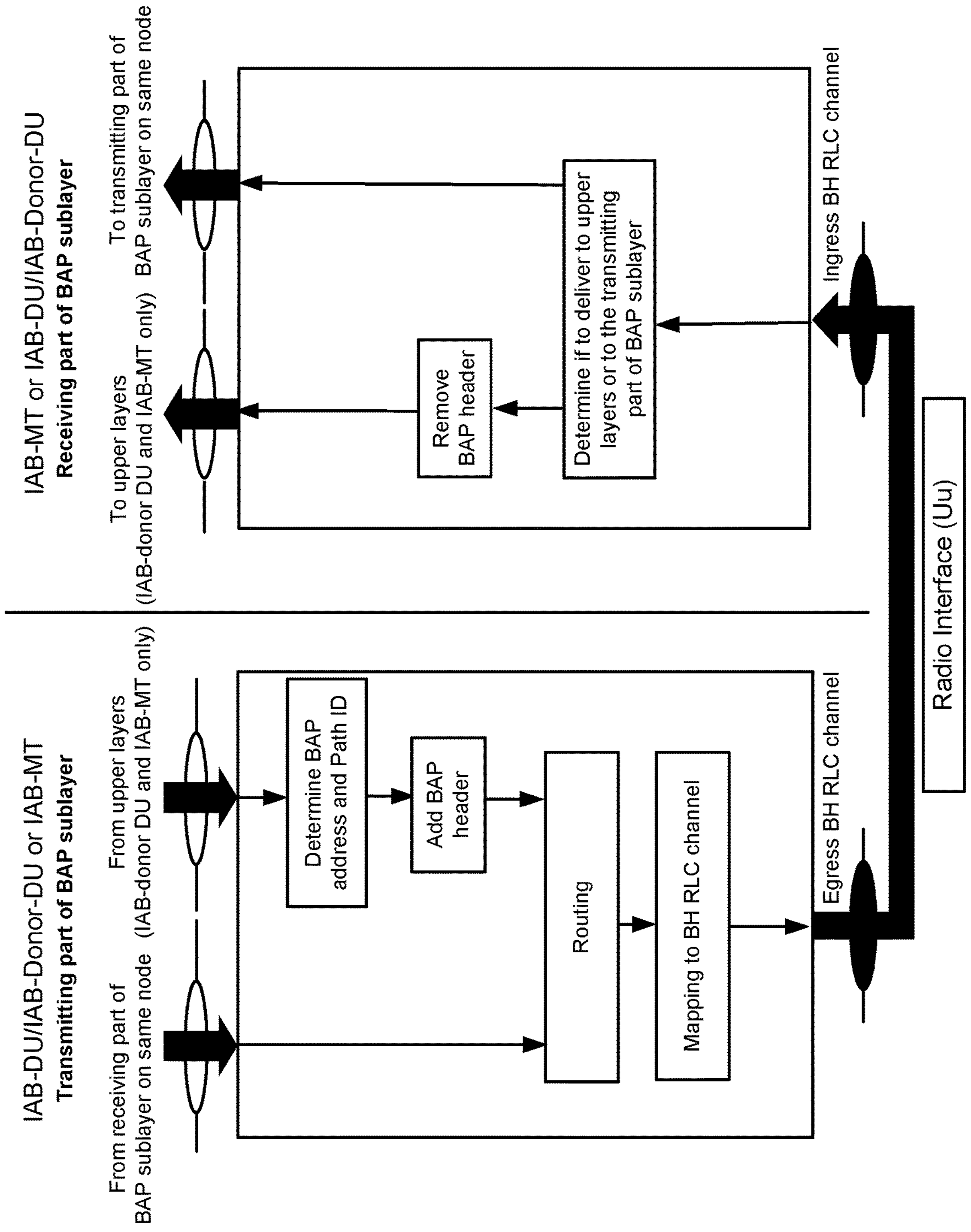
FIG. 11 is a block diagram of a functional view of a backhaul adaptation protocol sublayer according to some embodiments.

FIG. 11 shows one example of the functional view of the BAP sublayer according to some embodiments. In the example of FIG. 11, the receiving part on the BAP entity delivers BAP protocol data units (PDUs) to the transmitting part on the collocated BAP entity. Alternatively, the receiving part may deliver BAP service data units (SDUs) to the collocated transmitting part. When passing BAP SDUs, the receiving part removes the BAP header and the transmitting part adds the BAP header with the same BAP routing ID as carried on the BAP PDU header prior to removal. Passing BAP SDUs in this manner is therefore functionally equivalent to passing BAP PDUs, in implementation. 11

Data transfer is provided by the BAP sublayer to upper layers.

A BAP sublayer expects the following services from lower layers per RLC entity (for a detailed description see TS 38.322 v16.0.0): (i) acknowledged data transfer service; (ii) unacknowledged data transfer service.

The BAP sublayer supports the following functions: (i) Data transfer; (ii) Determination of BAP destination and path for packets from upper layers; (iii) Determination of egress BH RLC channels for packets routed to next hop; (iv) Routing of packets to next hop; (v) Differentiating traffic to be delivered to upper layers from traffic to be delivered to egress link; (vi) Flow control feedback and polling signaling.

Figure 12:
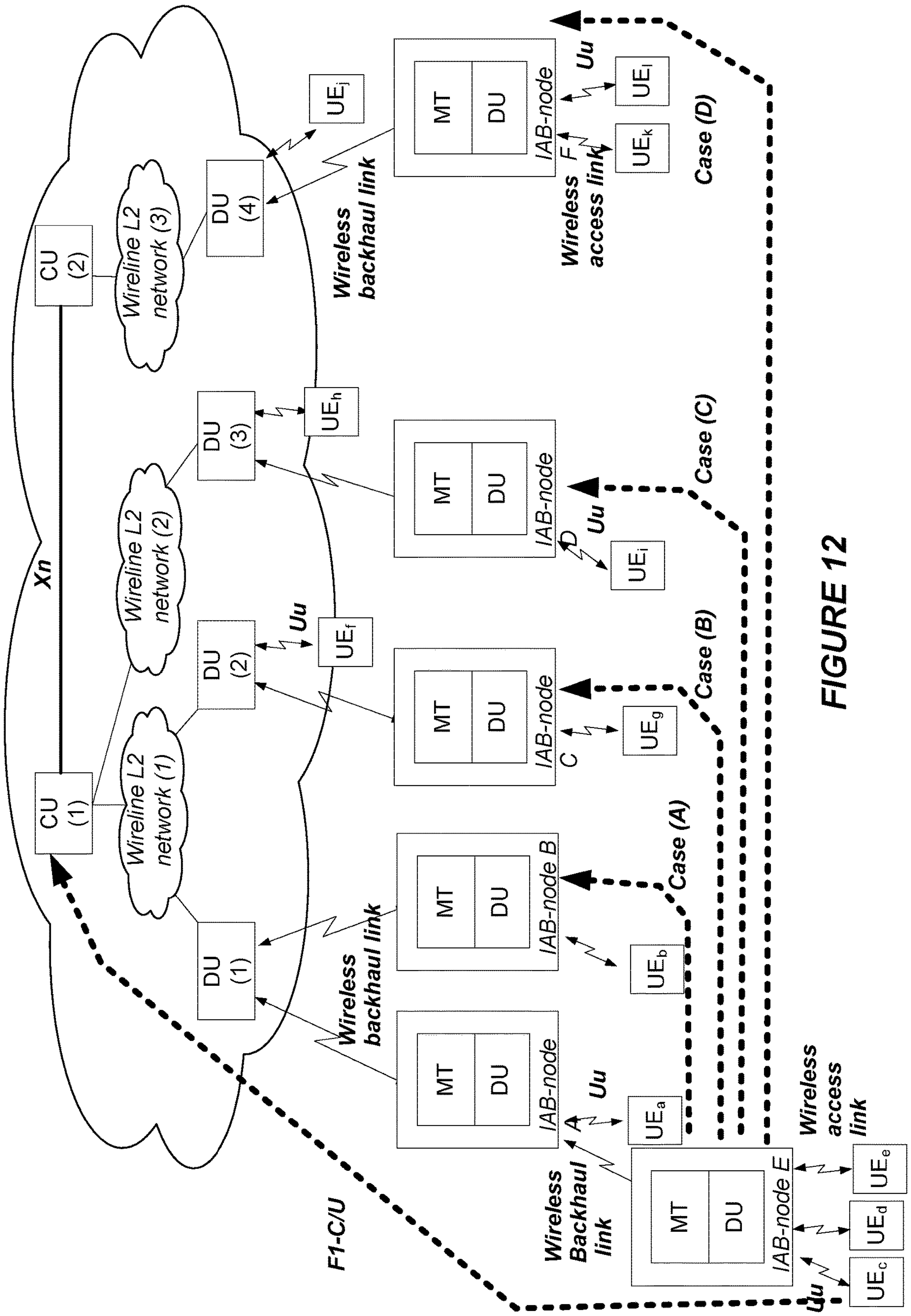
FIG. 12 is a block diagram of IAB-node migration cases according to some embodiments.

FIG. 12 shows an example of some possible IAB-node migration cases according to some embodiments, listed in the order of complexity and more details as follow:

Intra-CU Case (A): In this case the IAB-node (e) along with it serving UEs is moved to a new parent node (IAB-node (b)) under the same donor-DU (1). The successful intra-donor DU migration requires establishing UE context setup for the IAB-node (e) MT in the DU of the new parent node (IAB-node (b)), updating routing tables of IAB nodes along the path to IAB-node (e) and allocating resources on the new path. The IP address for IAB-node (e) will not change, while the F1-U tunnel/connection between donor-CU (1) and IAB-node (e) DU will be redirected through IAB-node (b).

Intra-CU Case (B): The procedural requirements/complexity of this case is the same as that of Case (A). Also, since the new IAB-donor DU (i.e. DU2) is connected to the same L2 network, the IAB-node (e) can use the same IP address under the new donor DU. However, the new donor DU (i.e. DU2) will need to inform the network using IAB-node (e) L2 address in order to get/keep the same IP address for IAB-node (e) by employing some mechanism such as Address Resolution Protocol (ARP).

Intra-CU Case (C): This case is more complex than Case (A) as it also needs allocation of new IP address for IAB-node (e). In case, IPsec is used for securing the F1-U tunnel/connection between the Donor-CU (1) and IAB-node (e) DU, then it might be possible to use existing IP address along the path segment between the Donor-CU (1) and Security Gateway (SeGW), and new IP address for the IPsec tunnel between SeGW and IAB-node (e) DU.

Inter-CU Case (D): This is the most complicated case in terms of procedural requirements and may needs new specification procedures (such as enhancement of RRC, F1AP, XnAP, Ng signaling) that are beyond the scope of 3GPP Rel-16.

Figure 13:
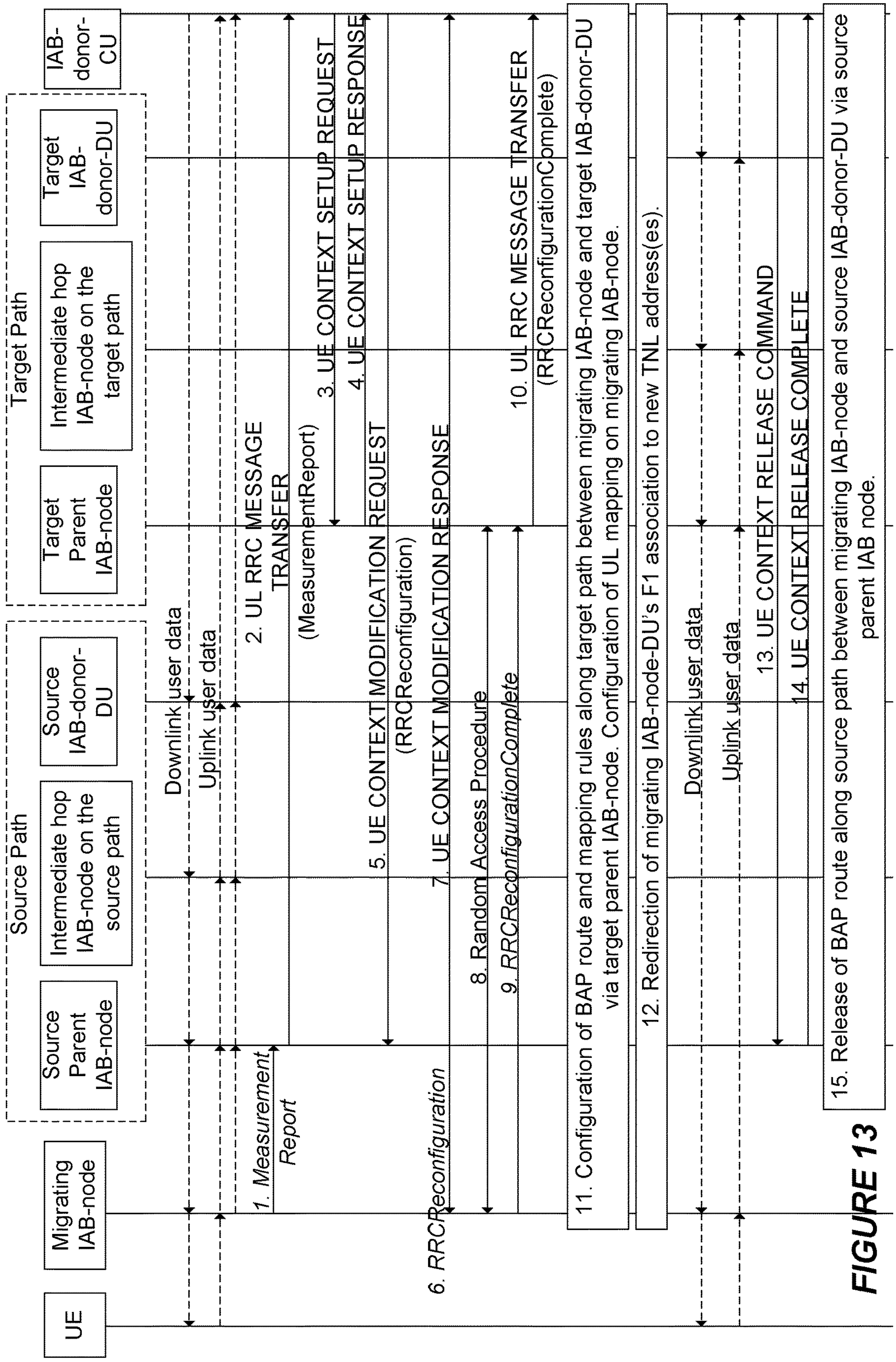
FIG. 13 is a call flow diagram of an intra-CU topology adaptation procedure according to some embodiments.

12During the intra-CU topology adaptation according to some embodiments, both the source and the target parent node are served by the same IAB-donor-CU. The target parent node may use a different IAB-donor-DU than the source parent node. The source path may further have common nodes with the target path. As a basis for the inter-CU case, FIG. 13 shows an example of the intra-CU topology adaptation procedure, where the target parent node uses a different IAB-donor-DU than the source parent node. 13

1. The migrating IAB-MT sends a Measurement Report message to the source parent node gNB-DU. This report is based on a Measurement Configuration the migrating IAB-MT received from the IAB-donor-CU before.

2. The source parent node gNB-DU sends an UL RRC MESSAGE TRANSFER message to the IAB-donor-CU to convey the received Measurement Report.

3. The IAB-donor-CU sends a UE CONTEXT SETUP REQUEST message to the target parent node gNB-DU to create the UE context for the migrating IAB-MT and setup one or more bearers. These bearers are used by the migrating IAB-MT for its own data and signalling traffic.

4. The target parent node gNB-DU responds to the IAB-donor-CU with a UE CONTEXT SETUP RESPONSE message.

5. The IAB-donor-CU sends a UE CONTEXT MODIFICATION REQUEST message to the source parent node gNB-DU, which includes a generated RRCReconfiguration message. The Transmission Action Indicator in the UE CONTEXT MODIFICATION REQUEST message indicates to stop the data transmission to the migrating IAB-node.

6. The source parent node gNB-DU forwards the received RRCReconfiguration message to the migrating IAB-MT.

7. The source parent node gNB-DU responds to the IAB-donor-CU with the UE CONTEXT MODIFICATION RESPONSE message.

8. A Random Access procedure is performed at the target parent node gNB-DU.

9. The migrating IAB-MT responds to the target parent node gNB-DU with an RRCReconfigurationComplete message.

10. The target parent node gNB-DU sends an UL RRC MESSAGE TRANSFER message to the IAB-donor-CU to convey the received RRCReconfigurationComplete message. Also, uplink packets can be sent from the migrating IAB-MT, which are forwarded to the IAB-donor-CU through the target parent node gNB-DU. These DL and UL packets belong to the MT's own signalling and data traffic.

11. The IAB-donor-CU configures BH RLC channels and BAP-layer route entries on the target path between migrating IAB-node and target IAB-donor-DU. This step also includes allocation of Transport Network Layer (TNL) address(es) that is (are) routable via the target IAB-donor-DU. These configurations may be performed at an earlier stage, e.g. right after step 3. The new TNL address(es) is (are) included in the RRCReconfiguration message at step 5.

12. All F1-U tunnels and F1-C are switched to use the migrating IAB-node's new TNL address(es).

13. The IAB-donor-CU sends a UE CONTEXT RELEASE COMMAND message to the source parent node gNB-DU.

14. The source parent node gNB-DU releases the migrating IAB-MT's context and responds the IAB-donor-CU with a UE CONTEXT RELEASE COMPLETE message.

15. The IAB-donor-CU releases BH RLC channels and BAP routing entries on the source path. The migrating IAB-node may further release the TNL address(es) it used on the source path.

NOTE: In case that the source route and target route have common nodes, the BH RLC channels and BAP routing entries of those nodes may not need to be released in Step 15.

NOTE: Steps 11, 12 and 15 also have to be performed for migrating the IAB-node's descendant nodes, as follows. The descendant nodes must also switch to new TNL addresses that are anchored in the target IAB-donor-DU. The IAB-donor-CU may send these addresses to the descendant nodes and release the old addresses via corresponding RRC signalling. If needed, the IAB-donor-CU configures BH RLC channels, BAP-layer route entries on the target path for the descendant nodes and the BH RLC Channel mappings on the descendant nodes in the same manner as described for the migrating IAB-node in step 11. The descendant nodes switch their F1-U and F1-C tunnels to new TNL addresses that are anchored at the new IAB-donor-DU, in the same manner as described for the migrating IAB-node in step 12. Based on implementation, these steps can be performed after or in parallel with the handover of the migrating IAB-node. In Rel-16, in-flight packets in UL direction that were dropped during the migration procedure may not be recoverable.

NOTE: In upstream direction, in-flight packets between the source parent node and the IAB-donor-CU can be delivered even after the target path is established.

NOTE: On-going downlink data in the source path may be discarded up to implementation.

NOTE: IAB-donor-CU can determine the unsuccessfully transmitted downlink data over the backhaul link by implementation.

In this context, some embodiments herein provide a new kind of inter-CU migration of an IAB node, henceforth referred to as proxied inter-CU migration. A proxied inter-CU migration is one example of a proxied migration with a split architecture. According to such a migration, the RRC (and UP, if any) connection/context of the MT of the migrating IAB node is relocated/handed-over to the target CU. The F1 connection of the DUs of the migrating IAB node and the IAB nodes directly/indirectly served by the migrating IAB node are kept at the source CU. The RRC (and UP, if any) context of the MTs of the IAB nodes directly/indirectly served by the migrating IAB node are kept at the source CU. The RRC (and UP, if any) contexts of the UEs that are directly/indirectly served by the migrating IAB node are kept at the source CU. These embodiments may thereby exemplify scenarios where the migrated control plane connection 22 from FIGS. 1A-1B is an RRC connection, and the radio network layer application protocol connection 24 from FIGS. 1A-1B is an F1 connection.

Figure 14:
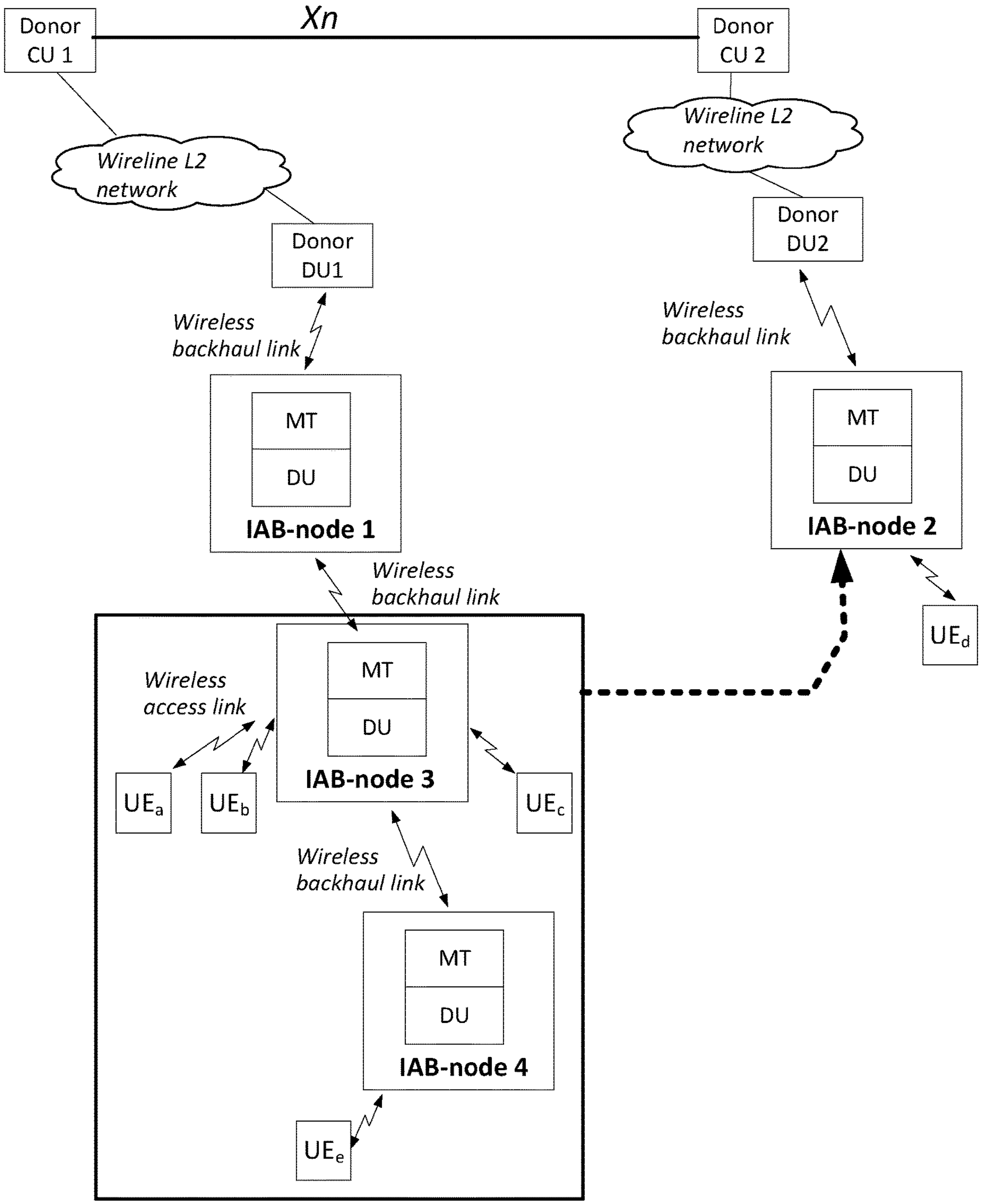
FIG. 14 is a block diagram of a proxied inter-CU migration scenario according to some embodiments.

FIG. 14 shows one example scenario for the proxied inter-CU migration of IAB-node 3 along with its children IAB nodes and connected UEs. According to the migration, the RRC connection/context of IAB-3-MT will be kept at CU2. The UP connection/context, if any, of IAB-3-MT (e.g. the IAB-3-MT has a Protocol Data Unit, PDU, session being used for Operation and Maintenance, OAM), will be kept at CU2. The F1 interface connections (both F1-U and F1-C) of IAB-3 and IAB-4 will be kept at CU1. The RRC connection/context of UEa, UEb, UEc, UEe and IAB-4-MT will be kept at CU1. The UP connection/context of UEa, UEb, UEc and UEe will be kept at CU1. And the UP connection/context of IAB-4-MT, if any, will be kept at CU1. In the embodiment of FIG. 14, therefore, IAB-node 3 exemplifies IAB node 12 of FIG. 1A-1B, Donor CU1/DU1 exemplifies the first radio network equipment 14A, and Donor CU2/DU2 exemplifies the second radio network equipment 14B.

14By contrast, directly applying the legacy handover principles for inter-CU migration would have resulted in relocation of all RRC/UP contexts of all the UEs and IAB-MTs to the target CU. Also, the F1-U and F1-C connections of all the IAB nodes would have been relocated/established towards the target CU.

Moving the RRC context of the migrating IAB node to the target CU is performed according to some embodiments because the IAB-3 MT will be connected to IAB-2's DU, which is being served by CU2. Thus, UP/CP traffic related to IAB-MT3 has to be sent via the F1-U/F1-C interface between the CU2 and IAB-2 DU (e.g. CU encapsulates RRC messages for IAB-3 MT in an F1-AP message towards IAB-2 DU).

Figure 15:
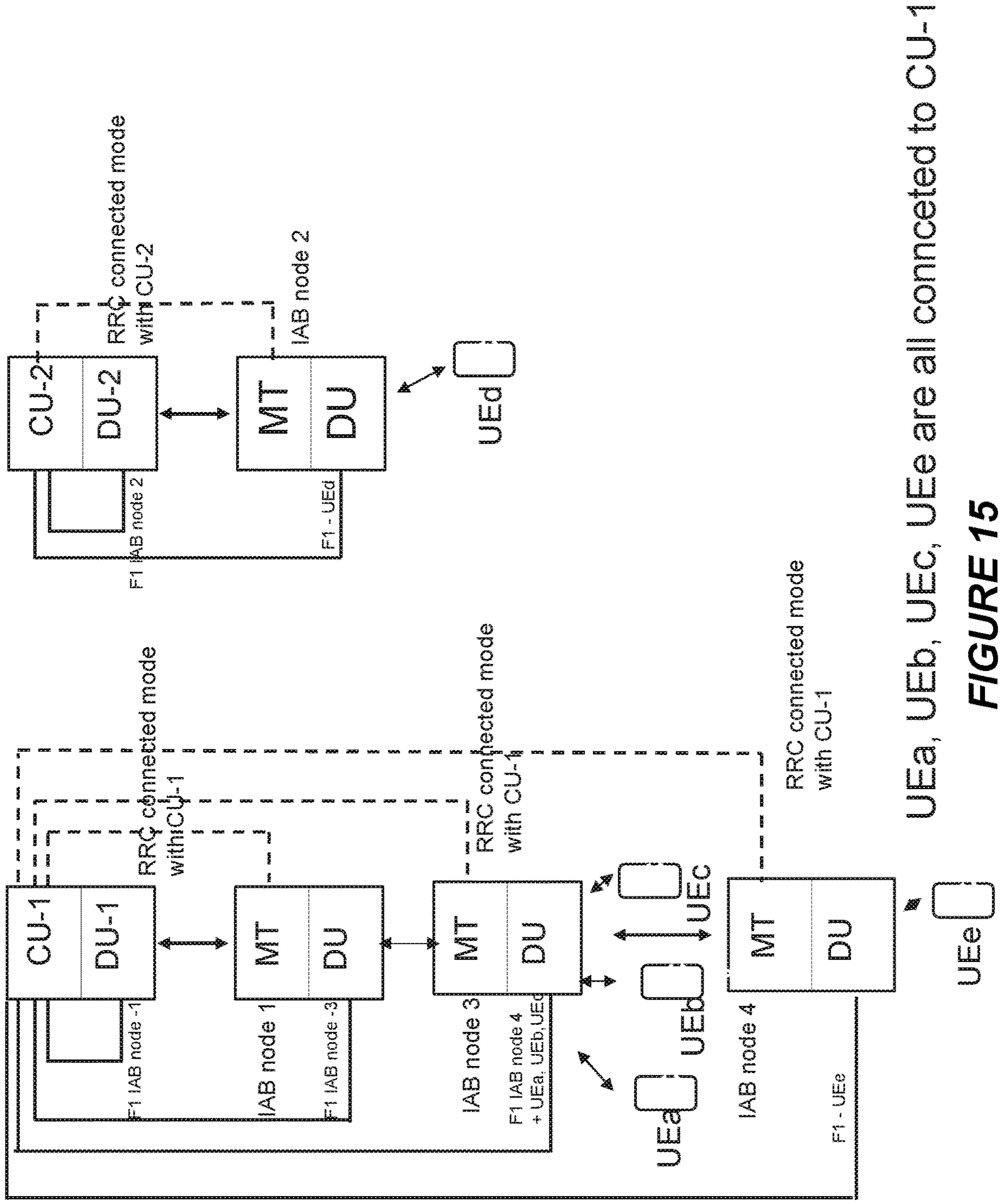
FIG. 15 is a block diagram of a proxied inter-CU migration according to some embodiments, illustrating the protocol stacks and signal flow when F1 connections are maintained in the CU-1 before the migration.
Figure 16:
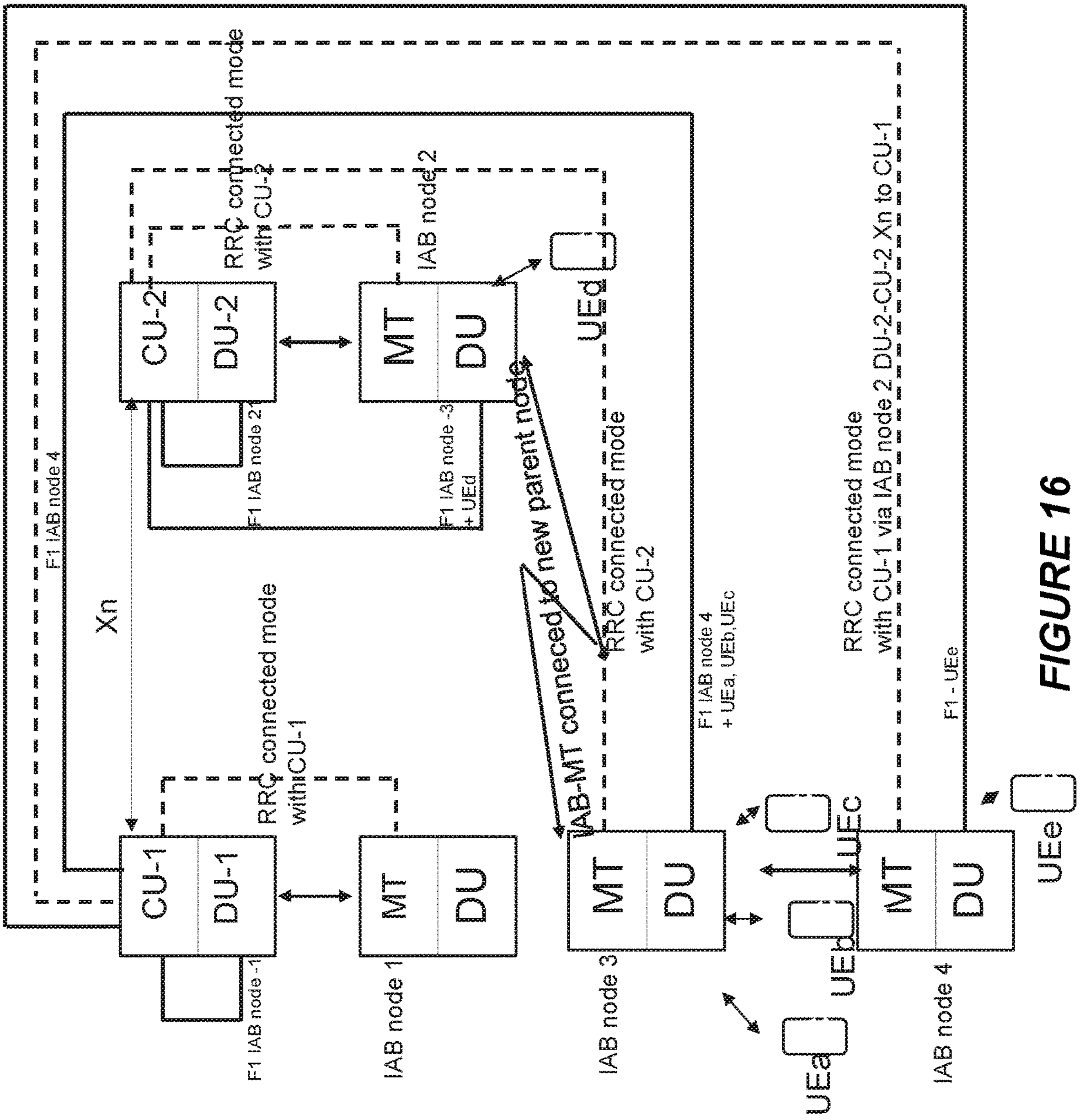
FIG. 16 is a block diagram of a proxied inter-CU migration according to some embodiments, illustrating the F1-U and/or F1-C traffic being tunnelled over the Xn and then transparently forwarded to the IAB donor-DU-2 after the IAB node is migrated to the target donor CU.

FIG. 15 illustrates the protocol stacks and signal flow when the F1 connections are maintained in the CU-1 (before the migration), while FIG. 16 highlights how the F1-U and/or F1-C traffic is tunnelled over the Xn and then transparently forwarded to the IAB donor-DU-2 after the IAB node is migrated to the target donor CU (i.e. CU2). Some embodiments thereby keep/maintain the F1 interface between the IAB-node3-DU and the Donor-CU1 even after migration of the IAB-node-3 to the Donor-CU2. As shown in FIG. 16, then, the traffic for this F1 connection (after migration) is forwarded via the Donor-CU2 from/to Donor-CU2 to/from IAB-node3-DU.

The F1 connection of the migrating IAB node (IAB-3 DU in FIG. 14) as well as all IAB-DUs directly/indirectly served by the migrating IAB node, (IAB-4 DU in FIG. 14) are with the source CU (CU1 in FIG. 14). One advantage of this approach is that the cell parameters served by the migrating IAB-DU and the other concerned DUs do not have to be changed. Normally, when a DU connects to a CU, it receives from the OAM a set of cell-specific parameters, and it is reasonable to expect that, if F1 connection of an IAB-DU would have been handed over to the new CU, the new cell configuration would have to be downloaded from the OAM, which could cause service interruption. Also, the operation of the UEs and IAB-MTs connected to the cells of the migrating IAB node and the other concerned IAB nodes (including UEs/MTs that are in IDLE/INACTIVE mode) would be impacted because change of cell specific parameters could mean system information update (e.g. CGI), unintentionally triggering re-establishments or cell re-selections (for IDLE/INACTIVE UEs/MTs). By keeping the F1 connection of the migrating IAB node as well as all IAB-DUs directly/indirectly served by the migrating IAB node with the source CU, some embodiments herein advantageously avoid or at least mitigate these issues.

Figure 17:
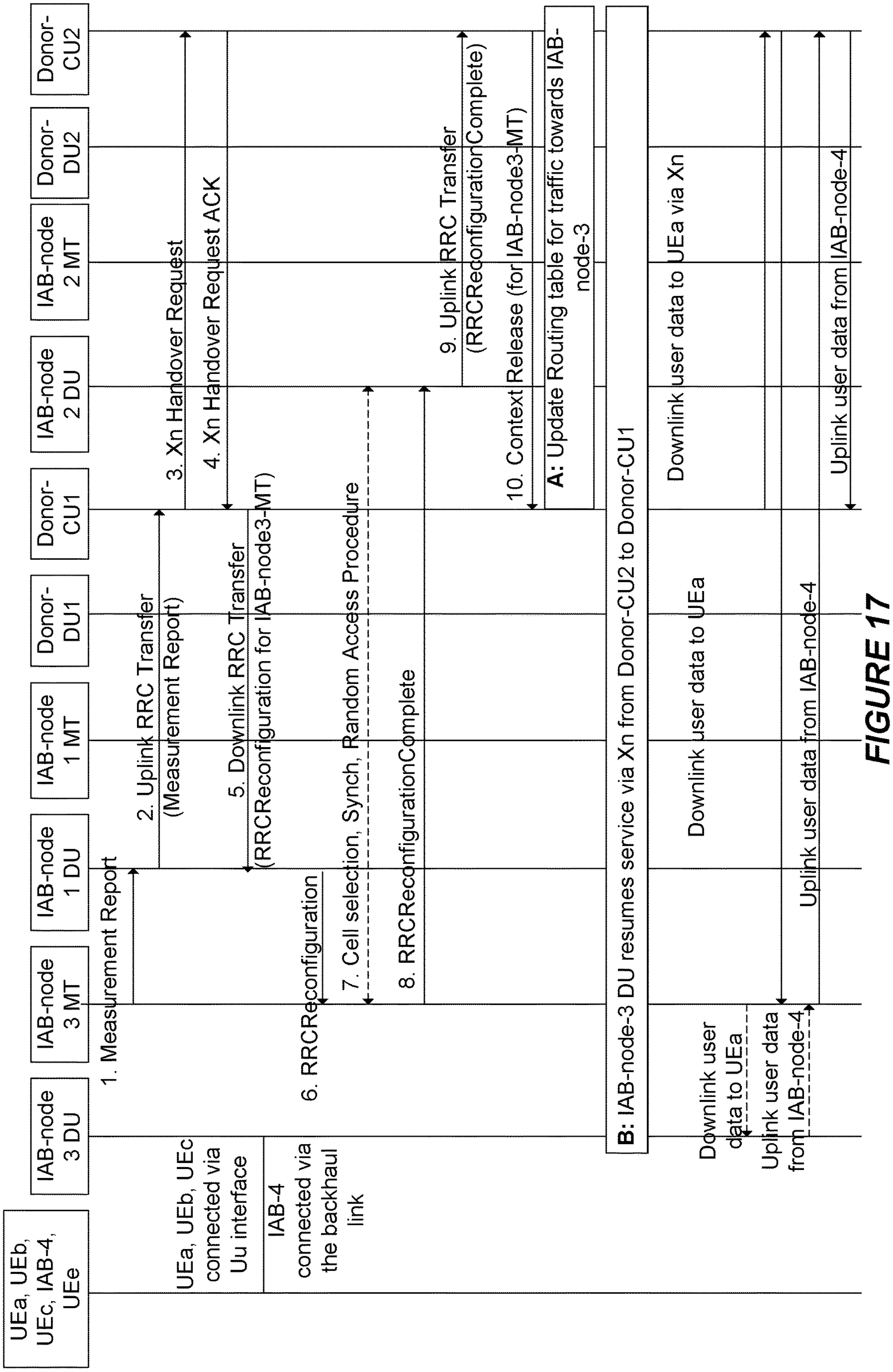
FIG. 17 is a call flow diagram of a proxied inter-CU migration according to some embodiments.

FIG. 17 shows one example embodiment of a proxied inter-CU migration according to some embodiments. FIG. 17 17exemplifies the first radio network equipment 14A from FIG. 1A-1B as Donor CU1 and Donor DU1, exemplifies the second radio network equipment 14B from FIG. 1A-1B as Donor CU2 and Donor DU2, and exemplifies IAB node 12 from FIG. 1A-1B as IAB-node3 DU and IAB-node 3 MT.

As shown in FIG. 17, for proxy CU migration, some embodiments update/enhance Msg 3, 4, 5, 8, and 9 that are sent in respective steps 3, 4, 5, 8, and 9 of the migration procedure. In particular, some embodiments update/enhance Msg 3, 4, 5, 8, and 9 by adding to those messages new information elements (IEs) that carry additional information required for the proxy-CU migration. The RRCReconfiguration for IAB-node3-MT in some embodiments is still generated by Donor-CU1 but contains new IEs. These new IEs will carry information that Donor-CU1 received from Donor-CU2 in Msg 4. Msg 4 in this regard may also be updated/enhanced with new IEs. These new IEs in the RRCReconfiguration Msg will enable IAB-node-3 to handover/migrate only the MT but keep the remaining connections (i.e., F1 for its DUs and its children IAB nodes). Next, the target node for migration is IAB-Donor-CU2 but IAB-node 2 DU will provide the access (for the MT part) and backhaul link (for the DU part) for the IAB-Node-3.

In some embodiments, then, Msg 3, 4, and/or 5 may exemplify a so-called proxied connection migration message as used herein. Such message may indicate the proxied migration is to occur, e.g., that the RRC Connection is to be migrated but that F1 connection is to be proxied (i.e., not migrated). Alternatively or additionally, such message may include configuration information for configuring the proxied migration.

In some embodiments, Msg 8 and/or 9 may exemplify a so-called proxied connection migration complete message as used herein. Such message may indicate the proxied connection migration has been completed.

Consider now embodiments for transporting the traffic for the proxied RRC/F1 connections. With respect to the scenario in FIG. 14, the IAB-MT-3 changes the parent from IAB-DU-1 to the IAB-DU-2. Meanwhile, the F1-C/F1-U connection between the IAB node 3 and old CU (i.e. CU1) (and also the F1-C/F1-U connection between IAB-4 or any other IAB node being served by the migrating IAB node), though logically remaining the same connection (as shown in FIG. 16), now can be physically realized in different ways.

In one embodiment, the F1 traffic path between the source CU and IAB nodes includes the new CU. For the example scenario of FIG. 14, this means for IAB3 the path will be: CU1 CU2-DU 2-IAB node 2-IAB node 3, and for IAB4 it will be: CU1-CU2-DU 2-IAB node 2-IAB node 3-IAB node 4. Thus, UL/DL F1-C/F1-U data between CU1 and IAB3/4 has to be forwarded between CU1 and CU2 over the Xn interface.

For F1-C and F1-U traffic transport via Xn between old and new CU, it needs to be ensured that F1-C traffic is treated with higher priority that the F1-U traffic (e.g. to provide higher priority to F1-C traffic and/or prevent head of line blocking of F1-C traffic by F1-U traffic in case of congestion). For this purpose, an enhancement of existing XnAP procedures or newly defined Xn procedures can be used. At least the following alternatives are possible as non-limiting examples.

As one alternative, F1-C traffic between old and new CU can be carried in a new XnAP procedure similar to Rel16 X2AP F1-C Traffic Transfer procedure, or by enhancing an existing XnAP procedure.

As another alternative, a newly defined XnAP procedure similar to X2AP F1-C Traffic Transfer procedure can be defined for F1-U traffic. Alternatively, one and the same new procedure can be defined for all F1 traffic (F1-U and F1-C). In one sub-embodiment, one Xn message in such a procedure can carry F1 traffic pertaining to only one UE/IAB node, where UE- and non-UE-associated F1-C traffic may be carried in the same or different messages. In another sub-embodiment, one message in such Xn procedure can carry traffic pertaining to more than one UE/IAB node.

As yet another alternative, F1-U traffic can be carried between old and new CU by using legacy methods e.g., GTP-U tunnelling used for Dual Connectivity (DC).

In other embodiments, by contrast, the traffic path between the source CU and IAB node 3 does not include the new CU, i.e., the path is: source CU-donor-DU 2-IAB node 2-IAB node 3. This requires the source CU becoming aware of the transport layer address of the donor DU2 and vice versa. Such direct forwarding is thereby applied to the inter-CU migration scenario between the new IAB-DU serving the migrated IAB node and the source CU. The direct forwarding may carry both F1-C and F1-U traffic. For this purpose, similar to the above, a modification of an existing procedure or a newly defined procedure can be used. Furthermore, a single message in such a procedure can be used to carry all F1 traffic pertaining to a single UE/IAB node or to a multitude of UEs/IAB nodes. Also, one message may carry only F1-C traffic or only non-UE-associated F1-C traffic or only UE-associated F1-C traffic or only F1-U traffic or a combination of any of the abovementioned traffic types pertaining to a single UE/IAB node or to a multitude of UEs/IAB nodes In one sub-embodiment, the F1-C/F1-U traffic between the concerned IAB node and the source CU is encapsulated in the RRC traffic between the concerned IAB node's MT and the new CU (IAB-donor-CU-2), and then forwarded over the Xn interface between the new and source CU. This traffic can be carried over Xn by modifying an existing XnAP procedure and messages therein, or by defining a new XnAP procedure (for example, similar to the existing X2AP F1-C Traffic Transfer procedure).

Consider now embodiments that relate to the permanent vs. temporary nature of the proxying herein. In some embodiments, keeping the F1 association at the source CU can be temporary. For example, a timer (e.g., relocationDuration) is started when the proxy function of the new CU is started according to the embodiments above. The CUs could be configured with the duration of the timer, e.g., from the OAM. When this timer expires, then a permanent relocation could be made to the new CU (i.e., all F1 connections of the migrating IAB node and the IAB nodes that it is directly/indirectly serving, as well as the RRC connections of the MTs and UEs that it is directly/indirectly serving, are relocated to the new CU). This way, temporary outages/problems on the backhaul link between the migrating IAB node and its parent node (e.g., between IAB-3 and IAB-1 in the scenario of FIG. 14) that last less than the relocation-Duration could be handled without causing interruption to the UEs' traffic. If the problem persists for more than the relocationDuration, then the full relocation towards the new CU will be initiated (i.e., a full-fledged handover of all the concerned UEs and IAB nodes).

Yet another way to control when to perform the full relocation could be based on the amount and type of active traffic, UEs, bearers of a certain QoS profile, etc. For instance, if there is a lot of active traffic in the network, the contexts will be kept in the old/source CU, while after some time when there is less active traffic the contexts can be moved to the new/target CU. Alternatively, some of the UEs/IAB nodes that have bearers that can handle handover interruption, and also had other candidate serving cells (e.g. the CU can determine that based on measurements received from the UEs/IAB-MTs shortly before the relocation of the migrating IAB node started), could be individually handed over to another candidate cell (which could be controlled by the source CU, the new CU, or a different CU) before or after the relocation.

With respect to the above, it should be noted that term F1-C traffic includes all traffic on the F1-C interface, not only the F1AP traffic, but also the Stream Control Transmission Protocol (SCTP) CHUNKS, IPsec-related traffic, etc.

Moreover, note the following regarding terminology herein. The terms "F1AP connection" and "F1 association" are used interchangeably. The terms "gNB-CU", "IAB-Donor-CU", "CU-CP", and "CU" are used interchangeably. The term "gNB" applies to all variants therein, e.g. "gNB", "en-gNB" etc. The terms "old CU", and "source CU" are used interchangeably. The terms "new CU" and "target CU" are used interchangeably. The terms "IAB-Donor DU" and "Donor-DU" are used interchangeably. The terms "backhaul RLC channel" and "BH RLC channel" and "BH bearer" are used interchangeably. The terms "handover", "migration", and "relocation" are used interchangeably. The term "a UE/IAB node directly served by the migrating IAB node" refers to a UE/IAB node that is directly connected to the migrating IAB node. The term "a UE/IAB node is indirectly served by the migrating IAB node" means that the migrating IAB node is an ancestor node to an IAB node that is currently serving the UE or IAB node. The term concerned UE/IAB node refers to a UE/IAB node that is directly/indirectly being served by the migrating IAB node. The term source parent node refers to the node that was serving the migrating IAB node before the handover (i.e. a source donor DU in case the migrating IAB node was just one hop away from the source CU, or a parent IAB node, in case the migrating IAB node was multiple hops away from the source CU). The term target parent node refers to the node that will serve the migrating IAB node after the handover (i.e. a target donor DU in case the migrating IAB node will be connected just one hop away from the target CU, or a parent IAB node, in case the migrating IAB node will be multiple hops away from the target CU). The term "child IAB node" includes all descendants of an IAB node, i.e. both directly and indirectly served IAB nodes (i.e. not only the directly connected children, but also children's children and so on).

Furthermore, note that the example topology shown in FIG. 14 is used for the embodiments herein, where IAB-node 3 DU has an F1AP connection with IAB-Donor CU1 (i.e. CU 1), while the MT functionality of the IAB-node 3 (i.e. IAB-MT-3) is connected to/served by IAB-node 1. The inter-CU IAB node migration may be caused by e.g. radio link failure (RL)F, load balancing, IAB node mobility, etc. These are non-limiting examples.

Note further that all considerations for a split donor (i.e. donor CU) are equally applicable for a non-split donor (i.e. donor gNB).

Furthermore, all the cells of the DUs controlled by the same donor CU (i.e. the donor DU and the IAB-DUs of all IAB nodes that are under the same donor CU) are also referred to as being served by the donor CU.

And note that embodiments herein are presented in a non-limiting example of Xn handover, but embodiments herein are equally applicable to the NG, S1 and X2 handovers as well.

Figure 18:
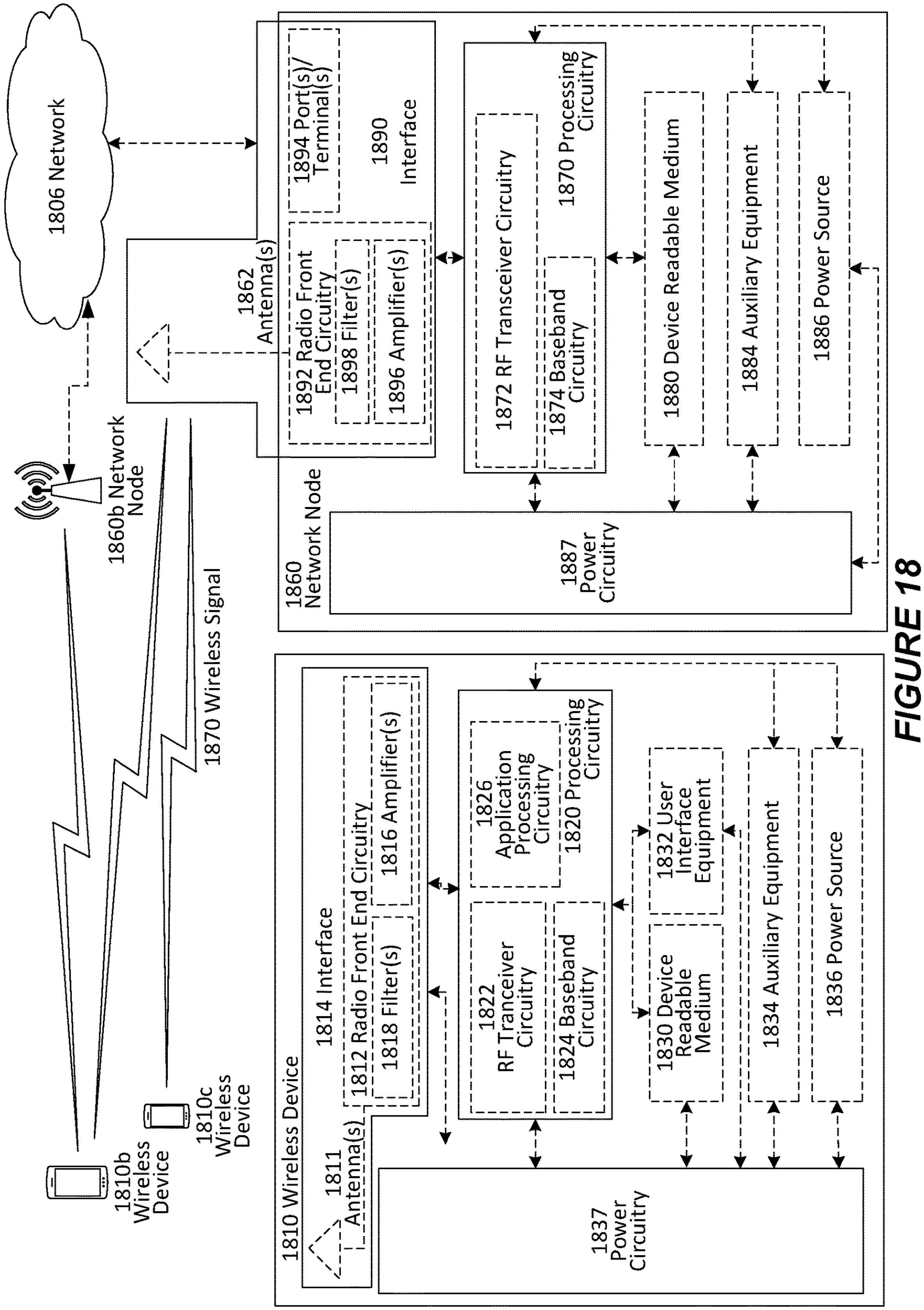
FIG. 18 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 18. For simplicity, the wireless network of FIG. 18 only depicts network 1806, network nodes 1860 and 1860*b*, and WDs 1810, 1810*b*, and 1810*c*. In practice, a wireless network may further include any additional elements suitable to support communication between wireless devices or between a wireless device and another communication device, such as a landline telephone, a service provider, or any other network node or end device. Of the illustrated components, network node 1860 and wireless device (WD) 1810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1860 and WD 1810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 18, network node 1860 includes processing circuitry 1870, device readable medium 1880, interface 1890, auxiliary equipment 1884, power source 1886, power circuitry 1887, and antenna 1862. Although network node 1860 illustrated in the example wireless network of FIG. 18 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1860 are depicted as single boxes located within a larger box, or nested within multiple boxes, in practice, a network node may comprise multiple different physical components that make up a single illustrated component (e.g., device readable medium 1880 may comprise multiple separate hard drives as well as multiple RAM modules).

Similarly, network node 1860 may be composed of multiple physically separate components (e.g., a NodeB component and a RNC component, or a BTS component and a BSC component, etc.), which may each have their own respective components. In certain scenarios in which network node 1860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1860 may be configured to support multiple radio access technologies (RATs). In such embodiments, some components may be duplicated (e.g., separate device readable medium 1880 for the different RATs) and some components may be reused (e.g., the same antenna 1862 may be shared by the RATs). Network node 1860 may also include multiple sets of the various illustrated components for different wireless technologies integrated into network node 1860, such as, for example, GSM, WCDMA, LTE, NR, WiFi, or Bluetooth wireless technologies. These wireless technologies may be integrated into the same or different chip or set of chips and other components within network node 1860.

Processing circuitry 1870 is configured to perform any determining, calculating, or similar operations (e.g., certain obtaining operations) described herein as being provided by a network node. These operations performed by processing circuitry 1870 may include processing information obtained by processing circuitry 1870 by, for example, converting the obtained information into other information, comparing the obtained information or converted information to information stored in the network node, and/or performing one or more operations based on the obtained information or converted information, and as a result of said processing making a determination.

Processing circuitry 1870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1860 components, such as device readable medium 1880, network node 1860 functionality. For example, processing circuitry 1870 may execute instructions stored in device readable medium 1880 or in memory within processing circuitry 1870. Such functionality may include providing any of the various wireless features, functions, or benefits discussed herein. In some embodiments, processing circuitry 1870 may include a system on a chip (SOC).

In some embodiments, processing circuitry 1870 may include one or more of radio frequency (RF) transceiver circuitry 1872 and baseband processing circuitry 1874. In some embodiments, radio frequency (RF) transceiver circuitry 1872 and baseband processing circuitry 1874 may be on separate chips (or sets of chips), boards, or units, such as radio units and digital units. In alternative embodiments, part or all of RF transceiver circuitry 1872 and baseband processing circuitry 1874 may be on the same chip or set of chips, boards, or units In certain embodiments, some or all of the functionality described herein as being provided by a network node, base station, eNB or other such network device may be performed by processing circuitry 1870 executing instructions stored on device readable medium 1880 or memory within processing circuitry 1870. In alternative embodiments, some or all of the functionality may be provided by processing circuitry 1870 without executing instructions stored on a separate or discrete device readable medium, such as in a hard-wired manner. In any of those embodiments, whether executing instructions stored on a device readable storage medium or not, processing circuitry 1870 can be configured to perform the described functionality. The benefits provided by such functionality are not limited to processing circuitry 1870 alone or to other components of network node 1860, but are enjoyed by network node 1860 as a whole, and/or by end users and the wireless network generally.

Device readable medium 1880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1870. Device readable medium 1880 may store any suitable instructions, data or information, including a computer program, software, an application including one or more of logic, rules, code, tables, etc. and/or other instructions capable of being executed by processing circuitry 1870 and, utilized by network node 1860. Device readable medium 1880 may be used to store any calculations made by processing circuitry 1870 and/or any data received via interface 1890. In some embodiments, processing circuitry 1870 and device readable medium 1880 may be considered to be integrated.

Interface 1890 is used in the wired or wireless communication of signalling and/or data between network node 1860, network 1806, and/or WDs 1810. As illustrated, interface 1890 comprises port(s)/terminal(s) 1894 to send and receive data, for example to and from network 1806 over a wired connection. Interface 1890 also includes radio front end circuitry 1892 that may be coupled to, or in certain embodiments a part of, antenna 1862. Radio front end circuitry 1892 comprises filters 1898 and amplifiers 1896. Radio front end circuitry 1892 may be connected to antenna 1862 and processing circuitry 1870. Radio front end circuitry may be configured to condition signals communicated between antenna 1862 and processing circuitry 1870. Radio front end circuitry 1892 may receive digital data that is to be sent out to other network nodes or WDs via a wireless connection. Radio front end circuitry 1892 may convert the digital data into a radio signal having the appropriate channel and bandwidth parameters using a combination of filters 1898 and/or amplifiers 1896. The radio signal may then be transmitted via antenna 1862. Similarly, when receiving data, antenna 1862 may collect radio signals which are then converted into digital data by radio front end circuitry 1892. The digital data may be passed to processing circuitry 1870. In other embodiments, the interface may comprise different components and/or different combinations of components.

In certain alternative embodiments, network node 1860 may not include separate radio front end circuitry 1892, instead, processing circuitry 1870 may comprise radio front end circuitry and may be connected to antenna 1862 without separate radio front end circuitry 1892. Similarly, in some embodiments, all or some of RF transceiver circuitry 1872 may be considered a part of interface 1890. In still other embodiments, interface 1890 may include one or more ports or terminals 1894, radio front end circuitry 1892, and RF transceiver circuitry 1872, as part of a radio unit (not shown), and interface 1890 may communicate with baseband processing circuitry 1874, which is part of a digital unit (not shown).

Antenna 1862 may include one or more antennas, or antenna arrays, configured to send and/or receive wireless signals. Antenna 1862 may be coupled to radio front end circuitry 1890 and may be any type of antenna capable of transmitting and receiving data and/or signals wirelessly. In some embodiments, antenna 1862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1862 may be separate from network node 1860 and may be connectable to network node 1860 through an interface or port.

Antenna 1862, interface 1890, and/or processing circuitry 1870 may be configured to perform any receiving operations and/or certain obtaining operations described herein as being performed by a network node. Any information, data and/or signals may be received from a wireless device, another network node and/or any other network equipment. Similarly, antenna 1862, interface 1890, and/or processing circuitry 1870 may be configured to perform any transmitting operations described herein as being performed by a network node. Any information, data and/or signals may be transmitted to a wireless device, another network node and/or any other network equipment.

Power circuitry 1887 may comprise, or be coupled to, power management circuitry and is configured to supply the components of network node 1860 with power for performing the functionality described herein. Power circuitry 1887 may receive power from power source 1886. Power source 1886 and/or power circuitry 1887 may be configured to provide power to the various components of network node 1860 in a form suitable for the respective components (e.g., at a voltage and current level needed for each respective component). Power source 1886 may either be included in, or external to, power circuitry 1887 and/or network node 1860. For example, network node 1860 may be connectable to an external power source (e.g., an electricity outlet) via an input circuitry or interface such as an electrical cable, whereby the external power source supplies power to power circuitry 1887. As a further example, power source 1886 may comprise a source of power in the form of a battery or battery pack which is connected to, or integrated in, power circuitry 1887. The battery may provide backup power should the external power source fail. Other types of power sources, such as photovoltaic devices, may also be used.

Alternative embodiments of network node 1860 may include additional components beyond those shown in FIG. 18 that may be responsible for providing certain aspects of the network node's functionality, including any of the functionality described herein and/or any functionality necessary to support the subject matter described herein. For example, network node 1860 may include user interface equipment to allow input of information into network node 1860 and to allow output of information from network node 1860. This may allow a user to perform diagnostic, maintenance, repair, and other administrative functions for network node 1860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1810 includes antenna 1811, interface 1814, processing circuitry 1820, device readable medium 1830, user interface equipment 1832, auxiliary equipment 1834, power source 1836 and power circuitry 1837. WD 1810 may include multiple sets of one or more of the illustrated components for different wireless technologies supported by WD 1810, such as, for example, GSM, WCDMA, LTE, NR, WiFi, WiMAX, NB-IoT, or Bluetooth wireless technologies, just to mention a few.

These wireless technologies may be integrated into the same or different chips or set of chips as other components within WD 1810.

Antenna 1811 may include one or more antennas or antenna arrays, configured to send and/or receive wireless signals, and is connected to interface 1814. In certain alternative embodiments, antenna 1811 may be separate from WD 1810 and be connectable to WD 1810 through an interface or port. Antenna 1811, interface 1814, and/or processing circuitry 1820 may be configured to perform any receiving or transmitting operations described herein as being performed by a WD. Any information, data and/or signals may be received from a network node and/or another WD. In some embodiments, radio front end circuitry and/or antenna 1811 may be considered an interface.

As illustrated, interface 1814 comprises radio front end circuitry 1812 and antenna 1811. Radio front end circuitry 1812 comprise one or more filters 1818 and amplifiers 1816. Radio front end circuitry 1814 is connected to antenna 1811 and processing circuitry 1820, and is configured to condition signals communicated between antenna 1811 and processing circuitry 1820. Radio front end circuitry 1812 may be coupled to or a part of antenna 1811. In some embodiments, WD 1810 may not include separate radio front end circuitry 1812; rather, processing circuitry 1820 may comprise radio front end circuitry and may be connected to antenna 1811. Similarly, in some embodiments, some or all of RF transceiver circuitry 1822 may be considered a part of interface 1814. Radio front end circuitry 1812 may receive digital data that is to be sent out to other network nodes or WDs via a wireless connection. Radio front end circuitry 1812 may convert the digital data into a radio signal having the appropriate channel and bandwidth parameters using a combination of filters 1818 and/or amplifiers 1816. The radio signal may then be transmitted via antenna 1811. Similarly, when receiving data, antenna 1811 may collect radio signals which are then converted into digital data by radio front end circuitry 1812. The digital data may be passed to processing circuitry 1820. In other embodiments, the interface may comprise different components and/or different combinations of components.

Processing circuitry 1820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1810 components, such as device readable medium 1830, WD 1810 functionality. Such functionality may include providing any of the various wireless features or benefits discussed herein. For example, processing circuitry 1820 may execute instructions stored in device readable medium 1830 or in memory within processing circuitry 1820 to provide the functionality disclosed herein.

As illustrated, processing circuitry 1820 includes one or more of RF transceiver circuitry 1822, baseband processing circuitry 1824, and application processing circuitry 1826. In other embodiments, the processing circuitry may comprise different components and/or different combinations of components. In certain embodiments processing circuitry 1820 of WD 1810 may comprise a SOC. In some embodiments, RF transceiver circuitry 1822, baseband processing circuitry 1824, and application processing circuitry 1826 may be on separate chips or sets of chips. In alternative embodiments, part or all of baseband processing circuitry 1824 and application processing circuitry 1826 may be combined into one chip or set of chips, and RF transceiver circuitry 1822 may be on a separate chip or set of chips. In still alternative embodiments, part or all of RF transceiver circuitry 1822 and baseband processing circuitry 1824 may be on the same chip or set of chips, and application processing circuitry 1826 may be on a separate chip or set of chips. In yet other alternative embodiments, part or all of RF transceiver circuitry 1822, baseband processing circuitry 1824, and application processing circuitry 1826 may be combined in the same chip or set of chips. In some embodiments, RF transceiver circuitry 1822 may be a part of interface 1814. RF transceiver circuitry 1822 may condition RF signals for processing circuitry 1820.

In certain embodiments, some or all of the functionality described herein as being performed by a WD may be provided by processing circuitry 1820 executing instructions stored on device readable medium 1830, which in certain embodiments may be a computer-readable storage medium. In alternative embodiments, some or all of the functionality may be provided by processing circuitry 1820 without executing instructions stored on a separate or discrete device readable storage medium, such as in a hard-wired manner. In any of those particular embodiments, whether executing instructions stored on a device readable storage medium or not, processing circuitry 1820 can be configured to perform the described functionality. The benefits provided by such functionality are not limited to processing circuitry 1820 alone or to other components of WD 1810, but are enjoyed by WD 1810 as a whole, and/or by end users and the wireless network generally.

Processing circuitry 1820 may be configured to perform any determining, calculating, or similar operations (e.g., certain obtaining operations) described herein as being performed by a WD. These operations, as performed by processing circuitry 1820, may include processing information obtained by processing circuitry 1820 by, for example, converting the obtained information into other information, comparing the obtained information or converted information to information stored by WD 1810, and/or performing one or more operations based on the obtained information or converted information, and as a result of said processing making a determination.

Device readable medium 1830 may be operable to store a computer program, software, an application including one or more of logic, rules, code, tables, etc. and/or other instructions capable of being executed by processing circuitry 1820. Device readable medium 1830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1820. In some embodiments, processing circuitry 1820 and device readable medium 1830 may be considered to be integrated.

User interface equipment 1832 may provide components that allow for a human user to interact with WD 1810. Such interaction may be of many forms, such as visual, audial, tactile, etc. User interface equipment 1832 may be operable to produce output to the user and to allow the user to provide input to WD 1810. The type of interaction may vary depending on the type of user interface equipment 1832 installed in WD 1810. For example, if WD 1810 is a smart phone, the interaction may be via a touch screen; if WD 1810 is a smart meter, the interaction may be through a screen that provides usage (e.g., the number of gallons used) or a speaker that provides an audible alert (e.g., if smoke is detected). User interface equipment 1832 may include input interfaces, devices and circuits, and output interfaces, devices and circuits. User interface equipment 1832 is configured to allow input of information into WD 1810, and is connected to processing circuitry 1820 to allow processing circuitry 1820 to process the input information. User interface equipment 1832 may include, for example, a microphone, a proximity or other sensor, keys/buttons, a touch display, one or more cameras, a USB port, or other input circuitry. User interface equipment 1832 is also configured to allow output of information from WD 1810, and to allow processing circuitry 1820 to output information from WD 1810. User interface equipment 1832 may include, for example, a speaker, a display, vibrating circuitry, a USB port, a headphone interface, or other output circuitry. Using one or more input and output interfaces, devices, and circuits, of user interface equipment 1832, WD 1810 may communicate with end users and/or the wireless network, and allow them to benefit from the functionality described herein.

Auxiliary equipment 1834 is operable to provide more specific functionality which may not be generally performed by WDs. This may comprise specialized sensors for doing measurements for various purposes, interfaces for additional types of communication such as wired communications etc. The inclusion and type of components of auxiliary equipment 1834 may vary depending on the embodiment and/or scenario.

Power source 1836 may, in some embodiments, be in the form of a battery or battery pack. Other types of power sources, such as an external power source (e.g., an electricity outlet), photovoltaic devices or power cells, may also be used. WD 1810 may further comprise power circuitry 1837 for delivering power from power source 1836 to the various parts of WD 1810 which need power from power source 1836 to carry out any functionality described or indicated herein. Power circuitry 1837 may in certain embodiments comprise power management circuitry. Power circuitry 1837 may additionally or alternatively be operable to receive power from an external power source; in which case WD 1810 may be connectable to the external power source (such as an electricity outlet) via input circuitry or an interface such as an electrical power cable. Power circuitry 1837 may also in certain embodiments be operable to deliver power from an external power source to power source 1836. This may be, for example, for the charging of power source 1836. Power circuitry 1837 may perform any formatting, converting, or other modification to the power from power source 1836 to make the power suitable for the respective components of WD 1810 to which power is supplied.

Figure 19:
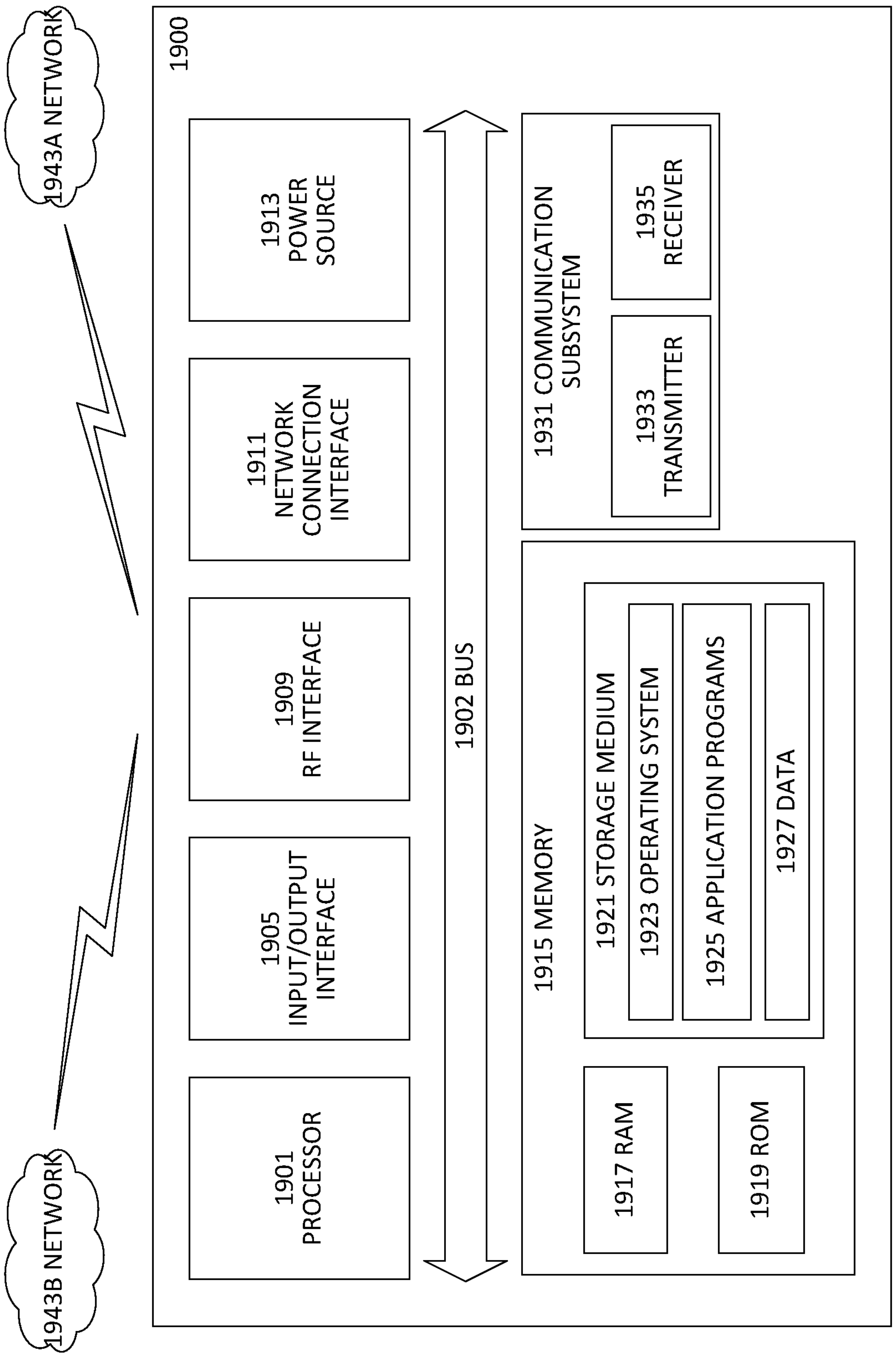
FIG. 19 is a block diagram of a user equipment according to some embodiments.

FIG. 19 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 19200 may be any UE identified by the 3$^{rd}$ Generation Partnership Project (3GPP), including a NB-IoT UE, a machine type communication (MTC) UE, and/or an enhanced MTC (eMTC) UE. UE 1900, as illustrated in FIG. 19, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 19 is a UE, the components discussed herein are equally applicable to a WD, and vice-versa.

In FIG. 19, UE 1900 includes processing circuitry 1901 that is operatively coupled to input/output interface 1905, radio frequency (RF) interface 1909, network connection interface 1911, memory 1915 including random access memory (RAM) 1917, read-only memory (ROM) 1919, and storage medium 1921 or the like, communication subsystem 1931, power source 1933, and/or any other component, or any combination thereof. Storage medium 1921 includes operating system 1923, application program 1925, and data 1927. In other embodiments, storage medium 1921 may include other similar types of information. Certain UEs may utilize all of the components shown in FIG. 19, or only a subset of the components. The level of integration between the components may vary from one UE to another UE. Further, certain UEs may contain multiple instances of a component, such as multiple processors, memories, transceivers, transmitters, receivers, etc.

In FIG. 19, processing circuitry 1901 may be configured to process computer instructions and data. Processing circuitry 1901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1901 may include two central processing units (CPUs). Data may be information in a form suitable for use by a computer.

In the depicted embodiment, input/output interface 1905 may be configured to provide a communication interface to an input device, output device, or input and output device. UE 1900 may be configured to use an output device via input/output interface 1905. An output device may use the same type of interface port as an input device. For example, a USB port may be used to provide input to and output from UE 1900. The output device may be a speaker, a sound card, a video card, a display, a monitor, a printer, an actuator, an emitter, a smartcard, another output device, or any combination thereof. UE 1900 may be configured to use an input device via input/output interface 1905 to allow a user to capture information into UE 1900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 19, RF interface 1909 may be configured to provide a communication interface to RF components such as a transmitter, a receiver, and an antenna. Network connection interface 1911 may be configured to provide a communication interface to network 1943*a*. Network 1943*a* may encompass wired and/or wireless networks such as a local-area network (LAN), a wide-area network (WAN), a computer network, a wireless network, a telecommunications network, another like network or any combination thereof. For example, network 1943*a* may comprise a Wi-Fi network. Network connection interface 1911 may be configured to include a receiver and a transmitter interface used to communicate with one or more other devices over a communication network according to one or more communication protocols, such as Ethernet, TCP/IP, SONET, ATM, or the like. Network connection interface 1911 may implement receiver and transmitter functionality appropriate to the communication network links (e.g., optical, electrical, and the like). The transmitter and receiver functions may share circuit components, software or firmware, or alternatively may be implemented separately.

RAM 1917 may be configured to interface via bus 1902 to processing circuitry 1901 to provide storage or caching of data or computer instructions during the execution of software programs such as the operating system, application programs, and device drivers. ROM 1919 may be configured to provide computer instructions or data to processing circuitry 1901. For example, ROM 1919 may be configured to store invariant low-level system code or data for basic system functions such as basic input and output (I/O), startup, or reception of keystrokes from a keyboard that are stored in a non-volatile memory. Storage medium 1921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1921 may be configured to include operating system 1923, application program 1925 such as a web browser application, a widget or gadget engine or another application, and data file 1927. Storage medium 1921 may store, for use by UE 1900, any of a variety of various operating systems or combinations of operating systems.

Storage medium 1921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1921 may allow UE 1900 to access computer-executable instructions, application programs or the like, stored on transitory or non-transitory memory media, to off-load data, or to upload data. An article of manufacture, such as one utilizing a communication system may be tangibly embodied in storage medium 1921, which may comprise a device readable medium.

In FIG. 19, processing circuitry 1901 may be configured to communicate with network 1943*b* using communication subsystem 1931. Network 1943*a* and network 1943*b* may be the same network or networks or different network or networks. Communication subsystem 1931 may be configured to include one or more transceivers used to communicate with network 1943*b*. For example, communication subsystem 1931 may be configured to include one or more transceivers used to communicate with one or more remote transceivers of another device capable of wireless communication such as another WD, UE, or base station of a radio access network (RAN) according to one or more communication protocols, such as IEEE 802.19, CDMA, WCDMA, GSM, LTE, UTRAN, WiMax, or the like. Each transceiver may include transmitter 1933 and/or receiver 1935 to implement transmitter or receiver functionality, respectively, appropriate to the RAN links (e.g., frequency allocations and the like). Further, transmitter 1933 and receiver 1935 of each transceiver may share circuit components, software or firmware, or alternatively may be implemented separately.

In the illustrated embodiment, the communication functions of communication subsystem 1931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1931 may include cellular communication, Wi-Fi communication, Bluetooth communication, and GPS communication. Network 1943*b* may encompass wired and/or wireless networks such as a local-area network (LAN), a wide-area network (WAN), a computer network, a wireless network, a telecommunications network, another like network or any combination thereof. For example, network 1943*b* may be a cellular network, a Wi-Fi network, and/or a near-field network. Power source 1913 may be configured to provide alternating current (AC) or direct current (DC) power to components of UE 1900.

The features, benefits and/or functions described herein may be implemented in one of the components of UE 1900 or partitioned across multiple components of UE 1900. Further, the features, benefits, and/or functions described herein may be implemented in any combination of hardware, software or firmware. In one example, communication subsystem 1931 may be configured to include any of the components described herein. Further, processing circuitry 1901 may be configured to communicate with any of such components over bus 1902. In another example, any of such components may be represented by program instructions stored in memory that when executed by processing circuitry 1901 perform the corresponding functions described herein. In another example, the functionality of any of such components may be partitioned between processing circuitry 1901 and communication subsystem 1931. In another example, the non-computationally intensive functions of any of such components may be implemented in software or firmware and the computationally intensive functions may be implemented in hardware.

Figure 20:
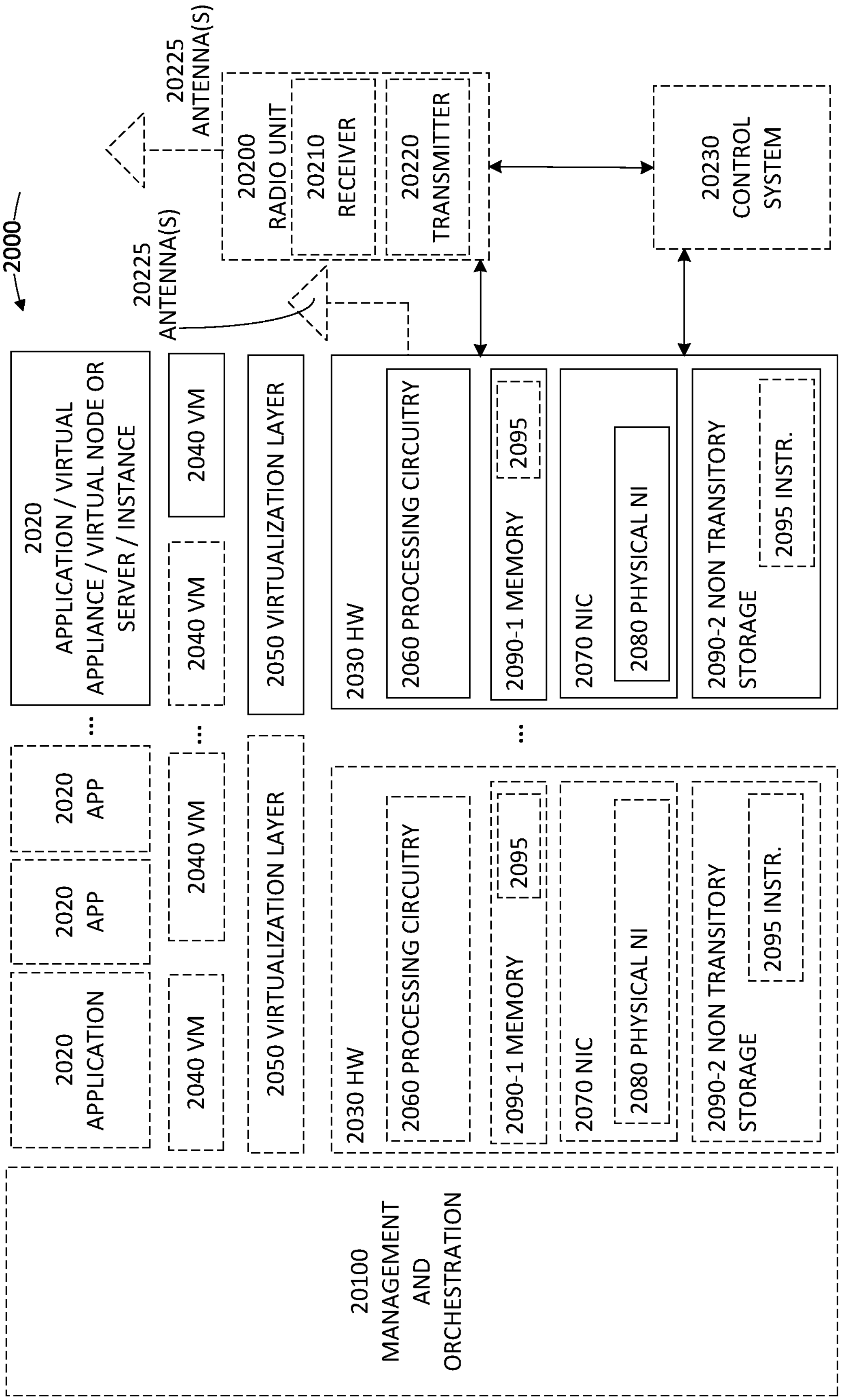
FIG. 20 is a block diagram of a virtualization environment according to some embodiments.

FIG. 20 is a schematic block diagram illustrating a virtualization environment 2000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2000 hosted by one or more of hardware nodes 2030. Further, in embodiments in which the virtual node is not a radio access node or does not require radio connectivity (e.g., a core network node), then the network node may be entirely virtualized.

The functions may be implemented by one or more applications 2020 (which may alternatively be called software instances, virtual appliances, network functions, virtual nodes, virtual network functions, etc.) operative to implement some of the features, functions, and/or benefits of some of the embodiments disclosed herein. Applications 2020 are run in virtualization environment 2000 which provides hardware 2030 comprising processing circuitry 2060 and memory 2090. Memory 2090 contains instructions 2095 executable by processing circuitry 2060 whereby application 2020 is operative to provide one or more of the features, benefits, and/or functions disclosed herein.

Virtualization environment 2000, comprises general-purpose or special-purpose network hardware devices 2030 comprising a set of one or more processors or processing circuitry 2060, which may be commercial off-the-shelf (COTS) processors, dedicated Application Specific Integrated Circuits (ASICs), or any other type of processing circuitry including digital or analog hardware components or special purpose processors. Each hardware device may comprise memory 2090-1 which may be non-persistent memory for temporarily storing instructions 2095 or software executed by processing circuitry 2060. Each hardware device may comprise one or more network interface controllers (NICs) 2070, also known as network interface cards, which include physical network interface 2080. Each hardware device may also include non-transitory, persistent, machine-readable storage media 2090-2 having stored therein software 2095 and/or instructions executable by processing circuitry 2060. Software 2095 may include any type of software including software for instantiating one or more virtualization layers 2050 (also referred to as hypervisors), software to execute virtual machines 2040 as well as software allowing it to execute functions, features and/or benefits described in relation with some embodiments described herein.

Virtual machines 2040, comprise virtual processing, virtual memory, virtual networking or interface and virtual storage, and may be run by a corresponding virtualization layer 2050 or hypervisor. Different embodiments of the instance of virtual appliance 2020 may be implemented on one or more of virtual machines 2040, and the implementations may be made in different ways.

During operation, processing circuitry 2060 executes software 2095 to instantiate the hypervisor or virtualization layer 2050, which may sometimes be referred to as a virtual machine monitor (VMM). Virtualization layer 2050 may present a virtual operating platform that appears like networking hardware to virtual machine 2040.

As shown in FIG. 20, hardware 2030 may be a standalone network node with generic or specific components. Hardware 2030 may comprise antenna 20225 and may implement some functions via virtualization. Alternatively, hardware 2030 may be part of a larger cluster of hardware (e.g. such as in a data center or customer premise equipment (CPE)) where many hardware nodes work together and are managed via management and orchestration (MANO) 20100, which, among others, oversees lifecycle management of applications 2020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2040 may be a software implementation of a physical machine that runs programs as if they were executing on a physical, non-virtualized machine. Each of virtual machines 2040, and that part of hardware 2030 that executes that virtual machine, be it hardware dedicated to that virtual machine and/or hardware shared by that virtual machine with others of the virtual machines 2040, forms a separate virtual network elements (VNE).

Still in the context of NFV, Virtual Network Function (VNF) is responsible for handling specific network functions that run in one or more virtual machines 2040 on top of hardware networking infrastructure 2030 and corresponds to application 2020 in FIG. 20.

In some embodiments, one or more radio units 20200 that each include one or more transmitters 20220 and one or more receivers 20210 may be coupled to one or more antennas 20225. Radio units 20200 may communicate directly with hardware nodes 2030 via one or more appropriate network interfaces and may be used in combination with the virtual components to provide a virtual node with radio capabilities, such as a radio access node or a base station.

In some embodiments, some signalling can be effected with the use of control system 20230 which may alternatively be used for communication between the hardware nodes 2030 and radio units 20200.

Figure 21:
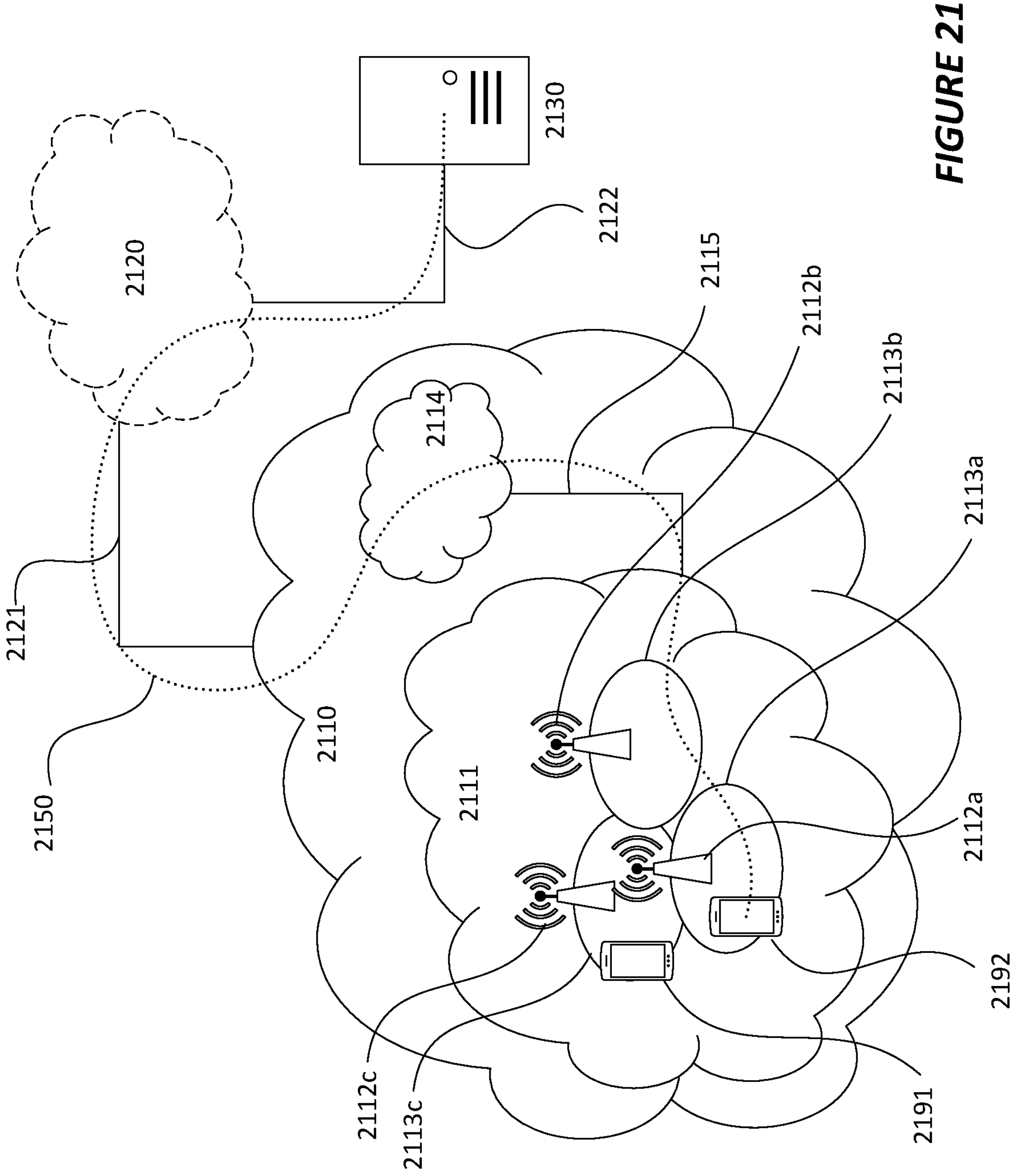
FIG. 21 is a block diagram of a communication network with a host computer according to some embodiments.

FIG. 21 illustrates a telecommunication network connected via an intermediate network to a host computer in accordance with some embodiments. In particular, with reference to FIG. 21, in accordance with an embodiment, a communication system includes telecommunication network 2110, such as a 3GPP-type cellular network, which comprises access network 2111, such as a radio access network, and core network 2114. Access network 2111 comprises a plurality of base stations 2112*a*, 2112*b*, 2112*c*, such as NBs, eNBs, gNBs or other types of wireless access points, each defining a corresponding coverage area 2113*a*, 2113*b*, 2113*c*. Each base station 2112*a*, 2112*b*, 2112*c* is connectable to core network 2114 over a wired or wireless connection 2115. A first UE 2191 located in coverage area 2113*c* is configured to wirelessly connect to, or be paged by, the corresponding base station 2112*c*. A second UE 2192 in coverage area 2113*a* is wirelessly connectable to the corresponding base station 2112*a*. While a plurality of UEs 2191, 2192 are illustrated in this example, the disclosed embodiments are equally applicable to a situation where a sole UE is in the coverage area or where a sole UE is connecting to the corresponding base station 2112.

Telecommunication network 2110 is itself connected to host computer 2130, which may be embodied in the hardware and/or software of a standalone server, a cloud-implemented server, a distributed server or as processing resources in a server farm. Host computer 2130 may be under the ownership or control of a service provider, or may be operated by the service provider or on behalf of the service provider. Connections 2121 and 2122 between telecommunication network 2110 and host computer 2130 may extend directly from core network 2114 to host computer 2130 or may go via an optional intermediate network 2120. Intermediate network 2120 may be one of, or a combination of more than one of, a public, private or hosted network; intermediate network 2120, if any, may be a backbone network or the Internet; in particular, intermediate network 2120 may comprise two or more sub-networks (not shown).

The communication system of FIG. 21 as a whole enables connectivity between the connected UEs 2191, 2192 and host computer 2130. The connectivity may be described as an over-the-top (OTT) connection 2150. Host computer 2130 and the connected UEs 2191, 2192 are configured to communicate data and/or signaling via OTT connection 2150, using access network 2111, core network 2114, any intermediate network 2120 and possible further infrastructure (not shown) as intermediaries. OTT connection 2150 may be transparent in the sense that the participating communication devices through which OTT connection 2150 passes are unaware of routing of uplink and downlink communications. For example, base station 2112 may not or need not be informed about the past routing of an incoming downlink communication with data originating from host computer 2130 to be forwarded (e.g., handed over) to a connected UE 2191. Similarly, base station 2112 need not be aware of the future routing of an outgoing uplink communication originating from the UE 2191 towards the host computer 2130.

Figure 22:
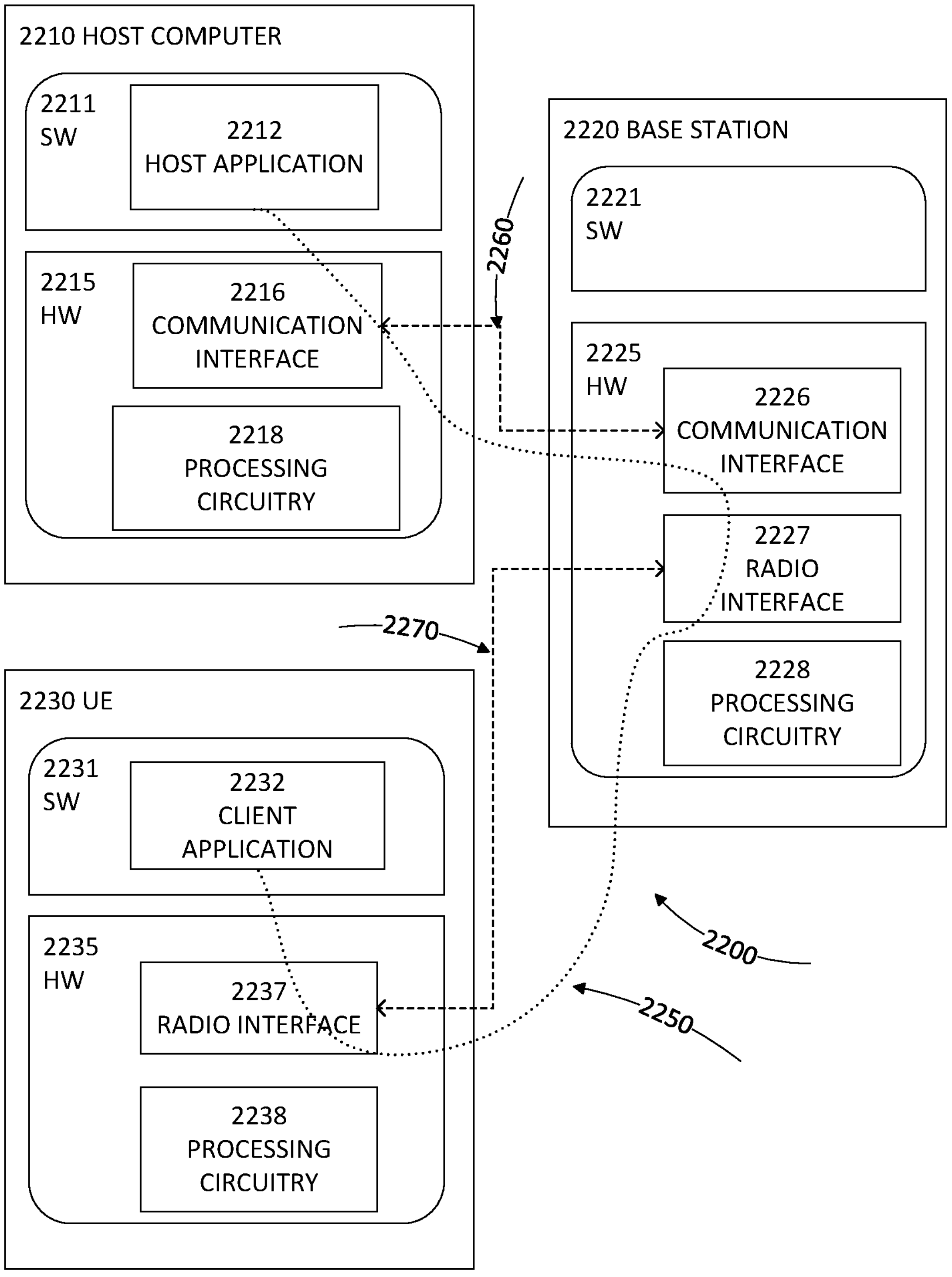
FIG. 22 is a block diagram of a host computer according to some embodiments.

Example implementations, in accordance with an embodiment, of the UE, base station and host computer discussed in the preceding paragraphs will now be described with reference to FIG. 22. FIG. 22 illustrates host computer communicating via a base station with a user equipment over a partially wireless connection in accordance with some embodiments In communication system 2200, host computer 2210 comprises hardware 2215 including communication interface 2216 configured to set up and maintain a wired or wireless connection with an interface of a different communication device of communication system 2200. Host computer 2210 further comprises processing circuitry 2218, which may have storage and/or processing capabilities. In particular, processing circuitry 2218 may comprise one or more programmable processors, application-specific integrated circuits, field programmable gate arrays or combinations of these (not shown) adapted to execute instructions. Host computer 2210 further comprises software 2211, which is stored in or accessible by host computer 2210 and executable by processing circuitry 2218. Software 2211 includes host application 2212. Host application 2212 may be operable to provide a service to a remote user, such as UE 2230 connecting via OTT connection 2250 terminating at UE 2230 and host computer 2210. In providing the service to the remote user, host application 2212 may provide user data which is transmitted using OTT connection 2250.

Communication system 2200 further includes base station 2220 provided in a telecommunication system and comprising hardware 2225 enabling it to communicate with host computer 2210 and with UE 2230. Hardware 2225 may include communication interface 2226 for setting up and maintaining a wired or wireless connection with an interface of a different communication device of communication system 2200, as well as radio interface 2227 for setting up and maintaining at least wireless connection 2270 with UE 2230 located in a coverage area (not shown in FIG. 22) served by base station 2220. Communication interface 2226 may be configured to facilitate connection 2260 to host computer 2210. Connection 2260 may be direct or it may pass through a core network (not shown in FIG. 22) of the telecommunication system and/or through one or more intermediate networks outside the telecommunication system. In the embodiment shown, hardware 2225 of base station 2220 further includes processing circuitry 2228, which may comprise one or more programmable processors, application-specific integrated circuits, field programmable gate arrays or combinations of these (not shown) adapted to execute instructions. Base station 2220 further has software 2221 stored internally or accessible via an external connection.

Communication system 2200 further includes UE 2230 already referred to. Its hardware 2235 may include radio interface 2237 configured to set up and maintain wireless connection 2270 with a base station serving a coverage area in which UE 2230 is currently located. Hardware 2235 of UE 2230 further includes processing circuitry 2238, which may comprise one or more programmable processors, application-specific integrated circuits, field programmable gate arrays or combinations of these (not shown) adapted to execute instructions. UE 2230 further comprises software 2231, which is stored in or accessible by UE 2230 and executable by processing circuitry 2238. Software 2231 includes client application 2232. Client application 2232 may be operable to provide a service to a human or non-human user via UE 2230, with the support of host computer 2210. In host computer 2210, an executing host application 2212 may communicate with the executing client application 2232 via OTT connection 2250 terminating at UE 2230 and host computer 2210. In providing the service to the user, client application 2232 may receive request data from host application 2212 and provide user data in response to the request data. OTT connection 2250 may transfer both the request data and the user data. Client application 2232 may interact with the user to generate the user data that it provides.

It is noted that host computer 2210, base station 2220 and UE 2230 illustrated in FIG. 22 may be similar or identical to host computer 2130, one of base stations 2112*a*, 2112*b*, 2112*c* and one of UEs 2191, 2192 of FIG. 21, respectively. This is to say, the inner workings of these entities may be as shown in FIG. 22 and independently, the surrounding network topology may be that of FIG. 21.

In FIG. 22, OTT connection 2250 has been drawn abstractly to illustrate the communication between host computer 2210 and UE 2230 via base station 2220, without explicit reference to any intermediary devices and the precise routing of messages via these devices. Network infrastructure may determine the routing, which it may be configured to hide from UE 2230 or from the service provider operating host computer 2210, or both. While OTT connection 2250 is active, the network infrastructure may further take decisions by which it dynamically changes the routing (e.g., on the basis of load balancing consideration or reconfiguration of the network).

Wireless connection 2270 between UE 2230 and base station 2220 is in accordance with the teachings of the embodiments described throughout this disclosure. One or more of the various embodiments improve the performance of OTT services provided to UE 2230 using OTT connection 2250, in which wireless connection 2270 forms the last segment.

A measurement procedure may be provided for the purpose of monitoring data rate, latency and other factors on which the one or more embodiments improve. There may further be an optional network functionality for reconfiguring OTT connection 2250 between host computer 2210 and UE 2230, in response to variations in the measurement results. The measurement procedure and/or the network functionality for reconfiguring OTT connection 2250 may be implemented in software 2211 and hardware 2215 of host computer 2210 or in software 2231 and hardware 2235 of UE 2230, or both. In embodiments, sensors (not shown) may be deployed in or in association with communication devices through which OTT connection 2250 passes; the sensors may participate in the measurement procedure by supplying values of the monitored quantities exemplified above, or supplying values of other physical quantities from which software 2211, 2231 may compute or estimate the monitored quantities. The reconfiguring of OTT connection 2250 may include message format, retransmission settings, preferred routing etc.; the reconfiguring need not affect base station 2220, and it may be unknown or imperceptible to base station 2220. Such procedures and functionalities may be known and practiced in the art. In certain embodiments, measurements may involve proprietary UE signaling facilitating host computer 2210's measurements of throughput, propagation times, latency and the like. The measurements may be implemented in that software 2211 and 2231 causes messages to be transmitted, in particular empty or 'dummy' messages, using OTT connection 2250 while it monitors propagation times, errors etc.

Figure 23:
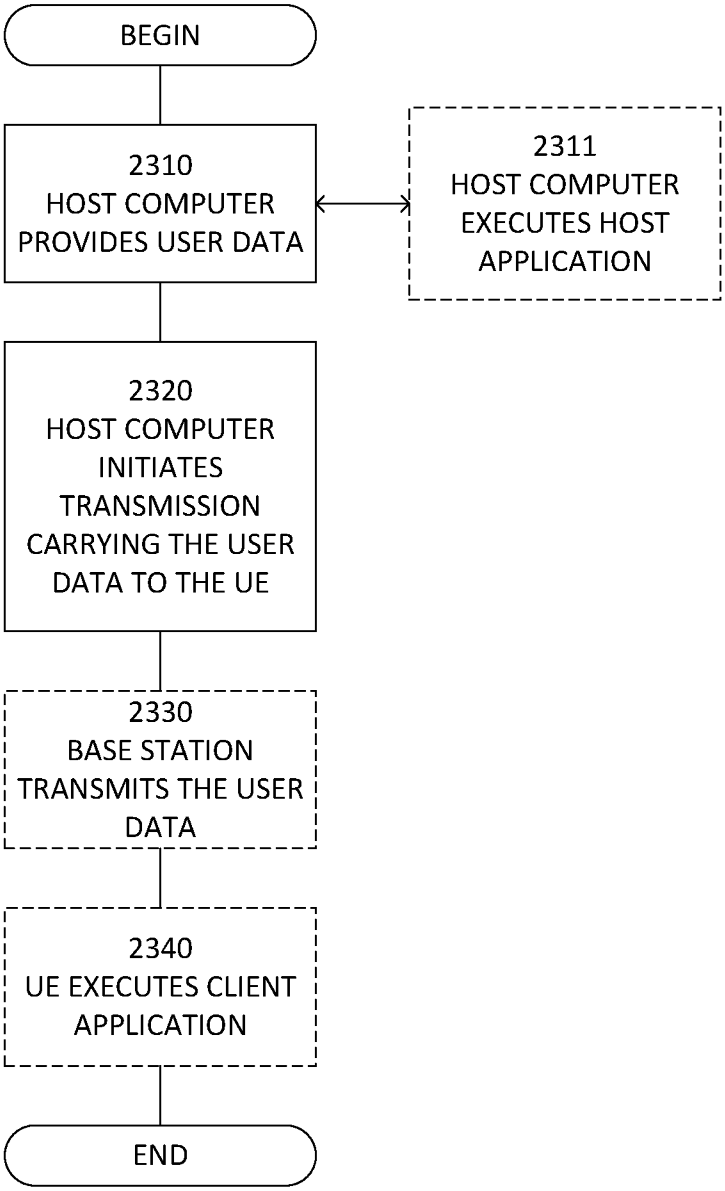
FIG. 23 is a flowchart illustrating a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 23 will be included in this section. In step 2310, the host computer provides user data. In substep 2311 (which may be optional) of step 2310, the host computer provides the user data by executing a host application. In step 2320, the host computer initiates a transmission carrying the user data to the UE. In step 2330 (which may be optional), the base station transmits to the UE the user data which was carried in the transmission that the host computer initiated, in accordance with the teachings of the embodiments described throughout this disclosure. In step 2340 (which may also be optional), the UE executes a client application associated with the host application executed by the host computer.

Figure 24:
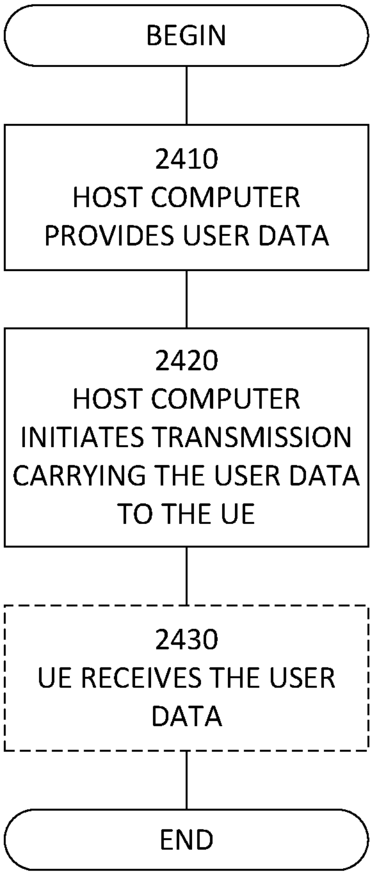
FIG. 24 is a flowchart illustrating a method implemented in a communication system, in accordance with one embodiment.

FIG. 24 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 24 will be included in this section. In step 2410 of the method, the host computer provides user data. In an optional substep (not shown) the host computer provides the user data by executing a host application. In step 2420, the host computer initiates a transmission carrying the user data to the UE. The transmission may pass via the base station, in accordance with the teachings of the embodiments described throughout this disclosure. In step 2430 (which may be optional), the UE receives the user data carried in the transmission.

Figure 25:
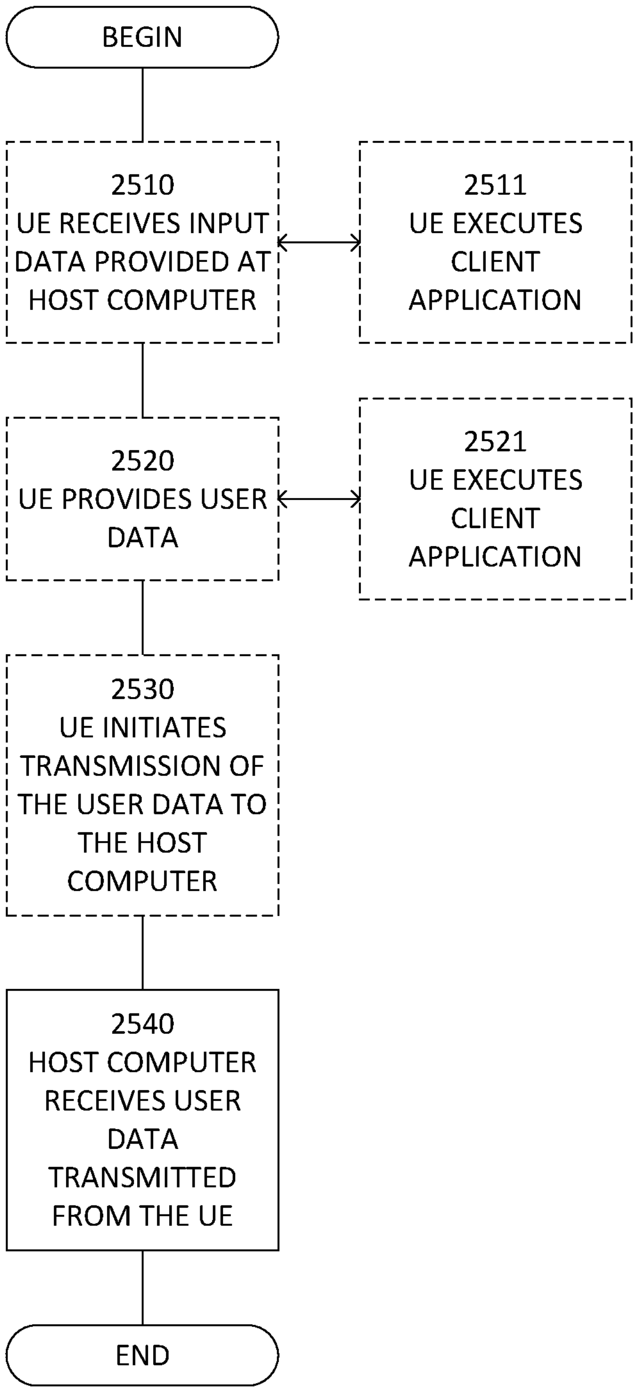
FIG. 25 is a flowchart illustrating a method implemented in a communication system, in accordance with one embodiment.

FIG. 25 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 25 will be included in this section. In step 2510 (which may be optional), the UE receives input data provided by the host computer. Additionally or alternatively, in step 2520, the UE provides user data. In substep 2521 (which may be optional) of step 2520, the UE provides the user data by executing a client application. In substep 2511 (which may be optional) of step 2510, the UE executes a client application which provides the user data in reaction to the received input data provided by the host computer. In providing the user data, the executed client application may further consider user input received from the user. Regardless of the specific manner in which the user data was provided, the UE initiates, in substep 2530 (which may be optional), transmission of the user data to the host computer. In step 2540 of the method, the host computer receives the user data transmitted from the UE, in accordance with the teachings of the embodiments described throughout this disclosure.

Figure 26:
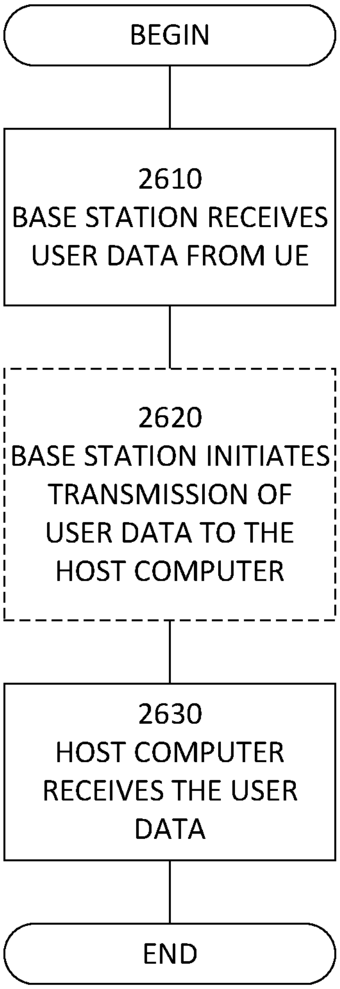
FIG. 26 is a flowchart illustrating a method implemented in a communication system, in accordance with one embodiment.

FIG. 26 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 26 will be included in this section. In step 2610 (which may be optional), in accordance with the teachings of the embodiments described throughout this disclosure, the base station receives user data from the UE. In step 2620 (which may be optional), the base station initiates transmission of the received user data to the host computer. In step 2630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Example embodiments of techniques and apparatus described herein include, but are not limited to, the following enumerated examples:

Group A Embodiments

A1. A method performed by an integrated access backhaul, IAB, node, the method comprising:
- migrating a control plane connection of the IAB node from first radio network equipment to second radio network equipment; and
- at least temporarily maintaining a radio network layer application protocol connection between the IAB node and the first radio network equipment to support the migrated control plane connection.

A2. The method of embodiment A1, further comprising transmitting and/or receiving one or more control plane messages over the migrated control plane connection between the IAB node and the second radio network equipment, via the radio network layer application protocol connection maintained between the IAB node and the first radio network equipment.

A3. The method of embodiment A2, wherein:
- said transmitting comprises encapsulating a control plane message for the migrated control plane connection in a radio network layer application protocol message and transmitting the radio network layer application protocol message over the radio network layer application protocol connection; and/or
- said receiving comprises receiving a radio network layer application protocol message over the radio network layer application protocol connection and de-encapsulating a control plane message for the migrated control plane connection from the received radio network layer application protocol message.

A4. The method of any of embodiments A2-A3, wherein said transmitting and/or receiving comprises tunneling the one or more control plane messages over the radio network layer application protocol connection maintained between the IAB node and the first radio network equipment.

A5. The method of any of embodiments A1-A4, further comprising:
- before said migrating, serving a cell using certain values for cell-specific parameters; and
- after said migrating, at least temporarily serving the cell using the same certain values for the cell-specific parameters.

A6. The method of any of embodiments A1-A5, further comprising:
- starting a timer upon migrating the control plane connection;
- maintaining the radio network layer application protocol connection between the IAB node and the first radio network equipment while the timer is running; and
- responsive to expiration of the timer, migrating the radio network layer application protocol connection from the first radio network equipment to the second radio network equipment.

A7. The method of any of embodiments A1-A5, further comprising deciding whether and/or when to migrate the radio network layer application protocol connection from the first radio network equipment to the second radio network equipment based on at least one of any one or more of:
- an amount of and/or type of traffic communicated on the radio network layer application protocol connection;
- an amount of and/or type of wireless devices supported by the radio network layer application protocol connection; and
- an amount of and/or type of bearers of a certain quality of service profile supported by the radio network layer application protocol connection.

A8. The method of any of embodiments A1-A7, wherein the first radio network equipment comprises a first IAB donor, and wherein the second radio network equipment comprises a second IAB donor.

A9. The method of any of embodiments A1-A8, wherein the first radio network equipment comprises a first distributed unit and a first central unit that controls the first distributed unit, wherein the second radio network equipment comprises a second distributed unit and a second central unit that controls the second distributed unit, wherein the IAB node comprises a migrating distributed unit and a migrating mobile termination, wherein said migrating comprises migrating a control plane connection of the migrating mobile termination from the first central unit of the first radio network equipment to the second central unit of the second radio network equipment, and wherein said maintaining comprises at least temporarily maintaining a radio network layer application protocol connection between the migrating distributed unit and the first central unit of the first radio network equipment to support the migrated control plane connection.

A10. The method of embodiment A9, wherein a traffic path of the radio network layer application protocol connection includes the second central unit.

A11. The method of embodiment A9, wherein a traffic path of the radio network layer application protocol connection excludes the second central unit, with traffic being communicated directly between the first central unit and the second distributed unit.

A12. The method of any of embodiments A1-A11, further comprising migrating a user plane connection of the IAB node from the first radio network equipment to the second radio network equipment, and at least temporarily maintaining the radio network layer application protocol connection between the IAB node and the first radio network equipment after migrating the user plane connection.

A13. The method of any of embodiments A1-A12, wherein the control plane connection is a Radio Resource Control, RRC, connection.

A14. The method of any of embodiments A1-A13, wherein the radio network layer application protocol connection is an F1 connection.

A15. The method of any of embodiments A1-A14, further comprising:
- serving one or more child nodes, wherein the one or more child nodes include one or more child IAB nodes and/or one or more wireless devices; and
- after said migrating, for at least one of the one or more child nodes, at least temporarily maintaining a control plane connection between the child node and the first radio network equipment.

A16. The method of any of embodiments A1-A15, further comprising:
- serving one or more child IAB nodes; and
- after said migrating, for at least one of the one or more child IAB nodes, at least temporarily maintaining:
  - a control plane connection between the child IAB node and the first radio network equipment; and
  - a radio network layer application protocol connection between the child IAB node and the first radio network equipment to support the maintained control plane connection between the child IAB node and the first radio network equipment.

A17. The method of any of embodiments A1-A16, further comprising receiving, from the first radio network equipment or the second radio network equipment, a proxied connection migration message that:
- indicates the IAB node is to migrate the control plane connection to the second radio network equipment but at least temporarily maintain the radio network layer application protocol connection between the IAB node and the first radio network equipment to support the migrated control plane connection; and/or
- includes configuration information for configuring migration of the control plane connection to the second radio network equipment but at least temporary maintenance of the radio network layer application protocol connection between the IAB node and the first radio network equipment to support the migrated control plane connection.

A18. The method of embodiment A17, wherein the proxied connection migration message is an RRC Reconfiguration message.

A19. The method of any of embodiments A1-A18, further comprising transmitting, towards the second radio network equipment, a proxied connection migration complete message that indicates the IAB node has migrated the control plane connection to the second radio network equipment but at least temporarily maintained the radio network layer application protocol connection between the IAB node and the first radio network equipment to support the migrated control plane connection.

A20. The method of embodiment A19, wherein the proxied connection migration complete message is an RRC Reconfiguration Complete message.

A21. A method performed by an integrated access backhaul, IAB, node, the method comprising:
- receiving, from first radio network equipment or second radio network equipment, a proxied connection migration message that:
  - indicates the IAB node is to migrate a control plane connection from the first radio network equipment to the second radio network equipment but at least temporarily maintain a radio network layer application protocol connection between the IAB node and the first radio network equipment to support the migrated control plane connection; and/or
  - includes configuration information for configuring migration of the control plane connection to the second radio network equipment but at least temporary maintenance of the radio network layer application protocol connection between the IAB node and the first radio network equipment to support the migrated control plane connection.

A22. The method of embodiment A21, further comprising migrating the control plane connection but at least temporarily maintaining the radio network layer application protocol connection according to the proxied connection migration message.

A23. A method performed by an integrated access backhaul, IAB, node, the method comprising:
- transmitting, towards second radio network equipment, a proxied connection migration complete message that indicates the IAB node has migrated a control plane connection from first radio network equipment to the second radio network equipment but at least temporarily maintained a radio network layer application protocol connection between the IAB node and the first radio network equipment to support the migrated control plane connection.

Group B Embodiments

B1. A method performed by first radio network equipment, the method comprising:
- migrating a control plane connection of an IAB node from the first radio network equipment to second radio network equipment; and
- at least temporarily maintaining a radio network layer application protocol connection between the IAB node and the first radio network equipment to support the migrated control plane connection.

B2. The method of embodiment 1, further comprising relaying, via the radio network layer application protocol connection maintained between the IAB node and the first radio network equipment, one or more control plane messages for the migrated control plane connection between the IAB node and the second radio network equipment.

B3. The method of embodiment A2, wherein said relaying comprises:

receiving a radio network layer application protocol message from the IAB node over the radio network layer application protocol connection, de-encapsulating a control plane message for the migrated control plane connection from the received radio network layer application protocol message, and transmitting the de-encapsulated control plane message over an interface between the first radio network node and the second radio network node; and/or receiving a control plane message for the migrated control plane connection over an interface between the first radio network node and the second radio network node, encapsulating the received control plane message in a radio network layer application protocol message, and transmitting the radio network layer application protocol message over the radio network layer application protocol connection.

B4. The method of any of embodiments B2-B3, wherein said relaying comprises tunneling the one or more control plane messages over the radio network layer application protocol connection maintained between the IAB node and the first radio network equipment.

B5. The method of any of embodiments B1-B4, further comprising deciding whether and/or when to migrate the radio network layer application protocol connection from the first radio network equipment to the second radio network equipment based on at least one of any one or more of:

an amount of and/or type of traffic communicated on the radio network layer application protocol connection;

an amount of and/or type of wireless devices supported by the radio network layer application protocol connection; and an amount of and/or type of bearers of a certain quality of service profile supported by the radio network layer application protocol connection.

B6. The method of any of embodiments B1-B5, wherein the first radio network equipment comprises a first IAB donor, and wherein the second radio network equipment comprises a second IAB donor.

B7. The method of any of embodiments B1-B6, wherein the first radio network equipment comprises a first distributed unit and a first central unit that controls the first distributed unit, wherein the second radio network equipment comprises a second distributed unit and a second central unit that controls the second distributed unit, wherein the IAB node comprises a migrating distributed unit and a migrating mobile termination, wherein said migrating comprises migrating a control plane connection of the migrating mobile termination from the first central unit of the first radio network equipment to the second central unit of the second radio network equipment, and wherein said maintaining comprises at least temporarily maintaining a radio network layer application protocol connection between the migrating distributed unit and the first central unit of the first radio network equipment to support the migrated control plane connection.

B8. The method of embodiment B7, wherein a traffic path of the radio network layer application protocol connection includes the second central unit.

B9. The method of embodiment B7, wherein a traffic path of the radio network layer application protocol connection excludes the second central unit, with traffic being communicated directly between the first central unit and the second distributed unit.

B10. The method of any of embodiments B1-B9, further comprising migrating a user plane connection of the IAB node from the first radio network equipment to the second radio network equipment, and at least temporarily maintaining the radio network layer application protocol connection between the IAB node and the first radio network equipment after migrating the user plane connection.

B11. The method of any of embodiments B1-B10, wherein the control plane connection is a Radio Resource Control, RRC, connection.

B12. The method of any of embodiments B1-B11, wherein the radio network layer application protocol connection is an F1 connection.

B13. The method of any of embodiments B1-B12, further comprising, after said migrating, for at least one of one or more child nodes of the IAB node, at least temporarily maintaining a control plane connection between the child node and the first radio network equipment.

B14. The method of any of embodiments B1-B13, further comprising, after said migrating, for at least one of one or more child IAB nodes served by the IAB node, at least temporarily maintaining:

a control plane connection between the child IAB node and the first radio network equipment; and a radio network layer application protocol connection between the child IAB node and the first radio network equipment to support the maintained control plane connection between the child IAB node and the first radio network equipment.

B15. The method of any of embodiments B1-B14, further comprising transmitting, from the first radio network equipment to the IAB node, a proxied connection migration message that:

indicates the IAB node is to migrate the control plane connection to the second radio network equipment but at least temporarily maintain the radio network layer application protocol connection between the IAB node and the first radio network equipment to support the migrated control plane connection; and/or includes configuration information for configuring migration of the control plane connection to the second radio network equipment but at least temporary maintenance of the radio network layer application protocol connection between the IAB node and the first radio network equipment to support the migrated control plane connection.

B16. The method of embodiment B15, wherein the proxied connection migration message is an RRC Reconfiguration message.

B17. The method of any of embodiments B1-B16, further comprising transmitting, to the second radio network equipment, a proxied connection migration message that:

indicates the IAB node is to migrate the control plane connection to the second radio network equipment but at least temporarily maintain the radio network layer application protocol connection between the IAB node and the first radio network equipment to support the migrated control plane connection; and/or includes configuration information for configuring migration of the control plane connection to the second radio network equipment but at least temporary maintenance of the radio network layer application protocol connection between the IAB node and the first radio network equipment to support the migrated control plane connection.

B18. The method of embodiment B17, wherein the transmitted proxied connection migration message is an Xn Handover Request message.

B19. The method of any of embodiments B1-B16, further comprising receiving, from the second radio network equipment, a proxied connection migration message that:

indicates the IAB node is to migrate the control plane connection to the second radio network equipment but at least temporarily maintain the radio network layer application protocol connection between the IAB node and the first radio network equipment to support the migrated control plane connection; and/or includes configuration information for configuring migration of the control plane connection to the second radio network equipment but at least temporary maintenance of the radio network layer application protocol connection between the IAB node and the first radio network equipment to support the migrated control plane connection.

B20. The method of embodiment B17, wherein the transmitted proxied connection migration message is an Xn Handover Request Acknowledgement message.

B21. A method performed by first radio network equipment, the method comprising: transmitting, to an IAB node, a message that:

indicates the IAB node is to migrate a control plane connection from the first radio network equipment to second radio network equipment but at least temporarily maintain a radio network layer application protocol connection between the IAB node and the first radio network equipment to support the migrated control plane connection; and/or includes configuration information for configuring migration of the control plane connection to the second radio network equipment but at least temporary maintenance of the radio network layer application protocol connection between the IAB node and the first radio network equipment to support the migrated control plane connection.

B22. The method of embodiment A21, further comprising migrating the control plane connection but at least temporarily maintaining the radio network layer application protocol connection according to the transmitted message.

B23. A method performed by first radio network equipment, the method comprising:

transmitting to, or receiving from, second radio network equipment, a message that:

indicates the IAB node is to migrate a control plane connection from the first radio network equipment to the second radio network equipment but at least temporarily maintain a radio network layer application protocol connection between the IAB node and the first radio network equipment to support the migrated control plane connection; and/or includes configuration information for configuring migration of the control plane connection to the second radio network equipment but at least temporary maintenance of the radio network layer application protocol connection between the IAB node and the first radio network equipment to support the migrated control plane connection.

BB1. A method performed by second radio network equipment, the method comprising:

migrating a control plane connection of an IAB node from first radio network equipment to the second radio network equipment, without migrating a radio network layer application protocol connection between the IAB node and the first radio network equipment to support the migrated control plane connection.

BB2. The method of embodiment BB1, further comprising transmitting and/or receiving one or more control plane messages over the migrated control plane connection between the IAB node and the second radio network equipment, via the radio network layer application protocol connection maintained between the IAB node and the first radio network equipment and/or via an interface between the first radio network node and the second radio network node.

BB3. The method of embodiment BB2, wherein:

said transmitting comprises encapsulating a control plane message for the migrated control plane connection in an inter radio node protocol message and transmitting the inter radio node protocol message over the interface to the first radio network node; and/or said receiving comprises receiving an inter radio node protocol message over the interface from the first radio network node and de-encapsulating a control plane message for the migrated control plane connection from the received inter radio node protocol message.

BB4. The method of any of embodiments BB2-BB3, wherein said transmitting and/or receiving comprises tunneling the one or more control plane messages over the radio network layer application protocol connection maintained between the IAB node and the first radio network equipment and/or over an interface between the first radio network node and the second radio network node.

BB5. The method of any of embodiments BB1-BB4, further comprising deciding whether and/or when to migrate the radio network layer application protocol connection from the first radio network equipment to the second radio network equipment based on at least one of any one or more of:

an amount of and/or type of traffic communicated on the radio network layer application protocol connection;

an amount of and/or type of wireless devices supported by the radio network layer application protocol connection; and an amount of and/or type of bearers of a certain quality of service profile supported by the radio network layer application protocol connection.

BB6. The method of any of embodiments BB1-BB5, wherein the first radio network equipment comprises a first IAB donor, and wherein the second radio network equipment comprises a second IAB donor.

BB7. The method of any of embodiments BB1-BB6, wherein the first radio network equipment comprises a first distributed unit and a first central unit that controls the first distributed unit, wherein the second radio network equipment comprises a second distributed unit and a second central unit that controls the second distributed unit, wherein the IAB node comprises a migrating distributed unit and a migrating mobile termination, wherein said migrating comprises migrating a control plane connection of the migrating mobile termination from the first central unit of the first radio network equipment to the second central unit of the second radio network equipment, without migrating a radio network layer application protocol connection between the migrating distributed unit and the first central unit of the first radio network equipment to support the migrated control plane connection.

BB8. The method of embodiment BB7, wherein a traffic path of the radio network layer application protocol connection includes the second central unit.

BB9. The method of embodiment BB7, wherein a traffic path of the radio network layer application protocol connection excludes the second central unit, with traffic being communicated directly between the first central unit and the second distributed unit.

BB10. The method of any of embodiments BB1-BB9, further comprising migrating a user plane connection of the IAB node from the first radio network equipment to the second radio network equipment, without migrating the radio network layer application protocol connection between the IAB node and the first radio network equipment after migrating the user plane connection.

BB11. The method of any of embodiments BB1-BB10, wherein the control plane connection is a Radio Resource Control, RRC, connection.

BB12. The method of any of embodiments BB1-BB11, wherein the radio network layer application protocol connection is an F1 connection.

BB13. The method of any of embodiments BB1-BB12, further comprising transmitting, from the second radio network equipment to the IAB node or to the first radio network node, a proxied connection migration message that:

indicates the IAB node is to migrate the control plane connection to the second radio network equipment but at least temporarily maintain the radio network layer application protocol connection between the IAB node and the first radio network equipment to support the migrated control plane connection; and/or includes configuration information for configuring migration of the control plane connection to the second radio network equipment but at least temporary maintenance of the radio network layer application protocol connection between the IAB node and the first radio network equipment to support the migrated control plane connection.

BB14. The method of embodiment BB13, wherein the transmitted proxied connection migration message is an RRC Reconfiguration message.

BB15. The method of embodiment BB13, wherein the transmitted proxied connection migration message is an Xn Handover Request Acknowledgement message.

BB16. The method of any of embodiments BB1-BB14, further comprising receiving, from the first radio network equipment, a proxied connection migration message that:

indicates the IAB node is to migrate the control plane connection to the second radio network equipment but at least temporarily maintain the radio network layer application protocol connection between the IAB node and the first radio network equipment to support the migrated control plane connection; and/or includes configuration information for configuring migration of the control plane connection to the second radio network equipment but at least temporary maintenance of the radio network layer application protocol connection between the IAB node and the first radio network equipment to support the migrated control plane connection.

BB17. The method of embodiment BB16, wherein the received proxied connection migration message is an Xn Handover Request message.

BB20. The method of any of embodiments B1-B16, further comprising receiving, from the IAB node, a proxied connection migration complete message that indicates the IAB node has migrated the control plane connection to the second radio network equipment but at least temporarily maintained the radio network layer application protocol connection between the IAB node and the first radio network equipment to support the migrated control plane connection.

BB21. The method of embodiment BB20, wherein the received message is an RRC Reconfiguration Complete message.

BB. The method of any of the previous embodiments, further comprising:

obtaining user data; and forwarding the user data to a host computer or a wireless device.

Group C Embodiments

C1. An IAB node configured to perform any of the steps of any of the Group A embodiments.

C2. An IAB node comprising processing circuitry configured to perform any of the steps of any of the Group A embodiments.

C3. An IAB node comprising:

communication circuitry; and processing circuitry configured to perform any of the steps of any of the Group A embodiments.

C4. An IAB node comprising:

processing circuitry configured to perform any of the steps of any of the Group A embodiments; and power supply circuitry configured to supply power to the IAB node.

C5. An IAB node comprising:

processing circuitry and memory, the memory containing instructions executable by the processing circuitry whereby the IAB node is configured to perform any of the steps of any of the Group A embodiments.

C6. Reserved

C7. A computer program comprising instructions which, when executed by at least one processor of an IAB node, causes the IAB node to carry out the steps of any of the Group A embodiments.

C8. A carrier containing the computer program of embodiment C7, wherein the carrier is one of an electronic signal, optical signal, radio signal, or computer readable storage medium.

C9. Radio network equipment configured to perform any of the steps of any of the Group B embodiments.

C10. Radio network equipment comprising processing circuitry configured to perform any of the steps of any of the Group B embodiments.

C11. Radio network equipment comprising:
communication circuitry; and
processing circuitry configured to perform any of the steps of any of the Group B embodiments.

C12. Radio network equipment comprising:
processing circuitry configured to perform any of the steps of any of the Group B embodiments;
power supply circuitry configured to supply power to the radio network equipment.

C13. Radio network equipment comprising:
processing circuitry and memory, the memory containing instructions executable by the processing circuitry whereby the radio network equipment is configured to perform any of the steps of any of the Group B embodiments.

C14. Radio network equipment of any of embodiments C9-C13, wherein the radio network equipment is an IAB donor.

C15. A computer program comprising instructions which, when executed by at least one processor of radio network equipment, causes the radio network equipment to carry out the steps of any of the Group B embodiments.

C16. The computer program of embodiment C14, wherein the radio network equipment is an IAB donor.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application; and
the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:
the processing circuitry of the host computer is configured to execute a host application;
the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

What is claimed is:

1. A method performed by an integrated access backhaul (IAB) node, the method comprising:
migrating a control plane connection of the IAB node from first radio network equipment to second radio network equipment;
after migrating the control plane connection, maintaining a radio network layer application protocol connection between the IAB node and the first radio network equipment; and
after the migration of the control plane connection, while maintaining the radio network layer application protocol connection, transmitting and/or receiving one or more radio network layer application protocol messages between the IAB node and the first radio network equipment over the maintained radio network layer application protocol connection.

2. The method of claim 1, further comprising transmitting and/or receiving one or more control plane messages over the migrated control plane connection between the IAB node and the second radio network equipment.

3. The method of claim 1, further comprising:
before said migrating, serving a cell using certain values for cell-specific parameters; and
after said migrating, serving the cell using the same certain values for the cell-specific parameters.

4. The method of claim 1, further comprising:
starting a timer upon migrating the control plane connection;
maintaining the radio network layer application protocol connection between the IAB node and the first radio network equipment while the timer is running; and
responsive to expiration of the timer, migrating the radio network layer application protocol connection from the first radio network equipment to the second radio network equipment.

5. The method of claim 1, further comprising, after migrating the control plane connection, while maintaining the radio network layer application protocol connection, deciding whether and/or when to migrate the radio network layer application protocol connection from the first radio network equipment to the second radio network equipment based on at least one of any one or more of:
an amount of and/or type of traffic communicated on the radio network layer application protocol connection;
an amount of and/or type of wireless devices supported by the radio network layer application protocol connection; and
an amount of and/or type of bearers of a certain quality of service profile supported by the radio network layer application protocol connection.

6. The method of claim 1, wherein the first radio network equipment comprises a first IAB donor, and wherein the second radio network equipment comprises a second IAB donor.

7. The method of claim 1, wherein the first radio network equipment comprises a first distributed unit and a first central unit that controls the first distributed unit, wherein the second radio network equipment comprises a second distributed unit and a second central unit that controls the second distributed unit, wherein the IAB node comprises a migrating distributed unit and a migrating mobile termination, wherein said migrating comprises migrating a control plane connection of the migrating mobile termination from the first central unit of the first radio network equipment to the second central unit of the second radio network equipment, and wherein said maintaining comprises maintaining a radio network layer application protocol connection between the migrating distributed unit and the first central unit of the first radio network equipment.

8. The method of claim 1, wherein the control plane connection is a Radio Resource Control (RRC) connection and wherein the radio network layer application protocol connection is an F1 connection.

9. The method of claim 1, wherein transmitting and/or receiving one or more radio network layer application protocol messages between the IAB node and the first radio network equipment over the maintained radio network layer application protocol connection comprises tunneling the one or more radio network layer application protocol messages over the migrated control plane connection and an interface between the first radio network equipment and the second radio network equipment.

10. The method of claim 1, wherein transmitting and/or receiving one or more radio network layer application protocol messages between the IAB node and the first radio network equipment over the maintained radio network layer application protocol connection comprises:

transmitting a radio network layer application protocol message to the first radio network equipment over the maintained radio network layer application protocol connection by encapsulating the radio network layer application protocol message in a control plane message and transmitting the control plane message to the second radio network equipment over the migrated control plane connection, for forwarding of the radio network layer application protocol message to the first radio network equipment over the interface; and/or receiving a radio network layer application protocol message from the first radio network equipment over the maintained radio network layer application protocol connection by receiving a control plane message from the second radio network equipment over the migrated control plane connection, and de-encapsulating the radio network layer application protocol message from the received control plane message.

11. The method of claim 1, further comprising transmitting, by the IAB node, a message to the second radio network equipment indicating completion of migration of the control plane connection, wherein the radio network layer application protocol connection between the IAB node and the first radio network equipment is maintained after transmission of the message.

12. A method performed by first radio network equipment, the method comprising:

migrating a control plane connection of an IAB node from the first radio network equipment to second radio network equipment;

after migrating the control plane connection, maintaining a radio network layer application protocol connection between the IAB node and the first radio network equipment; and after the migration of the control plane connection, while maintaining the radio network layer application protocol connection, transmitting and/or receiving one or more radio network layer application protocol messages between the IAB node and the first radio network equipment over the maintained radio network layer application protocol connection.

13. The method of claim 12, further comprising, after migrating the control plane connection, while maintaining the radio network layer application protocol connection, deciding whether and/or when to migrate the radio network layer application protocol connection from the first radio network equipment to the second radio network equipment based on at least one of any one or more of:

an amount of and/or type of traffic communicated on the radio network layer application protocol connection;

an amount of and/or type of wireless devices supported by the radio network layer application protocol connection; and an amount of and/or type of bearers of a certain quality of service profile supported by the radio network layer application protocol connection.

14. The method of claim 12, wherein the first radio network equipment comprises a first distributed unit and a first central unit that controls the first distributed unit, wherein the second radio network equipment comprises a second distributed unit and a second central unit that controls the second distributed unit, wherein the IAB node comprises a migrating distributed unit and a migrating mobile termination, wherein said migrating comprises migrating a control plane connection of the migrating mobile termination from the first central unit of the first radio network equipment to the second central unit of the second radio network equipment, and wherein said maintaining comprises maintaining a radio network layer application protocol connection between the migrating distributed unit and the first central unit of the first radio network equipment.

15. The method of claim 12, further comprising, after said migrating, for at least one of one or more child nodes of the IAB node, maintaining a control plane connection between the child node and the first radio network equipment.

16. The method of claim 12, further comprising transmitting and/or receiving a proxied connection migration message, wherein the proxied connection migration message:

indicates the IAB node is to migrate the control plane connection to the second radio network equipment but maintain the radio network layer application protocol connection between the IAB node and the first radio network equipment; and/or includes configuration information for configuring migration of the control plane connection to the second radio network equipment but maintenance of the radio network layer application protocol connection between the IAB node and the first radio network equipment.

17. An integrated access backhaul (IAB) node comprising:

communication circuitry; and processing circuitry configured to:

migrate a control plane connection of the IAB node from first radio network equipment to second radio network equipment;

maintain a radio network layer application protocol connection between the IAB node and the first radio network equipment; and after the migration of the control plane connection, while maintaining the radio network layer application protocol connection, transmit and/or receive one or more radio network layer application protocol messages between the IAB node and the first radio network equipment over the maintained radio network layer application protocol connection.

18. The IAB node of claim 17, wherein the processing circuitry is further configured to transmit and/or receive one or more control plane messages over the migrated control plane connection between the IAB node and the second radio network equipment.

19. The IAB node of claim 17, wherein the processing circuitry is further configured to:

before migrating the control plane connection, serve a cell using certain values for cell-specific parameters; and after migrating the control plane connection, serve the cell using the same certain values for the cell-specific parameters.

20. The IAB node of claim 17, wherein the processing circuitry is further configured to:

start a timer upon migrating the control plane connection;

maintain the radio network layer application protocol connection between the IAB node and the first radio network equipment while the timer is running; and responsive to expiration of the timer, migrate the radio network layer application protocol connection from the first radio network equipment to the second radio network equipment.

21. The IAB node of claim 17, wherein the processing circuitry is further configured to: after migrating the control plane connection, while maintaining the radio network layer application protocol connection, decide whether and/or when to migrate the radio network layer application protocol connection from the first radio network equipment to the second radio network equipment based on at least one of any one or more of:

an amount of and/or type of traffic communicated on the radio network layer application protocol connection;

an amount of and/or type of wireless devices supported by the radio network layer application protocol connection; and an amount of and/or type of bearers of a certain quality of service profile supported by the radio network layer application protocol connection.

22. The IAB node of claim 17, wherein the control plane connection is a Radio Resource Control (RRC) connection and wherein the radio network layer application protocol connection is an F1 connection.

23. First radio network equipment comprising:

communication circuitry; and processing circuitry configured to:

migrate a control plane connection of an IAB node from the first radio network equipment to second radio network equipment;

maintain a radio network layer application protocol connection between the IAB node and the first radio network equipment; and after the migration of the control plane connection, while maintaining the radio network layer application protocol connection, transmit and/or receive one or more radio network layer application protocol messages between the IAB node and the first radio network equipment over the maintained radio network layer application protocol connection.

* * * * *